United States Patent
Okuyama et al.

(10) Patent No.: US 10,230,887 B2
(45) Date of Patent: Mar. 12, 2019

(54) LENS BARREL, REPLACEMENT LENS, IMAGING DEVICE, AND CONTROL PROGRAM

(71) Applicant: NIKON CORPORATION, Tokyo (JP)

(72) Inventors: Teppei Okuyama, Tokyo (JP); Hidefumi Ota, Kawasaki (JP); Toshiaki Maeda, Yokohama (JP); Satoshi Hara, Yokohama (JP); Akihiko Kawai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 62 days.

(21) Appl. No.: 15/124,127

(22) PCT Filed: Mar. 12, 2015

(86) PCT No.: PCT/JP2015/057337
§ 371 (c)(1),
(2) Date: Dec. 21, 2016

(87) PCT Pub. No.: WO2015/137458
PCT Pub. Date: Sep. 17, 2015

(65) Prior Publication Data
US 2017/0099428 A1    Apr. 6, 2017

(30) Foreign Application Priority Data

Mar. 12, 2014 (JP) ................. 2014-048721
Mar. 12, 2014 (JP) ................. 2014-048749
Mar. 12, 2014 (JP) ................. 2014-049348

(51) Int. Cl.
*H04N 5/232* (2006.01)
*G03B 17/14* (2006.01)
(Continued)

(52) U.S. Cl.
CPC ......... *H04N 5/23212* (2013.01); *G02B 7/102* (2013.01); *G03B 3/10* (2013.01);
(Continued)

(58) Field of Classification Search
CPC ........... H04N 5/23212; H04N 5/23296; H04N 5/2254; H04N 5/23293; H04N 5/2356
See application file for complete search history.

(56) References Cited

U.S. PATENT DOCUMENTS 5,899,586 A * 5/1999 Kawanami ............... G02B 7/28
396/103
7,598,997 B2   10/2009 Shiraishi
(Continued)

FOREIGN PATENT DOCUMENTS

JP    H10-197782 A    7/1998
JP    2001-042419 A    2/2001
(Continued)

OTHER PUBLICATIONS

Jun. 9, 2015 International Search Report issued in International Patent Application No. PCT/JP2015/057337.
(Continued)

*Primary Examiner* — Abdelaaziz Tissire
(74) *Attorney, Agent, or Firm* — Oliff PLC

(57) ABSTRACT

A lens barrel attached to an imaging device, including a focus lens unit that is movable in an optical axis direction; an actuator that moves the focus lens unit along the optical axis direction; a drive control section that controls drive of the actuator; and a setting section that is capable of setting a movement range of the focus lens unit to be one of a first range and a second range that differ from each other with respect to at least one of one end and another end, each range defining the range in which the focus lens unit is allowed to move. Even when the movement range of the focus lens unit
(Continued)

is set by the setting section to be one of the first range and the second range, the drive control section removes the setting of the movement range when instructions are received from the imaging device.

14 Claims, 28 Drawing Sheets

(51) Int. Cl.
 G02B 7/10 (2006.01)
 G03B 3/10 (2006.01)
 H04N 5/225 (2006.01)
(52) U.S. Cl.
 CPC ........... *G03B 17/14* (2013.01); *H04N 5/2254* (2013.01); *H04N 5/23209* (2013.01); *H04N 5/23241* (2013.01); *H04N 5/23245* (2013.01); *H04N 5/23293* (2013.01); *H04N 5/23296* (2013.01)

(56) References Cited

U.S. PATENT DOCUMENTS

| | | | | |
|---|---|---|---|---|
| 2005/0168620 A1* | 8/2005 | Shiraishi | ............ | H04N 5/23212 348/345 |
| 2005/0270409 A1* | 12/2005 | Takeuchi | ............ | H04N 5/23212 348/345 |
| 2006/0029381 A1* | 2/2006 | Onozawa | ............... | G03B 13/16 396/147 |
| 2006/0072915 A1* | 4/2006 | Onozawa | ................. | G02B 7/28 396/121 |
| 2006/0093343 A1* | 5/2006 | Horii | ..................... | G03B 17/14 396/91 |
| 2006/0133791 A1* | 6/2006 | Miyata | .................. | G03B 13/32 396/103 |
| 2008/0267601 A1* | 10/2008 | Kobayashi | ............. | G03B 13/32 396/91 |
| 2009/0047010 A1* | 2/2009 | Yoshida | ................... | G02B 7/36 396/127 |
| 2009/0185047 A1* | 7/2009 | Takachi | ................. | G03B 13/36 348/222.1 |
| 2011/0044678 A1* | 2/2011 | Ogino | ..................... | G02B 7/38 396/124 |
| 2015/0365583 A1* | 12/2015 | Higuma | ............. | H04N 5/23209 348/231.6 |
| 2017/0343768 A1* | 11/2017 | Shirai | ...................... | G02B 7/08 |

FOREIGN PATENT DOCUMENTS

| | | |
|---|---|---|
| JP | 2003-241069 A | 8/2003 |
| JP | 2005-202064 A | 7/2005 |
| JP | 2006-106356 A | 4/2006 |
| JP | 2008-022447 A | 1/2008 |
| JP | 2012-185289 A | 9/2012 |
| JP | 2014-038197 A | 2/2014 |

OTHER PUBLICATIONS

Nov. 6, 2018 Office Action Issued in Japanese Patent Application No. 2016-507828.

* cited by examiner

| SEARCH COMMAND | FINAL END POSITION OF SEARCH RANGE FOR FOCAL POSITION |
|---|---|

*FIG. 24A*

| PF COMMAND | DRIVE RANGE OF FOCUS LENS UNIT 3212 |
|---|---|

*FIG. 24B*

LENS BARREL, REPLACEMENT LENS, IMAGING DEVICE, AND CONTROL PROGRAM

BACKGROUND

1. Technical Field

The present invention relates to a lens barrel, a replacement lens, an imaging device, and a control program.

2. Related Art

A lens barrel is known that includes a focus limiter for limiting an optical system such that the optical system can only move within a specified range.

Furthermore, an imaging device is known that judges whether the current position of a focus lens is at an end of a search range and, when it is judged that the focus lens is at the end of the search range, sets the movement direction to be a direction toward the opposite end of the search range and begins moving the focus lens.

Patent Document 1: Japanese Patent Application Publication No. 2001-042419

Patent Document 2: Japanese Patent Application Publication No. 2014-038197

If the movable range of the optical system is limited by the focus limiter, regardless of the settings of the camera body, the replacement lens drives the focus lens unit within the limited range. At this time, information concerning the focus limit cannot be transferred between the replacement lens and the camera body, and there are cases where control for effectively utilizing the settings of the camera body cannot be realized. (First Problem)

Conventionally, the focus lens unit and the focus limiter are mechanically linked. Therefore, it is impossible to establish both a manual focus operation and a focus limit. (Second Problem)

When the camera body instructs the replacement lens concerning the movement direction of the focus lens unit according to the current position of the focus lens unit, the replacement lens continues moving the focus lens unit according to the most recent instructions until new instructions are received. When the camera body determines that the focus lens unit has reached the end of the preset range, based on the current position of the focus lens unit, the camera body transmits stop instructions to stop the movement. Therefore, at the timing when the replacement lens stops the movement of the focus lens unit according to the stop instructions, there are cases where the focus lens unit is already beyond the preset range. (Third Problem)

SUMMARY

To solve the first problem, according to a first aspect of the present invention, provided is a lens barrel attached to an imaging device, comprising a focus lens unit that is movable in an optical axis direction; an actuator that moves the focus lens unit along the optical axis direction; a drive control section that controls drive of the actuator; and a setting section that is capable of setting a movement range of the focus lens unit to be one of a first range and a second range that differ from each other with respect to at least one of one end and another end thereof, each range defining the range in which the focus lens unit is allowed to move. Even when the movement range of the focus lens unit is set by the setting section to be one of the first range and the second range, the drive control section removes the setting of the movement range when instructions are received from the imaging device.

According to a second aspect of the present invention, provided is an imaging device to which can be attached a replacement lens capable of setting a movement range of a focus lens unit to be one of a first range and a second range that differ from each other with respect to at least one of one end and another end thereof, each range defining a range in which the focus lens unit is allowed to move, the imaging device comprising a transmitting section that, regardless of the setting of the replacement lens, transmits the range in which the focus lens unit is allowed to move.

According to a third aspect of the present invention, provided is a control program used by a replacement lens that is attached to an imaging device and includes a focus lens unit that is movable in an optical axis direction and an actuator that moves the focus lens unit along the optical axis direction. The control program causes a computer to perform a setting step of setting a movement range of the focus lens unit to be one of a first range and a second range that differ from each other with respect to at least one of one end and another end thereof, each range defining the range in which the focus lens unit is allowed to move; and a drive step of, even when the movement range of the focus lens unit is set in the setting step to be one of the first range and the second range, driving the actuator in a manner to remove the setting of the movement range when instructions are received from the imaging device.

According to a fourth aspect of the present invention, provided is a control program used by an imaging device that is attachable to a replacement lens capable of setting a movement range of a focus lens unit to be one of a first range and a second range that differ from each other with respect to at least one of one end and another end thereof, each range defining the range in which the focus lens unit is allowed to move. The control program causes a computer to perform a transmission step of, regardless of the setting of the replacement lens, transmitting the range in which the focus lens unit is allowed to move.

To solve the second problem, according to a fifth aspect of the present invention, provided is a replacement lens attached to an imaging device, comprising a focus lens unit; an actuator that drives the focus lens unit; and a drive control section that, when an allowable range in which the focus lens unit is allowed to move is switched from a first range to a second range that is narrower than the first range, limits movement instructions for the focus lens unit resulting from a user manipulation and drives the actuator.

According to a sixth aspect of the present invention, provided is an imaging device comprising a receiving section that receives first information relating to a first range that is a range in which a focus lens unit is allowed to move, second information relating to a second range that is a narrower range than the first range, and movement instructions for the focus lens unit resulting from a user manipulation; a selecting section that selects the first information or the second information; and a drive control section that controls drive of the focus lens unit. When the range in which the focus lens unit is allowed to move is switched from the first range to the second range, the drive control section limits the movement instructions for the focus lens unit resulting from the user manipulation.

According to a seventh aspect of the present invention, provided is a control program of a replacement lens that is attached to an imaging device and includes a focus lens unit and an actuator for driving the focus lens unit. The control program causes a computer to perform a switching step of switching an allowable range in which the focus lens unit is allowed to move from a first range to a second range that is narrower than the first range; a receiving step of receiving movement instructions for the focus lens unit resulting from a user manipulation; and a drive control step of driving the actuator while limiting the movement instructions.

According to an eighth aspect of the present invention, provided is a control program performing control from an imaging device having attached thereto a replacement lens that includes a focus lens unit and an actuator for driving the focus lens unit. The control program causes a computer to perform a receiving step of receiving first information relating to a first range that is a range in which the focus lens unit is allowed to move, second information relating to a second range that is a narrower range than the first range, and movement instructions for the focus lens unit resulting from a user manipulation; a selection step of selecting the first information or the second information; and a drive control step of, when the range in which the focus lens unit is allowed to move is switched from the first range to the second range, controlling the drive of the focus lens unit by limiting the movement instructions for the focus lens unit resulting from the user manipulation.

To solve the third problem, according to a ninth aspect of the present invention, provided is An imaging device having attached thereto and removed therefrom a replacement lens including a focus lens unit that is driven by an actuator, the imaging device comprising an acquiring section that acquires mobility information relating to a movable range of the focus lens unit; and a transmitting section that transmits response information based on the mobility information to the replacement lens, in association with a drive signal for driving the focus lens unit.

According to a tenth aspect of the present invention, provided is a replacement lens attached to an imaging device, comprising a focus lens unit; an actuator that drives the focus lens unit; a receiving section that receives a drive signal for driving the focus lens unit from the imaging device; and a drive control section that, when response information based on mobility information relating to a movable range of the focus lens unit is associated with the drive signal, drives the actuator based on the response information.

According to an eleventh aspect of the present invention, provided is a control program used by an imaging device having attached thereto and removed therefrom a replacement lens including a focus lens unit that is driven by an actuator. The control program causes a computer to perform an acquisition step of acquiring mobility information relating to a movable range of the focus lens unit; and a transmission step of transmitting response information based on the mobility information to the replacement lens, in association with a drive signal for driving the focus lens unit.

According to a twelfth aspect of the present invention, provided is a control program used by a replacement lens attached to an imaging device. The control program causes a computer to perform a reception step of receiving a drive signal for driving a focus lens unit included in the replacement lens from the imaging device; and a drive control step of, when response information based on mobility information relating to a movable range of the focus lens unit is associated with the drive signal, driving an actuator for moving the focus lens unit based on the response information.

The summary clause does not necessarily describe all necessary features of the embodiments of the present invention. The present invention may also be a sub-combination of the features described above.

BRIEF DESCRIPTION OF THE DRAWINGS

FIG. 24A is a drawing for describing the control command designating the drive of the focus lens unit 3212.

FIG. 24B is a drawing for describing the control command designating the drive of the focus lens unit 3212.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
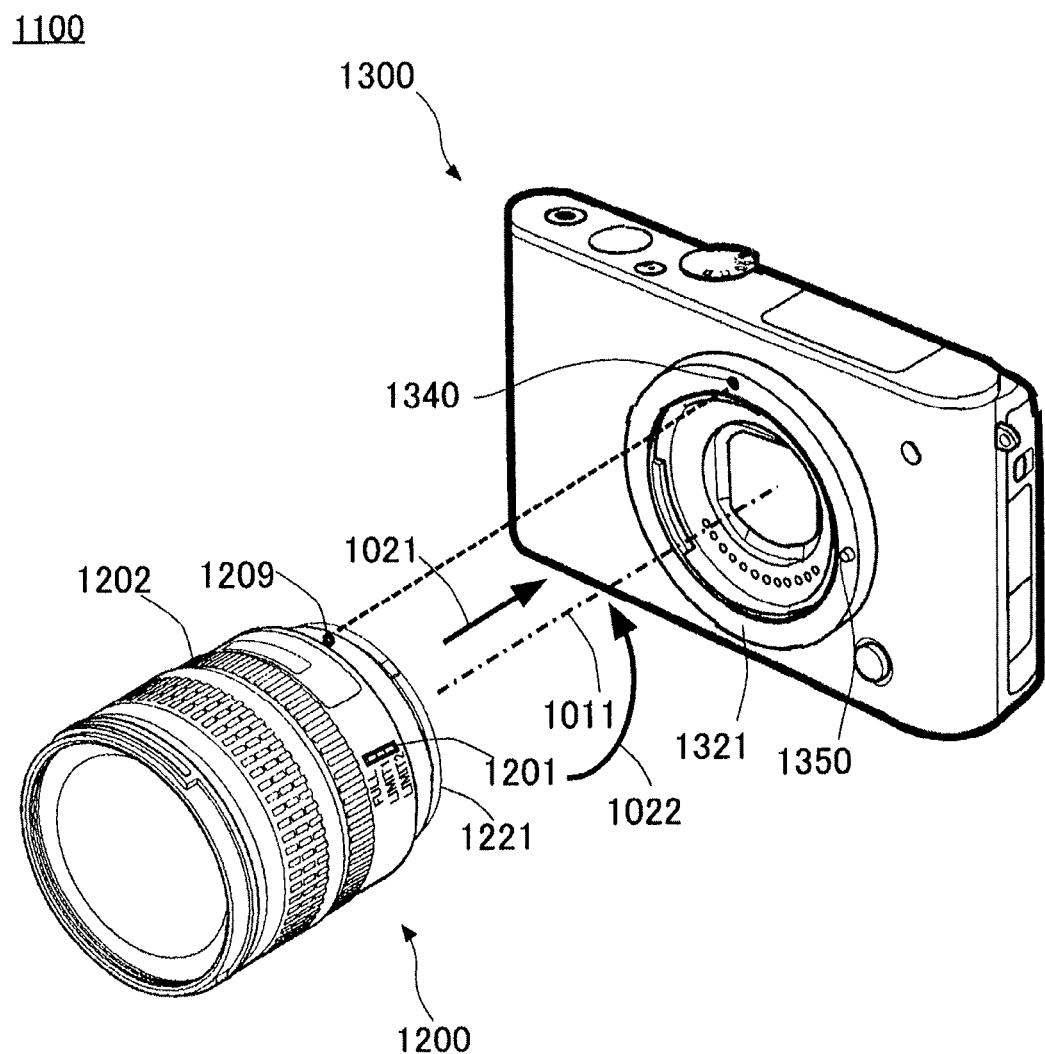
FIG. 1 is an external perspective view of a camera system according to a first embodiment.

FIG. 1 is an external perspective view of a camera system 1100 according to a first embodiment. The camera system 1100 is a single-lens reflex camera with a replacement lens formed by attaching a replacement lens 1200 to a camera body 1300 serving as an imaging device. The replacement lens 1200 includes a lens mount 1221, and the camera body 1300 includes a camera mount 1321. When the lens mount 1221 and the camera mount 1321 engage with each other to form the replacement lens 1200 and the camera body 1300 integrally, the replacement lens 1200 and the camera body 1300 function as the camera system 1100.

The lens mount 1221 is brought near the camera mount 1321 along the arrow 1021 parallel to the optical axis 1011, such that the lens marker 1209 and the body marker 1340 face each other and are in contact with each other. Furthermore, the replacement lens 1200 is rotated in the direction of the arrow 1022 while contact is maintained between the mounting surface of the lens mount 1221 and the mounting surface of the camera mount 1321. When this happens, the lock mechanism formed by the lock pin 1350 operates to secure the replacement lens 1200 to the camera body 1300. In this state, a connection terminal on the replacement lens 1200 side is electrically connected to a connection terminal on the camera body 1300 side. As a result, it is possible to transfer power and communication such as control signals between the replacement lens 1200 and the camera body 1300.

The replacement lens 1200 includes a focus limit switching switch 1201 serving as a switching section and a focus ring 1202. The focus limit switching switch 1201 switches between a first range, which is a range in which movement of the focus lens unit is allowed, and a second range that is different from the first range. By switching the focus limit switching switch 1201, a user can select a drive range for the focus lens unit. In the present embodiment, the first range is a range in which there is no focus limit, and the second range is a range that is narrower than the first range, i.e. a range in which there is a focus limit. In the present embodiment, two focus limits are set as the second range. As described in detail further below, a focus limit for an infinitely far region and a focus limit for a very close region are set.

The user can set the first range by switching the focus limit switching switch 1201 to FULL, set the focus limit for the infinitely far region by switching the focus limit switching switch 1201 to LIMIT 1, and set the focus limit for the very close region by switching the focus limit switching switch 1201 to LIMIT 2. In other words, it is possible to select any one of three positions by switching the focus limit switching switch 1201. By limiting the movement range of the focus lens unit, it is possible to shorten the focusing time. Regardless of which of the three positions the focus limit switching switch 1201 is switched to, the replacement lens 1200 transmits both first information relating to the first range and second information relating to the second range to the camera body 1300. Furthermore, the replacement lens 1200 transmits switch state information as setting information indicating which of the three positions is switched to.

The camera body 1300 receives both the first information and the second information, and also the switch state information. The camera body 1300 moves the focus lens unit in the drive range of the focus lens unit corresponding to the switch state information. However, as described in detail further below, there are cases where it is undesirable for the focus lens unit to be driven in the drive range corresponding to the switch state information, depending on the state of the settings relating to image capturing on the camera body 1300 side. Therefore, the camera body 1300 selects any one of the first range and the second range according to the state of the settings relating to the image capturing, in addition to the switch state information, and moves the focus lens unit according to the selected range. Since the drive range of the focus lens unit is selected according to the state of the settings relating to image capturing, this drive range can be determined with flexibility.

Figure 2:
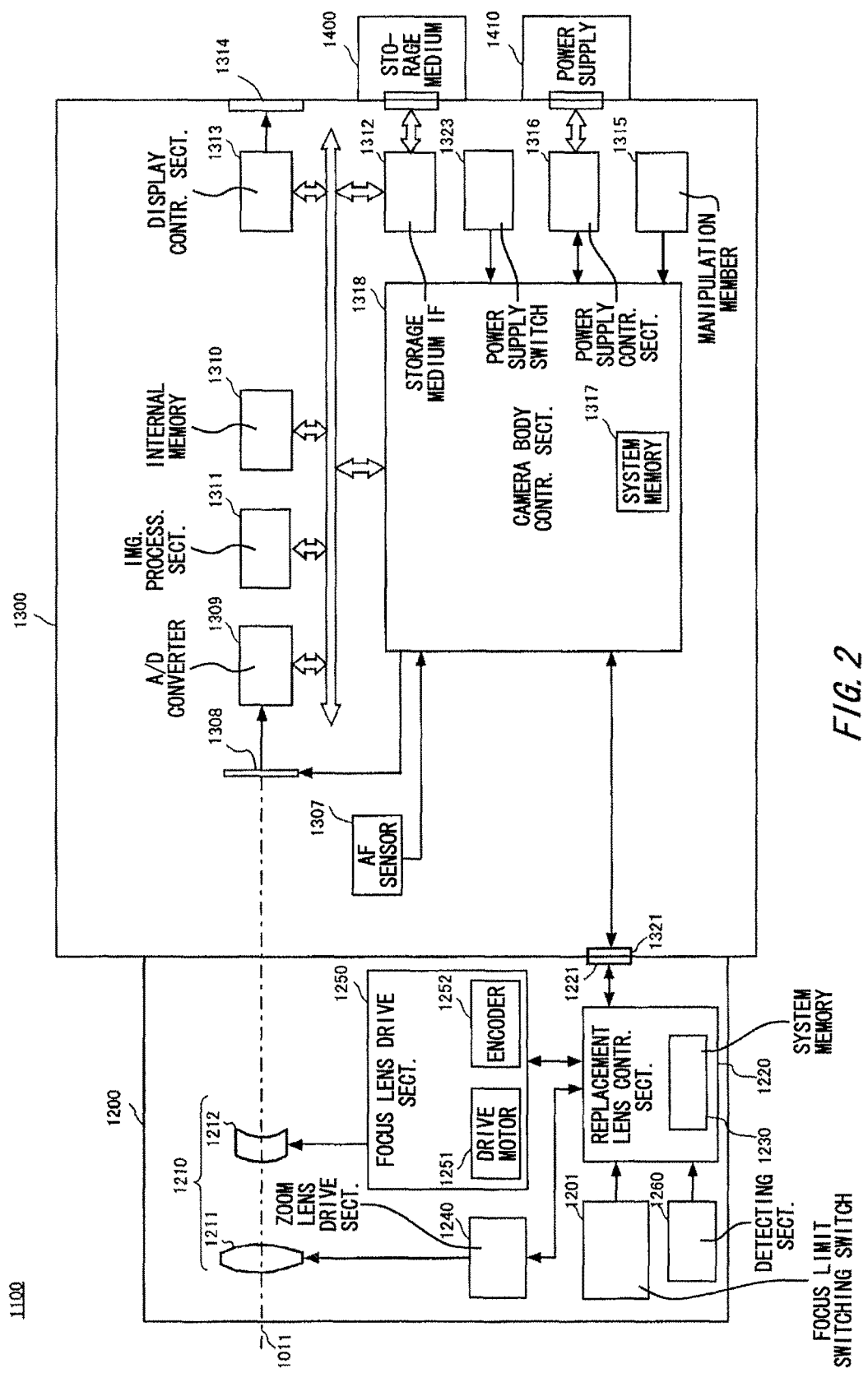
FIG. 2 is a drawing for describing the configuration of the camera system.

FIG. 2 is a drawing for describing the configuration of the camera system 1100. The replacement lens 1200 includes, in addition to the focus limit switching switch 1201 and the focus ring 1202, an image capturing lens 1210, a replacement lens control section 1220, a zoom lens drive section 1240, a focus lens drive section 1250, and a detecting section 1260 serving together as an image capturing optical system. The camera body 1300 includes an AF sensor 1307, an imaging element 1308, an A/D converter 1309, an internal memory 1310, an image processing section 1311, a storage medium IF 1312, a display control section 1313, a display section 1314, a manipulation member 1315, a power supply control section 1316, a camera body control section 1318, and a power supply switch 1323.

The replacement lens control section 1220 and the camera body control section 1318 are connected to each other via the lens mount 1221 and the camera mount 1321. The replacement lens control section 1220 and the camera body control section 1318 work together while communicating with each other to control the replacement lens 1200 and the camera body 1300.

There are a plurality of types of replacement lenses 1200 with different optical characteristics. The user can attach any one of these replacement lenses 1200 to the camera body 1300. The image capturing lens 1210 included in the replacement lens 1200 is formed by a plurality of optical lens groups. Specifically, the image capturing lens 1210 is formed by a zoom lens unit 1211 and a focus lens unit 1212. The image capturing lens 1210 guides subject light flux incident thereto along an optical axis 1011 to an imaging element 1308 arranged within the camera body 1300.

A portion of the subject light flux that transparently passes through the optical system to be incident thereto is guided to the AF sensor 1307. The AF sensor 1307 includes a plurality of photoelectric converting element columns that receive a portion of the subject light flux guided thereto. The AF sensor 1307 outputs signals with matching phases when in the focused state and outputs signals with relatively shifted phases when in a front focus state or rear focus state. The amount of the phase shift corresponds to the amount of shift from the focus state. The AF sensor 1307 detects the phase difference by calculating the correlation of the output of the photoelectric converting element columns, and outputs a phase difference signal indicating the phase difference to the camera body control section 1318. The camera body control section 1318 outputs a control signal for moving the focus lens unit 1212 to a target position to the replacement lens control section 1220. The camera body 1300 need not include the AF sensor 1307 as a separate component from the imaging element 1308, and may include the imaging element 1308 that has pixels with a distance measuring function.

The imaging element 1308 is an element that photoelectrically converts an optical image, which is the subject image. A CCD sensor or CMOS sensor can be used as the imaging element 1308. The subject image resulting from the photoelectric conversion by the imaging element 1308 is converted from an analog signal into a digital signal by the A/D converter 1309.

The subject image that has been converted into a digital signal is sequentially processed as image data. The image data is temporarily stored in the internal memory 1310. The internal memory 1310 is a random access memory that can perform reading and writing at high speed. A DRAM and an SRAM can be used as the internal memory 1310. The internal memory 1310 serves as a work memory in which the image processing section 1311 performs image processing and a compression process. The internal memory 1310 has a memory capacity sufficient for fulfilling this role.

The image processing section 1311 converts the image data into image data in compliance with a prescribed image format, according to the set image capturing mode and instructions from the user. For example, when generating a JPEG file as a still image, a compression process is performed by applying a suitable discrete cosine transformation or the like after performing image processing such as a color conversion process, gamma process, or a white balance process. The converted image data is again stored in the internal memory 1310.

The image data processed by the image processing section 1311 is stored in the storage medium 1400 from the internal memory 1310, via the storage medium IF 1312. The storage medium 1400 is a non-volatile memory that can be attached to and removed from the camera body 1300 and is formed by a flash memory or the like. The image processing section 1311 generates the image data to be displayed, in parallel with the processed image data to be stored. The generated image data to be displayed is displayed in the display section 1314 under the control of the display control section 1313. Regardless of whether storage is performed, the camera body control section 1318 can present a live view as an electronic finder function by having the image processing section 1311 generate sequential pieces of image data to be displayed and having the display section 1314 display this image data. Furthermore, it is possible to display an indicator or the like relating to the focus limit, which is described further below, in the display section 1314.

The power supply control section 1316 communicates with the power supply 1410 to detect the remaining power, monitor the power supply, supply power, and the like. The power supply 1410 is formed by a battery, for example.

The camera body 1300 includes each element used for the image processing described above, and is directly or indirectly controlled by the camera body control section 1318. The camera body control section 1318 includes a system memory 1317. The system memory 1317 is a non-volatile memory that can be electrically erased and recorded on, and is formed by an EEPROM (Registered Trademark) or the like, for example. The system memory 1317 stores constants, variables, programs, and the like that are needed when the camera system 1100 operates, such that this information is not lost when the camera system 1100 is not operating. The camera body control section 1318 suitably extracts these constants, variables, programs, and the like in the internal memory 1310 and uses this information to control the camera system 1100. The camera body control section 1318 functions as a receiving section that receives the first information and the second information, a selecting section that selects one of the first information and the second information based on the setting information relating to image capturing, and a control section that controls the driving of the focus lens unit 1212 according to the selected first information or second information. The camera body control section 1318 may drive the focus lens unit 1212 such that the subject image in a specified region is in focus on the light receiving surface of the imaging element 1308, according to contrast AF information using the pieces of image data acquired in series.

The camera system 1100 includes a plurality of manipulation members 1315 that receive manipulations from the user. The manipulation members 1315 are used to set the image capturing mode, for example. The image capturing mode includes a full auto mode, a scene mode, and a manual mode. The user can set the image capturing mode by manipulating the manipulation members 1315. The camera body control section 1318 detects that these manipulation members 1315 have been manipulated and performs operations according to the manipulations.

The camera system 1100 includes a release switch serving as one type of manipulation member 1315. The release switch is formed by a press button that can detect two stages in a pressing direction. The camera body control section 1318 performs AF or the like, which is an image capturing preparation operation, in response to detecting SW1, which is a first-stage press, and performs an operation to acquire the subject image with the imaging element 1308 in response to detecting SW2, which is a second-stage press.

The zoom lens unit 1211 is driven by the zoom lens drive section 1240, under the overall control of the camera body control section 1318 and the replacement lens control section 1220. The zoom lens drive section 1240 changes the field angle by driving the zoom lens unit 1211 according to instructions from the user.

The focus lens unit 1212 is driven by the focus lens drive section 1250, under the overall control of the camera body control section 1318 and the replacement lens control section 1220. The focus lens drive section 1250 drives the focus lens unit 1212 such that the subject image of a specified region is focused on the light receiving surface of the imaging element 1308, according to the information of the AF sensor 1307. The focus lens drive section 1250 includes a drive motor 1251 serving as an actuator for driving the focus lens unit 1212 and an encoder 1252 for detecting the position of the focus lens unit 1212. The information indicating the current position of the focus lens unit 1212 detected by the encoder 1252 is transmitted to the camera body control section 1318 via the replacement lens control section 1220.

The replacement lens control section 1220 includes a system memory 1230. The system memory 1230 stores information relating to the replacement lens 1200. Lens function information indicating that the replacement lens includes the focus limit switching switch 1201, a set including first pulse information indicating the first range and second pulse information indicating the second range, display information relating to the display of the focus limit, and the like are stored as the information relating to the replacement lens 1200. A plurality of the sets of the first pulse information and the second pulse information are stored, according to the focal distance. The display information relating to the display of the focus limit includes limited position information for the focus lens unit 1212 corresponding to the state of the focus limit switching switch 1201 and the number of divisions of the distance position of the focus lens unit 1212 at the current zoom position. A plurality of pieces of the display information relating to the display of the focus limit are also stored according to the focal distance.

When communication is established with the camera body control section 1318, the replacement lens control section 1220 transmits the information relating to the replacement lens 1200 to the camera body control section 1318. For example, the replacement lens control section 1220 transmits the lens function information described above. After this, every time polling is received from the camera body 1300, the set of the first pulse information and the second pulse information and the switch state information are transmitted. Furthermore, the replacement lens control section 1220 transmits the limited position information for the focus lens unit 1212 corresponding to the state of the focus limit switching switch 1201, the distance position information of the focus lens unit 1212 at the current zoom position, and the number of divisions of the distance position at the current zoom position.

The replacement lens control section 1220 functions as a drive control section that drives the drive motor 1251 according to the second range in response to instructions from the camera body even when the allowable movement range of the focus lens unit 1212 is switched to the first range and drives the drive motor 1251 according to the first range in response to instructions from the camera body 1300 even when the allowable movement range of the focus lens unit 1212 is switched to the second range. The replacement lens control section 1220 drives the drive motor 1251 to move the focus lens unit 1212, and controls the driving of the drive motor 1251 based on the pulse information detected by the encoder 1252.

The detecting section 1260 detects the rotation amount per unit time of the focus ring 1202 due to the manipulation by the user. When the manual focus manipulation is performed by the user, the replacement lens control section 1220 transmits the detected rotation amount per unit time to the camera body control section 1318. The focus lens unit 1212 is then driven according to the drive instructions from the camera body control section 1318.

Figure 3:
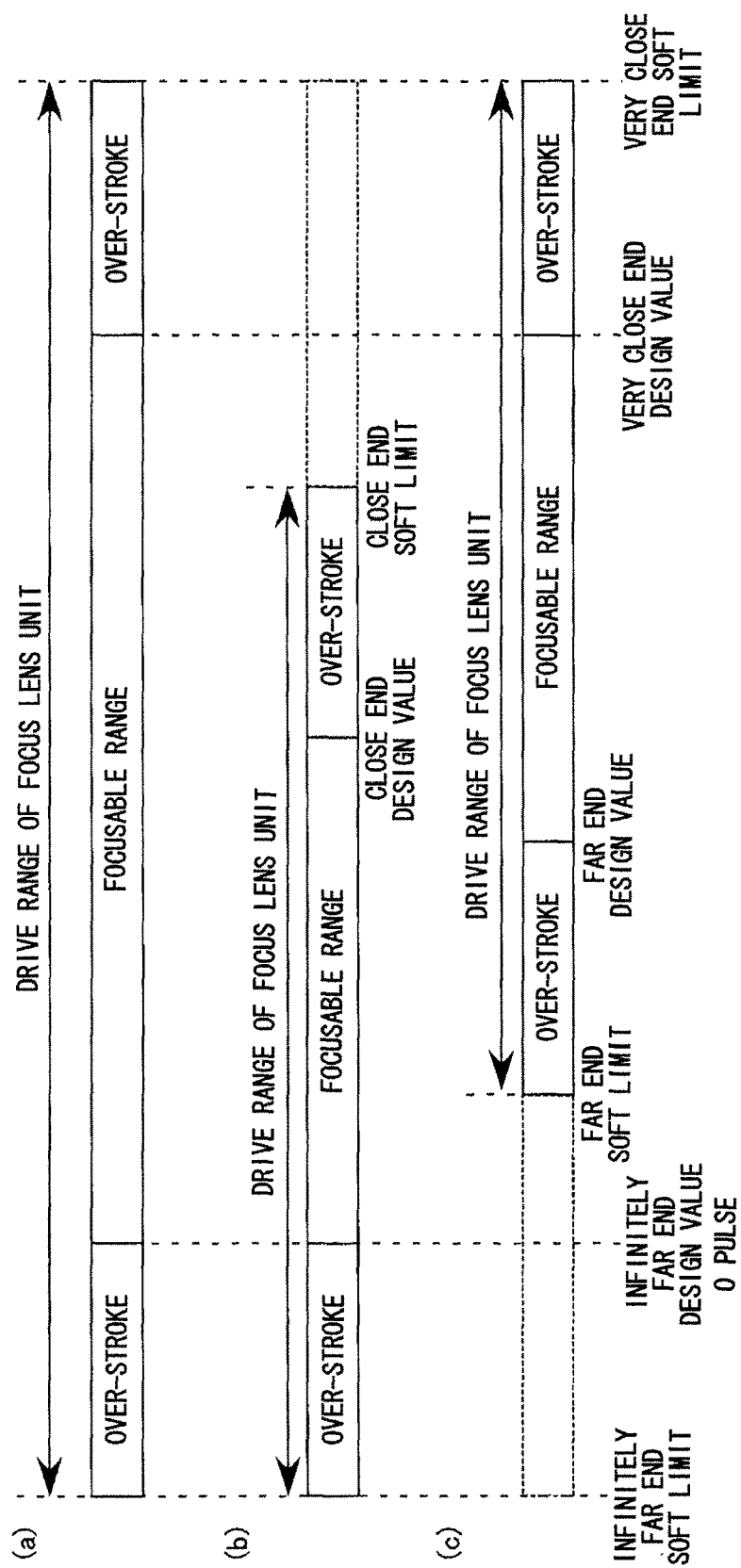
FIG. 3 is a drawing for describing the first range and the second range.

FIG. 3 is a drawing for describing the first range and the second range. Portion (a) in FIG. 3 is used to describe the first range. Portions (b) and (c) in FIG. 3 are used to describe the second range. Specifically, portion (b) in FIG. 3 is used to describe the focus limit for an infinitely far region, and portion (c) in FIG. 3 is used to describe the focus limit for a very close region. In the present embodiment, an infinitely far end design value is set as the reference for the drive range of the focus lens unit 1212, i.e. a 0 pulse, and the number of pulses for each type of soft limit and each type of design value described further below are determined.

As shown in portion (a) of FIG. 3, the very close end design value is a value indicating the end point of the focusable range on the very close side. In the first range, the focus lens unit 1212 can achieve focus in the range between the infinitely far end design value and the very close end design value. Furthermore, the infinitely far end soft limit on the infinitely far side is determined from the infinitely far end design value and the very close end soft limit on the very close side is determined from the very close end design value. The infinitely far end soft limit is a value indicating the end point of the drive range of the focus lens unit 1212 determined in advance on the infinitely far side. The very close end soft limit is a value indicating the end point of the drive range of the focus lens unit 1212 determined in advance on the very close side. The range from the infinitely far end design value to the infinitely far end soft limit and the range from the very close end design value to the very close end soft limit are over-stroke ranges that are outside of the focusable range. In a case where the camera body 1300 performs contrast AF, when focus is achieved at the infinitely far end design value, for example, the focal point temporarily moves to the infinitely far side of the infinitely far end design value. Therefore, in the present embodiment, the over-stroke range is established by determining the infinitely far end soft limit. The same is true for the very close end soft limit.

At the focus limit for the infinitely far region, the focusable range is limited to be near an infinitely far position, as shown in portion (b) of FIG. 3. More specifically, a close end design value is determined to be on the infinitely far side from the very close end design value. The close end design value is a value indicating the end point of the focusable range on the very close side. The focus lens unit 1212 can focus in the range between the infinitely far end design value and the close end design value. Furthermore, the close end soft limit is determined between the close end design value and the very close end design value. The close end soft limit is a value indicating the end point of the drive range of the focus lens unit 1212 on the very close side. The range from the infinitely far end design value to the infinitely far end soft limit and the range from the close end design value to the close end soft limit are over-stroke ranges.

At the focus limit for the very close region, the focusable range is limited to be near the very close end, as shown in portion (c) of FIG. 3. More specifically, a far end design value is determined to be on the very close side from the infinitely far end design value. The far end design value is a value indicating the end point of the focusable range on the infinitely far side. The focus lens unit 1212 can focus in the range between the far end design value and the very close end design value. Furthermore, a far end soft limit is determined between the far end design value and the infinitely far end design value. The far end soft limit is a value indicating the end point of the drive range of the focus lens unit 1212 on the infinitely far side. The range from the far end design value to the far end soft limit and the range from the very close end design value to the very close end soft limit are over-stroke ranges.

Figure 4:
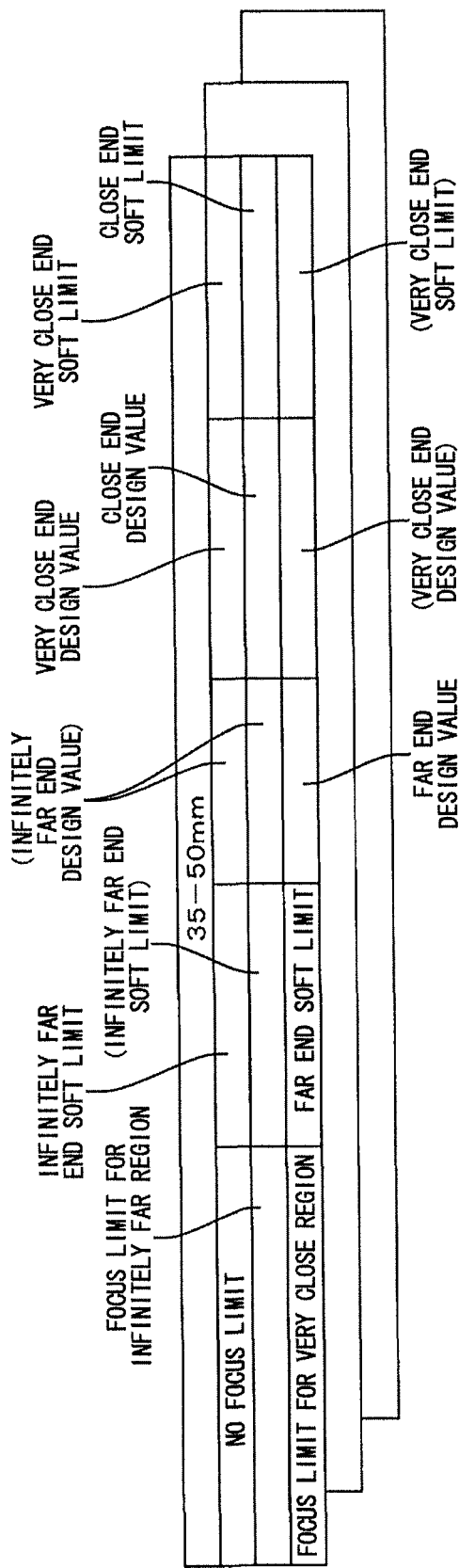
FIG. 4 is a drawing for describing the first information and the second information.

FIG. 4 is a drawing for describing the first information and the second information. As described above, the system memory 1230 stores a plurality of sets that each include the first information and the second information, according to the focal distance. If the focal distance of the zoom lens unit 1211 is from 35 mm to 100 mm, the system memory 1230 stores a set of the first information and the second information corresponding to each of three ranges, which are a range from 35 mm to 50 mm, a range from 50 mm to 75 mm, and a range from 75 mm to 100 mm, for example. FIG. 4 shows the various design values indicating the ends of the drive range of the focus lens unit 1212 and the various soft limits indicating the ends of the focusable range in the case where the focal distance is a range from 35 mm to 100 mm. The various design values and various soft limits surrounded by the parentheses in the drawing need not be transmitted to the camera body 1300, as described further below.

The replacement lens 1200 transmits the infinitely far end soft limit and the very close end soft limit to the camera body 1300 as the first information corresponding to there being no focus limit. In the present embodiment, the replacement lens 1200 also transmits the infinitely far end design value and the very close end design value as information indicating the focusable range. The infinitely far end design value is set to 0, and therefore the replacement lens control section 1220 need not transmit this value to the camera body 1300.

The replacement lens 1200 transmits the close end soft limit as the second information indicating the focus limit for the infinitely far region. In the present embodiment, the replacement lens 1200 also transmits the close end design value as information indicating the focusable range. The infinitely far end soft limit is the same as in the first information, and therefore does not need to be transmitted. Furthermore, the far end soft limit is transmitted as second information indicating the focus limit for a very close region. In the present embodiment, the replacement lens 1200 also transmits the far end design value as information indicating the focusable range. The very close end design value and the very close end soft limit are the same as in the first information, and therefore do not need to be transmitted.

As described above, the infinitely far end soft limit and the very close end soft limit are each set as a number of pulses. Accordingly, the first information is expressed as pulse information. Similarly, the close end soft limit and the far end soft limit are also each set as a number of pulses. Accordingly, the second information is also expressed as pulse information.

When moving the focus lens unit 1212, the camera body 1300 transmits control signal drive instructions relating to a target position, such as a lens drive amount expressed as a number of pulses, from the camera body control section 1318 to the replacement lens control section 1220. After receiving the drive instructions for the focus lens unit 1212 from the camera body control section 1318, the replacement lens control section 1220 drives the drive motor 1251 to move the focus lens unit 1212. The replacement lens control section 1220 detects the position of the focus lens unit 1212 using the encoder 1252 and drives the drive motor 1251 until reaching the number of pulses transmitted from the camera body control section 1318. Here, when moving the focus lens unit 1212 from the infinitely far end to the very close end, for example, the focus lens unit 1212 is driven by a pulse amount indicated by the very close end design value corresponding to the current focal distance. For example, if the focal distance is from 35 mm to 50 mm and the very close end design value for this focal distance is 3000 pulses, the camera body control section 1318 transmits instructions for 3000 pulses of driving to the replacement lens control section 1220. In the same manner, when the focal distance is from 50 mm to 75 mm and the very close end design value for this focal distance is 2800 pulses, the camera body control section 1318 transmits instructions for 2800 pulses of driving to the replacement lens control section 1220. As described above, the number of pulses indicated by the very close end design value differs according to the focal distance. By transmitting a number of pulses corresponding to the focal distance to the replacement lens control section 1220, it is possible to suitably control the driving of the focus lens unit 1212.

Figure 5:
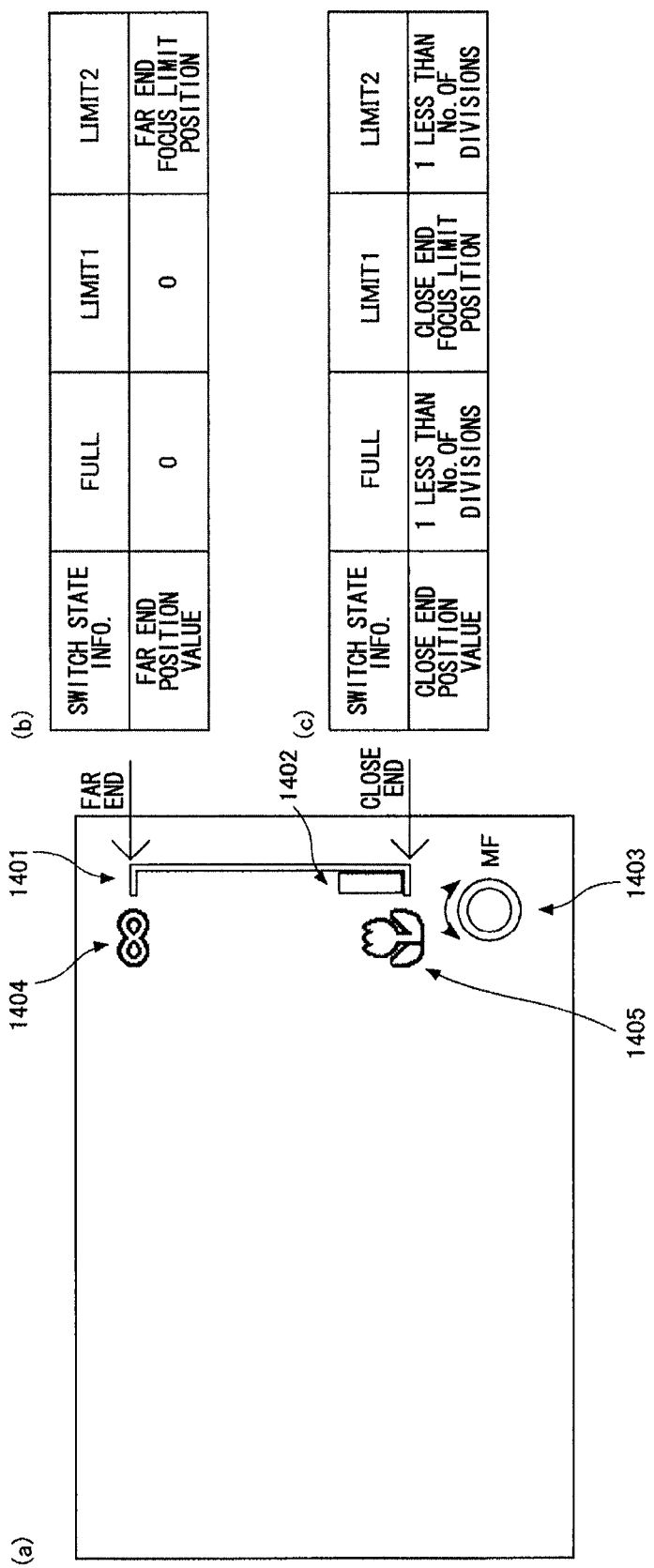
FIG. 5 is a drawing for describing the display control of an indicator relating to the focus limit when an MF manipulation is performed.

FIG. 5 is a drawing for describing the display control of an indicator relating to the focus limit when an MF manipulation is performed. Portion (a) in FIG. 5 shows an exemplary MF manipulation screen in a state where there is no focus limit. The camera body control section 1318 displays a display bar 1401, a focus lens unit position 1402 that is information indicating the current position of the focus lens unit 1212, and an MF manipulation guide 1403 in the MF manipulation screen. Furthermore, the camera body control section 1318 displays a marker 1404 indicating the far end of the display bar 1401 and a marker 1405 indicating the close end of the display bar 1401. The user can manipulate the focus ring 1202 while checking the position of the focus lens unit 1212 with the display bar 1401.

The camera body control section 1318 displays the focus lens unit position 1402 according to the number of divisions of the distance position at the current zoom position. Here, the number of divisions of the distance position indicates the resolution in the display of the display bar 1401. For example, if the number of divisions is 100, it is possible to display the focus lens unit position 1402 at 100 stages. In the present embodiment, the number of divisions is determined using the infinitely far end as a reference. In other words, the position value is 0 at the infinitely far end. As the position becomes closer to the very close side, the position value increases and reaches a maximum value at the very close end. Using the example described above, the position value is 99 at the very close end. The camera body control section 1318 displays the focus lens unit position 1402 according to the distance position value indicated in the distance position information. As described above, the camera body control section 1318 displays the focus lens unit position 1402 in the display bar 1401 in a manner to correspond to the position corresponding to the current position of the focus lens unit 1212.

The display of the focus lens unit position 1402 changes according to the manipulation of the focus ring 1202 by the user. When the number of divisions of the distance position at the current zoom position of the focus lens unit 1212 is 100, the variable X indicating the focus lens unit position 1402 is calculated as shown by Expression 1 below.

$$X = (1 - ((A-C)/(B-C))) \times 100 \qquad \text{Expression 1:}$$

It should be noted that A indicates the current focus lens unit position 1402, B indicates the close end position value, and C indicates the far end position value. Furthermore, the focus lens unit position 1402 is set such that the closest position is 0. Here, X is calculated by replacing A with C if A−C≤0, and X is calculated by replacing A with B if B−A≤0. The camera body control section 1318 determines the close end position value and the far end position value according to the state indicated by the switch state information.

Portion (b) in FIG. 5 shows the relationship between the state indicated by the switch state information and the far end position value, and portion (c) in FIG. 5 shows the relationship between the state indicated by the switch state information and the close end position value. The far end position value and the close end position value can each be one of three values according to the state indicated by the switch state information.

As shown in portion (b) of FIG. 5, the far end position value is set to 0 when the switch state information indicates FULL. The far end position value is also set to 0 when the switch state information indicates LIMIT 1. When the switch state information indicates LIMIT 2, the far end position value is set to the far end focus limit position value. The far end focus limit position value is set according to the focal distance.

As shown by portion (c) in FIG. 5, the close end position value is set to a value equal to 1 less than the number of divisions of the distance position when the switch state information indicates FULL. When the switch state information indicates LIMIT 1, the close end position value is set to the close end focus limit position value. The close end focus limit position value is set according to the focal distance. When the switch state information indicates LIMIT 2, the close end position value is set to a value equal to 1 less than the number of divisions of the distance position.

Figure 6:
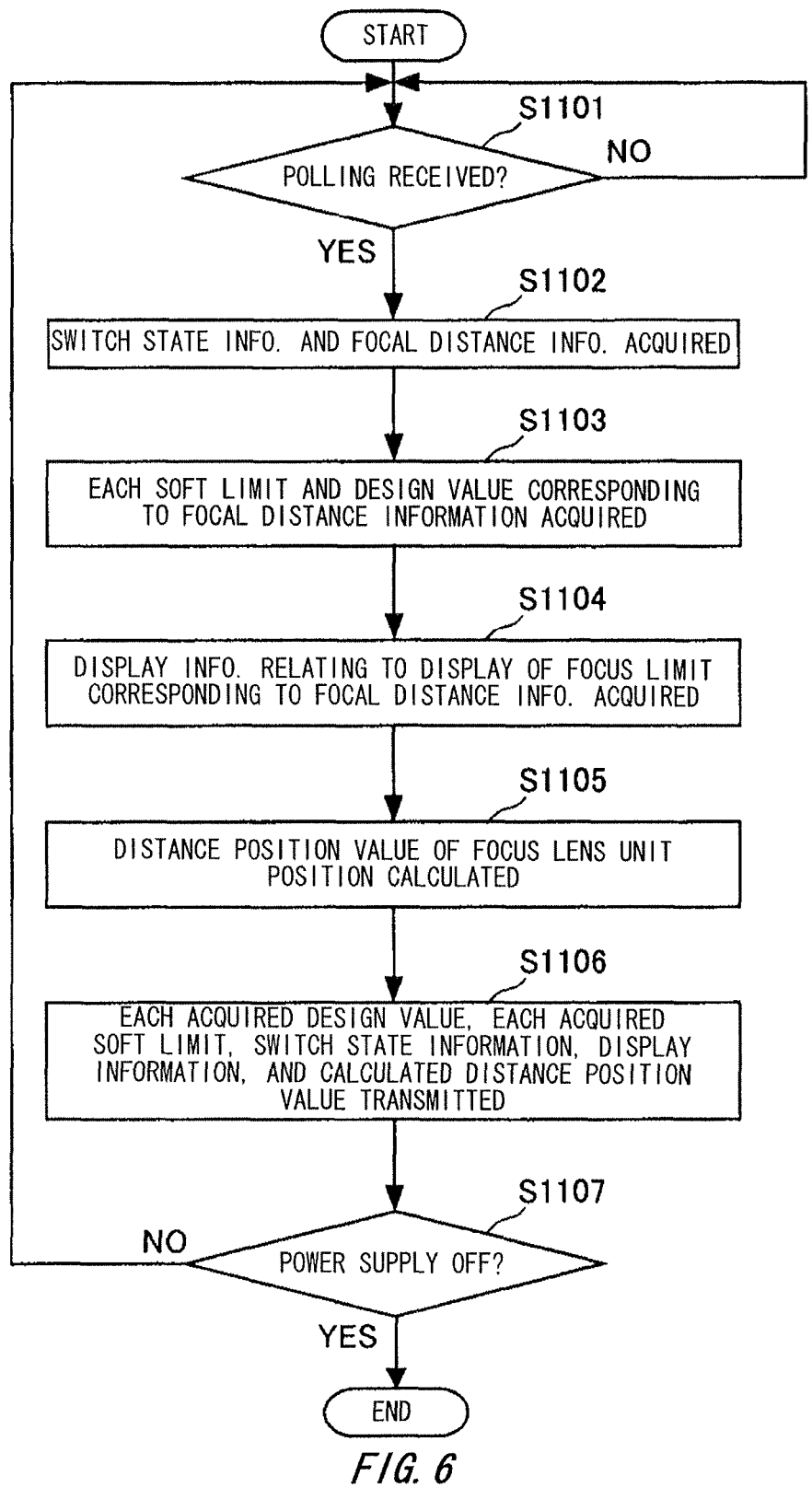
FIG. 6 is a flow chart showing an exemplary process relating to a steady sequence of the replacement lens.

FIG. 6 is a flow chart showing an exemplary process relating to a steady sequence of the replacement lens 1200. This flow is begun after the end of a series of activation sequences that include a process for transmitting the lens function information to the camera body 1300, a process for initializing the replacement lens 1200, and the like. During the initialization process, upon receiving an initialization execution command from the camera body control section 1318, the replacement lens control section 1220 drives the focus lens unit 1212 into the range corresponding to the switch state information at the time when the initialization process is begun.

The replacement lens control section 1220 judges whether polling has been received from the camera body control section 1318 (step S1101). If it is judged that polling has been received (YES at step S1101), the replacement lens control section 1220 acquires the switch state information and the focal distance information indicating the selected focal distance (step S1102). The replacement lens control section 1220 then acquires the various design values and various soft limits corresponding to the focal distance information (step S1103). For example, if the selected focal distance is from 35 mm to 50 mm, the replacement lens control section 1220 acquires the various design values and the various soft limits corresponding to the 35 mm to 50 mm range shown in FIG. 4.

The replacement lens control section 1220 acquires the display information relating to the display of the focus limit corresponding to the focal distance information (step S1104). The replacement lens control section 1220 uses the acquired display information to calculate the distance position value of the focus lens unit position 1402, as described in FIG. 5 (step S1105). The replacement lens control section 1220 then transmits the various acquired design values, the various acquired soft limits, the switch state information, the display information, and the calculated distance position value to the camera body control section 1318 (step S1106). The replacement lens control section 1220 judges whether the power supply has been turned OFF (step S1107), and when it is judged that the power supply has not been turned OFF (NO at step S1107), the process moves to step S1101. When it is judged that the power supply has been turned OFF (YES at step S1107), the series of processes is finished.

As described above, the replacement lens control section 1220 transmits the information relating to the focus limit to the camera body control section 1318 every time the polling is received. Accordingly, the camera body 1300 can perform the lens control and the display control using the newest focus limit range.

Figure 7:
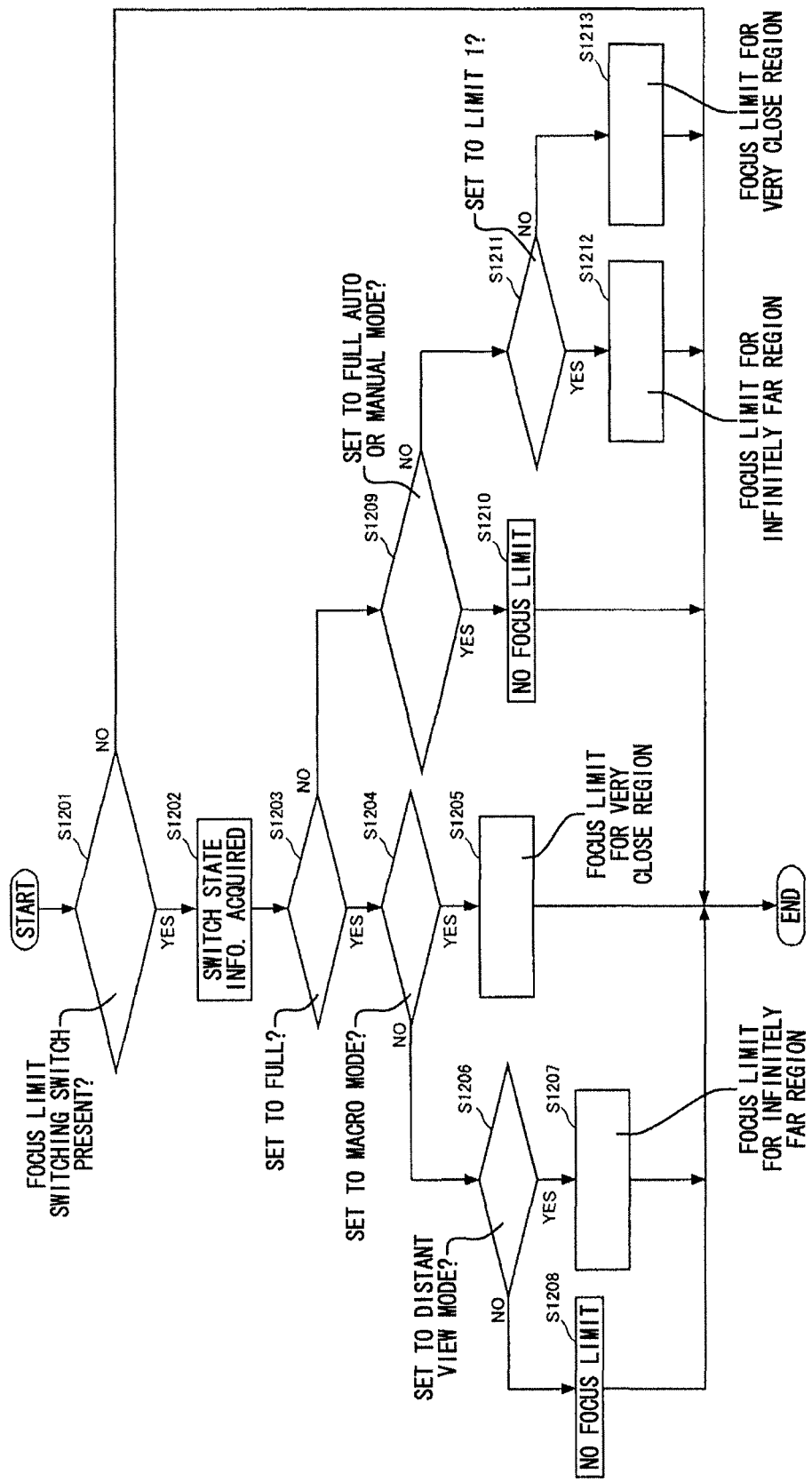
FIG. 7 is a flow chart showing an exemplary process for selecting the drive range of the focus lens unit performed by the camera body.

FIG. 7 is a flow chart showing an exemplary process for selecting the drive range of the focus lens unit 1212 performed by the camera body 1300. This flow is begun when the camera body control section 1318 receives the switch state information and the information relating to the focus limit from the replacement lens 1200 according to the steady sequence. The received switch state information and information relating to the focus limit are held in the internal memory 1310.

The camera body control section 1318 judges whether the attached replacement lens 1200 includes a focus limit switching switch (step S1201). The camera body control section 1318 can make this judgment by referencing the lens function information transmitted from the replacement lens 1200 according to the activation sequence. When it is judged that the replacement lens 1200 does not include a focus limit switching switch (NO at step S1201), the process is ended without performing the processes described further below.

When it is judged that the replacement lens 1200 includes the focus limit switching switch (YES at step S1201), the camera body control section 1318 acquires the switch state information from the internal memory 1310 (step S1202). The drive range of the focus lens unit 1212 is then selected according to the switch state information and the setting information relating to image capturing. Specifically, a judgment is made as to whether the switch state information is set to FULL (step S1203) and, when it is judged that the switch state information is set to FULL (YES at step S1203), a judgement is made as to whether the image capturing mode is set to a macro mode (step S1204). When it is judged that the image capturing mode is set to the macro mode (YES at step S1204), the focus limit for the very close region is selected (step S1205). As described above, even if it is assumed that the switch state information is set to FULL, the focus limit for the very close region is selected by prioritizing the settings on the camera body 1300 side.

When the image capturing mode is not set to the macro mode (NO at step S1204), a further judgment is made as to whether a distant view mode is set (step S1206). When a distant view mode is set (YES at step S1206), the focus limit for the infinitely far region is selected (step S1207). As described above, even if the switch state information is set to FULL, the focus limit for the infinitely far region is selected by prioritizing the settings on the camera body 1300 side. When the distant view mode is not set (NO at step S1206), the setting without a focus limit is selected (step S1208).

When it is not indicated that the switch state information is set to FULL, i.e. when it is indicated that the switch state information is set to LIMIT 1 or LIMIT 2 (NO at step S1203), a judgment is made as to whether the image capturing mode is set to full auto or to a manual mode (step S1209). When the image capturing mode is set to full auto (YES at step S1209), image capturing is preferably performed in an optimal state corresponding to the scene. Therefore, even when the focus limit switching switch 1201 has been switched to LIMIT 1 or LIMIT 2, the full auto setting is prioritized. Accordingly, the setting without a focus limit is selected (step S1210). Furthermore, when the manual mode is set (YES at step S1209), since there will be an intentional manipulation by the user, manipulation by the user is preferably prioritized and the focus limit is not applied. Accordingly, the setting without a focus limit is selected (step S1210).

When neither full auto nor the manual mode is set (NO at step S1209), the focus limit is selected according to the switch state information. Specifically, when LIMIT 1 is selected (YES at step S1211), the focus limit for the infinitely far region is set, and when LIMIT 1 is not set, i.e. when LIMIT 2 is set (NO at step S1211), the focus limit for the very close region is selected (step S1213).

Upon selecting either of the ranges, the camera body control section 1318 ends the series of processes. Upon selecting the drive range in the manner described above, if SW1 is detected, the camera body control section 1318 moves the focus lens unit 1212 in the selected range.

Figure 8:
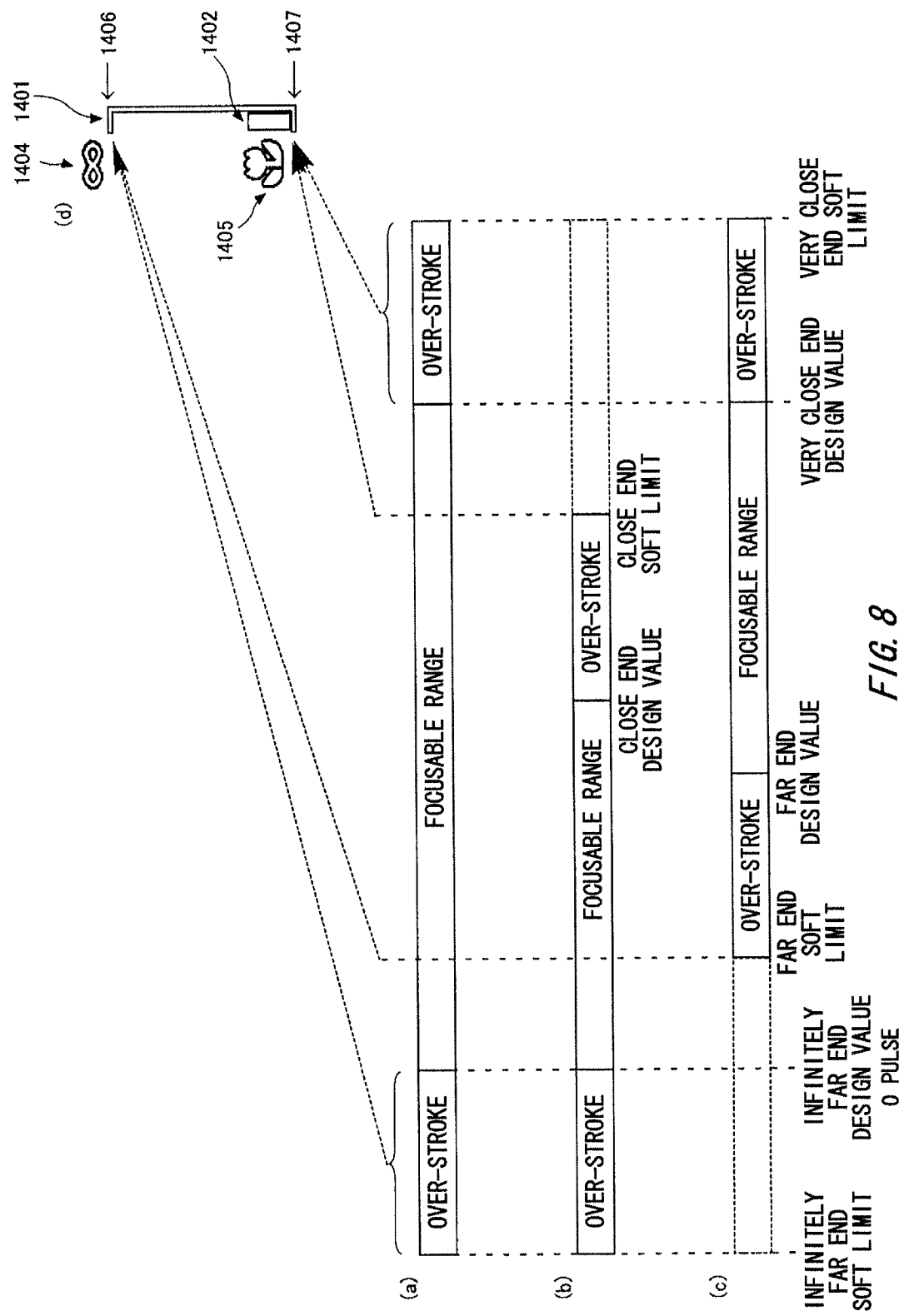
FIG. 8 is a drawing for describing the display control of the indicator relating to the focus limit.

FIG. 8 is a drawing for describing the display control of the indicator relating to the focus limit. Portions (a), (b), and (c) in FIG. 8 are the same as portions (a), (b), and (c) in FIG. 3. Portion (d) in FIG. 8 shows an exemplary display relating to the focus limit. Portion (d) in FIG. 8 is the same as the exemplary display relating to the indicator in the MF manipulation screen shown in portion (a) of FIG. 5.

As shown in portions (a) and (d) in FIG. 8, for the first range, the camera body control section 1318 displays the infinitely far end design value in correspondence with the far end 1406 of the display bar 1401 and displays the very close end design value in correspondence with the close end 1407 of the display bar 1401. The camera body control section 1318 does not change the display of the focus lens unit position 1402 while the focus lens unit 1212 is moving from the infinitely far end design value to the infinitely far end soft limit and while the focus lens unit 1212 is moving from the very close end design value to the very close end soft limit. In other words, the display of the focus lens unit position 1402 is not changed while the focus lens unit 1212 is moving beyond the range set as the focusable range. In this case, although the focus lens unit 1212 is moving, the focus lens unit position 1402 does not move in the display.

Therefore, the camera body control section 1318 detects whether the focus lens unit 1212 has reached the infinitely far end soft limit, for example, and upon detecting that the focus lens unit 1212 has reached the infinitely far end soft limit, may change the color in which the display bar 1401 is displayed. In this way, when performing the MF manipulation, the user can judge that the infinitely far end soft limit has been reached, even though the display of the focus lens unit position 1402 does not change.

As shown in portions (b) and (d) in FIG. 8, for the focus limit for the infinitely far region, the camera body control section 1318 displays the infinitely far end design value in correspondence with the far end 1406 of the display bar 1401 and displays the close end soft limit in correspondence with the close end 1407 of the display bar 1401. In this case as well, as described above, the camera body control section 1318 detects whether the focus lens unit 1212 has reached the infinitely far end soft limit and, upon detecting that the focus lens unit 1212 has reached the infinitely far end soft limit, may change the color in which the display bar 1401 is displayed. As shown in portions (c) and (d) in FIG. 8, for the focus limit for the very close region, the camera body control section 1318 displays the far end soft limit in correspondence with the far end 1406 of the display bar 1401 and displays the very close end design value in correspondence with the close end 1407 of the display bar 1401.

Figure 9A:
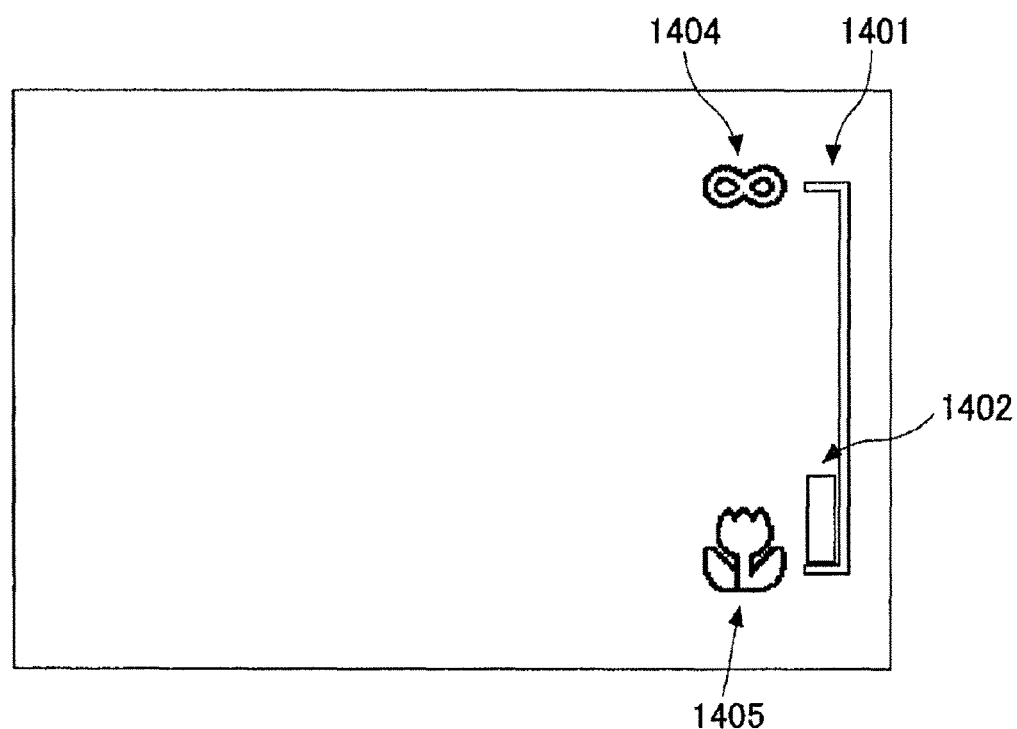
FIG. 9A is a drawing for describing the display control of the indicator relating to the focus limit.
Figure 9B:
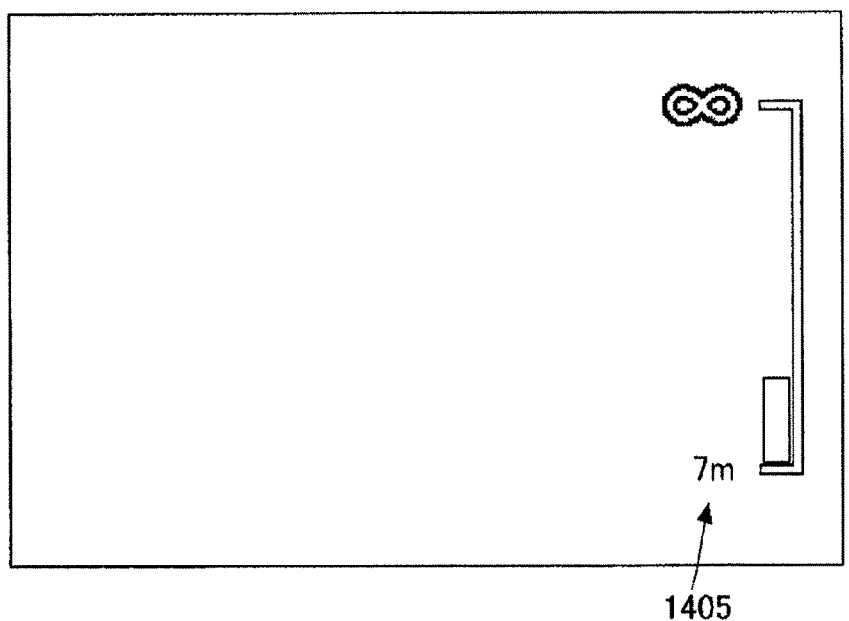
FIG. 9B is a drawing for describing the display control of the indicator relating to the focus limit.
Figure 9C:
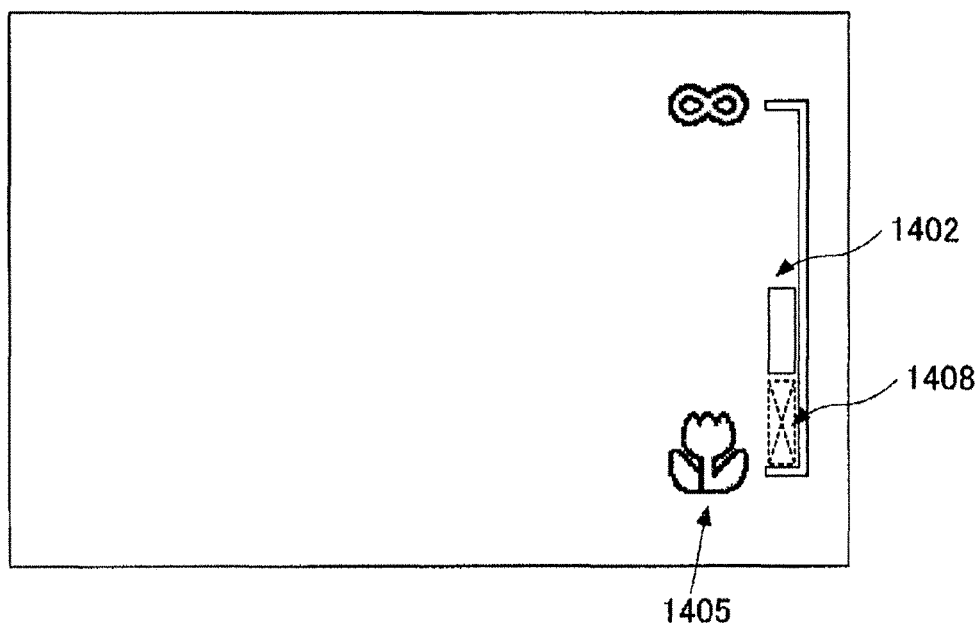
FIG. 9C is a drawing for describing the display control of the indicator relating to the focus limit.

FIGS. 9A to 9C are drawings for describing the display control of the indicator relating to the focus limit. FIG. 9A shows an exemplary display relating to the focus limit in a state where there is no focus limit. FIG. 9A shows an exemplary display that is the same as the exemplary display relating to the indicator in the MF manipulation screen shown in portion (a) in FIG. 5. FIGS. 9B and 9C each show an exemplary display relating to the focus limit in a state where a focus limit for the infinitely far region is used.

The replacement lens control section 1220 uses a different display for the indicator relating to the movement range of the focus lens unit between a case where the allowable movement range of the focus lens unit 1212 is set to be the first range and a case where the allowable movement range of the focus lens unit 1212 is set to be the second range. Specifically, as shown in FIG. 9B, the replacement lens control section 1220 changes the marker 1405 for at least a portion of the display bar 1401 without changing the display range of the focus lens unit position 1402. Here, the marker 1405 is displayed as "7 m".

Furthermore, as shown in FIG. 9C, the replacement lens control section 1220 may change the display range of the focus lens unit position 1402 without changing the marker 1405. In this case, a movement-prohibited region 1408 may be displayed to indicate that the focus lens unit 1212 cannot move beyond the close end soft limit toward the very close side. In this way, the user can easily visually recognize that the focus lens unit 1212 cannot move beyond the close end soft limit toward the very close side.

In the above description, the camera body control section 1318 selects the setting without a focus limit if the image capturing mode is set to be full auto or the manual mode, but the setting without a focus limit may also be selected when control is performed by an external apparatus such as a smartphone, tablet terminal, personal computer, or the like. When the camera system 1100 is manipulated by an external apparatus, there are cases where the user performs more precise control by manipulating the external apparatus at a position distanced from the camera system 1100, i.e. a position where the focus limit switching switch 1201 of the replacement lens 1200 cannot be manipulated.

In the above description, the camera body control section 1318 selects the setting without a focus limit if the image capturing mode is set to full auto or the manual mode, but the setting with a focus limit may be selected when the image capturing mode is set to at least one of full auto and the manual mode. In this way, the intent of the user is reflected via the focus limit switching switch 1201 and it is possible to perform the focus driving with more flexibility.

In the above description, the focus limiter is set on the replacement lens 1200 side, but the focus limiter may instead be set on the camera body 1300 side. In this case, the camera body control section 1318 may display a menu screen for switching the settings of the focus limiter in the display section 1314 and perform switching according to the manipulations by the user via the manipulation members 1315. Furthermore, the camera body control section 1318 may transmit the switch state information to the replacement lens 1200 when polling is performed. Upon receiving the polling, the replacement lens control section 1220 transmits the number of divisions corresponding to the state indicated by the switch state information, the limited position information, and the like along with the first information and the second information.

In the above description, the replacement lens 1200 is a zoom lens, but the replacement lens 1200 may instead be a single focus lens. In this case, the focal distance does not change, and therefore the first information and the second information have fixed values. Accordingly, the replacement lens control section 1220 need only transmit the first information and the second information once. In other words, this information need not be transmitted every time the polling is received during the steady sequence. The same is true for the display information.

In the above description, the replacement lens control section 1220 transmits the first information and the second information as a number of pulses, but the replacement lens control section 1220 may instead transmit distance information. In this case, the camera body 1300 receives the distance information and converts this distance information into a number of pulses. In the above description, the infinitely far end design value is used as the reference value, but another value may be used as the reference value instead. For example, the very close end design value may be used as the reference value. In the above description, the settings on the camera body 1300 side are prioritized when selecting the drive range of the focus lens unit 1212, but instead, a manipulation by the user may be performed to set which of the settings on the replacement lens 1200 side or the settings on the camera body side are prioritized. In this way, the intent of the user can be reflected to a greater degree.

In the above description, the replacement lens control section 1220 transmits the very close end soft limit and the infinitely far end soft limit to the camera body 1300 as the first information corresponding to the setting without a focus limit, but instead, the infinitely far end design value and the very close end design value may be transmitted as the first information. Similarly, the replacement lens control section 1220 may transmit the infinitely far end design value and the very close end design value as the second information, as the focus limit for the infinitely far region, and may transmit the far end design value and the very close end design value as the second information, as the focus limit for the very close region. As described above, in a case where the autofocus is performed using a contrast method, when focus is achieved at the infinitely far end design value, for example, the actual focus point moves beyond the infinitely far end design value toward the infinitely far side. In contrast to this, when the autofocus is performed using a phase difference method, focus can be achieved at the infinitely far end design value without moving beyond the infinitely far end design value toward the infinitely far side. Accordingly, the replacement lens control section 1220 may transmit different second information in a case where the autofocus is performed using a contrast method and a case where the autofocus is performed using a phase difference method. When the autofocus is performed using the phase difference method, the values at the ends of the focusable range may be transmitted without transmitting the values at the ends of the drive range of the focus lens unit 1212.

In the above description, the replacement lens 1200 transmits compression information that is information relating to a range narrower than the first range as the second information, but instead the replacement lens 1200 may transmit expansion information that is information relating to a range wider than the first range. For example, a number of pulses closer to the very close end than the very close end soft limit described in FIG. 3 is transmitted as the second information. In this case, the replacement lens 1200 may also transmit recommendation information indicating which of the first range and the second range is a recommended drive range that ensures optical performance greater than or equal to a predetermined reference. If one of a mode prioritizing the focus range and a mode prioritizing image quality is set on the camera body 1300 side, the drive range of the focus lens unit 1212 may be selected according to this setting. In this case, the focus limit switching switch 1201 does not function as a switching section and a switch may be provided that switches between the mode prioritizing the focus range and the mode prioritizing the image quality. If the mode prioritizing the image quality is set, information relating to the range indicated by the recommendation information is selected. On the other hand, if the mode prioritizing the focus range is set, information relating to a range differing from the range indicated by the recommendation information is selected. Furthermore, the range may be selected according to the setting information on the camera body 1300 side. For example, when the image capturing mode is set to the full auto mode, the range may be selected to prioritize the focus range even when the mode prioritizing the image quality is set. Furthermore, the switching section may be a switch that switches the AF speed. In particular, when the mode for performing high-speed AF is set for the contrast AF, a narrower range is selected than when a mode for performing low-speed AF is set.

In the above description, the second range includes a focus limit for the infinitely far region and a focus limit for a very close region, but the second range may instead include only one of these focus limits. In other words, the focus limit switching switch 1201 may be a switch that switches between two positions instead of three positions. Furthermore, the second range may include three or more ranges.

In the above description, as shown in FIG. 7, the camera body control section 1318 switches the range of the focus limit according to the switch state information, but instead the camera body control section 1318 may prohibit the switching process for switching the range of the focus limit under a predetermined condition. For example, the predetermined condition may be exemplified by an AF lock being in effect, the focus lens unit 1212 being driven, or the like. When the switching process is prohibited, the switching process is put on hold until the condition is removed, i.e. the operation in the immediately prior focus limit range continues. When the condition is removed, the switching process that was put on hold is performed. The switching process may be performed only when the focus control state is AF. While the switching is being performed and while the switching process is on hold, the camera body control section 1318 need not perform the switching of the focus control state, the MF operation, and the AF operation. When the focus control state is MF, the switching process need not be performed regardless of the position of the focus lens unit 1212. In this case, only the switch state information, the various design values, and the various soft limits in the internal memory 1310 are updated.

In the above description, a number of pulses is given as an example of the control signal for moving the focus lens unit 1212 to the target position, but the present invention is not limited to this and any format can be used as long as at least one of a movement amount and a target position can be transferred.

Figure 10:
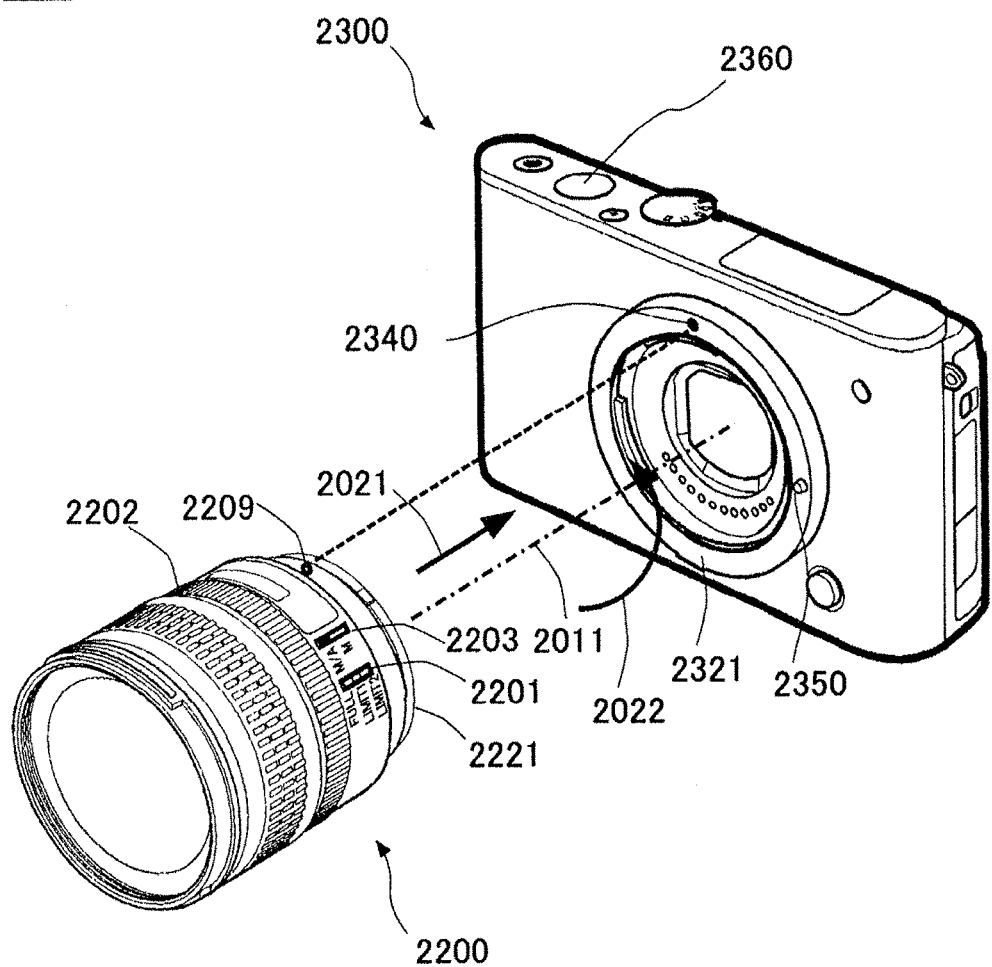
FIG. 10 is an external perspective view of a camera system according to a second embodiment.

FIG. 10 is an external perspective view of a camera system 2100 according to a second embodiment. The camera system 2100 is a single-lens reflex camera with a replacement lens formed by attaching a replacement lens 2200 serving as an imaging device to a camera body 2300. The replacement lens 2200 includes a lens mount 2221 and the camera body 2300 includes a camera mount 2321. When the lens mount 2221 and the camera mount 2321 engage with each other to form the replacement lens 2200 and the camera body 2300 integrally, the replacement lens 2200 and the camera body 2300 function as the camera system 2100.

The lens mount 2221 is brought near the camera mount 2321 along the arrow 2021 parallel to the optical axis 2011, such that the lens marker 2209 and the body marker 2340 face each other and are in contact with each other. Furthermore, the replacement lens 2200 is rotated in the direction of the arrow 2022 while contact is maintained between the mounting surface of the lens mount 2221 and the mounting surface of the camera mount 2321. When this happens, the lock mechanism formed by the lock pin 2350 operates to secure the replacement lens 2200 to the camera body 2300. In this state, a connection terminal on the replacement lens 2200 side is electrically connected to a connection terminal on the camera body 2300 side. As a result, it is possible to transfer power and communication such as control signals between the replacement lens 2200 and the camera body 2300.

The replacement lens 2200 includes a focus limit switching switch 2201 serving as the switching section, a focus ring 2202, and an AF/MF switching switch 2203.

The AF/MF switching switch 2203 switches the focus control state between an M mode and an M/A mode. The user can set the M mode that enables the manual focus operation by switching the AF/MF switching switch 2203 to M. Furthermore, the user can set the M/A mode that enables both the autofocus operation and the manual focus operation by switching the AF/MF switching switch 2203 to M/A.

The release switch 2360 is formed by a press button that can detect two stages in a pressing direction. When the M/A mode is set, the user can perform the autofocus operation by pressing the release switch 2360 to the first stage. Furthermore, after the autofocus operation has ended, the user can perform the manual focus operation by manipulating the focus ring 2202. By additionally performing the manual focus operation, the focus lens unit that was moved once by the autofocus operation can be driven to correct the focal position. In the manner described above, in the present embodiment, the modes that can be selected by the AF/MF switching switch 2203 are the M mode and the M/A mode. However, instead of the M/A mode, an A mode may be adopted that is an autofocus mode not allowing the manual focus manipulation using the focus ring 2202.

As described in detail further below, in the present embodiment, the focus ring 2202 and the focus lens unit are not mechanically linked. The information concerning the rotation direction and the rotation amount per unit time applied to the focus ring 2202 by the user is temporarily converted into an electrical signal. An actuator drives the focus lens unit in the direction of the optical axis in order to change the focal position, according to this electrical signal.

The focus limit switching switch 2201 switches between a first range, which is a range in which movement of the focus lens unit is allowed, and a second range that is different from the first range. By switching the focus limit switching switch 2201, a user can select a drive range for the focus lens unit. In the present embodiment, the first range is a range in which there are no focus limitations, and the second range is a range that is narrower than the first range, i.e. a range in which there is a focus limitation. In the present embodiment, two focus limits are set as the second range. As described in detail further below, a focus limit for an infinitely far region and a focus limit for a very close region are set.

The user can set the first range by switching the focus limit switching switch 2201 to FULL, set the focus limit for the infinitely far region by switching the focus limit switching switch 2201 to LIMIT 1, and set the focus limit for the very close region by switching the focus limit switching switch 2201 to LIMIT 2. In other words, it is possible to select any one of three positions by switching the focus limit switching switch 2201. By limiting the movement range of the focus lens unit, it is possible to shorten the focusing time. Regardless of which of the three positions the focus limit switching switch 2201 is switched to, the replacement lens 2200 transmits both first information relating to the first range and second information relating to the second range to the camera body 2300. Furthermore, the replacement lens 2200 transmits switch state information as setting information indicating which of the three positions is switched to.

When the focus limit switching switch 2201 is switched to LIMIT 1 or LIMIT 2, the drive range of the focus lens unit during the autofocus operation is limited to the second range. Furthermore, when the focus limit switching switch 2201 is switched to LIMIT 1 or LIMIT 2, the drive range and the drive operation of the focus lens unit during the manual focus operation are limited as described further below.

The camera body 2300 receives both the first information and the second information, and also the switch state information. The camera body 2300 moves the focus lens unit in the drive range of the focus lens unit corresponding to the switch state information. However, as described in detail further below, there are cases where it is undesirable for the focus lens unit to be driven in the drive range corresponding to the switch state information, depending on the state of the settings relating to image capturing on the camera body 2300 side. Therefore, the camera body 2300 selects any one of the first range and the second range according to the state of the settings relating to the image capturing, in addition to the switch state information, and moves the focus lens unit according to the selected range. Since the drive range of the focus lens unit is selected according to the state of the settings relating to image capturing, this drive range can be determined with flexibility.

Figure 11:
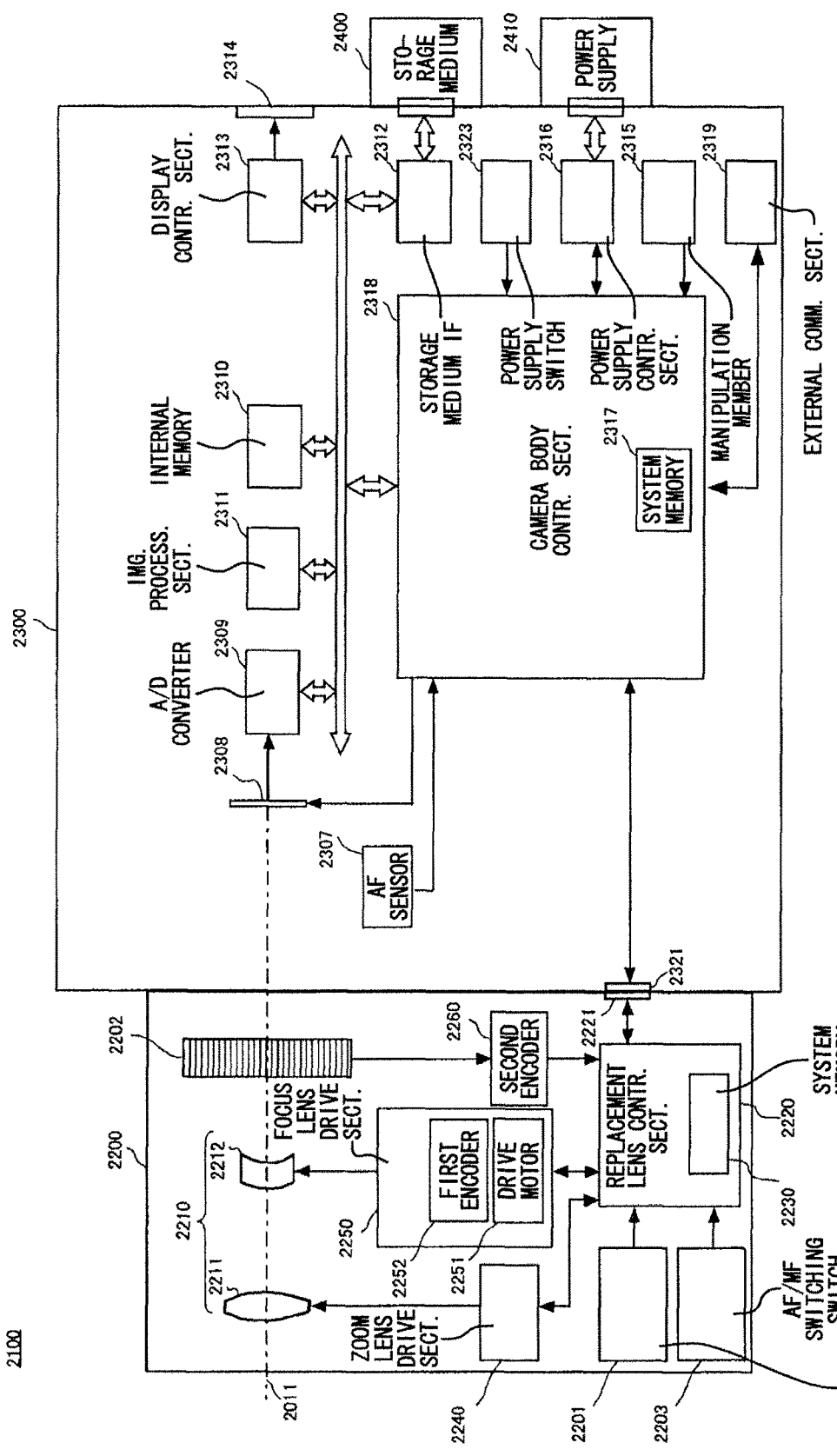
FIG. 11 is a drawing for describing the configuration of the camera system.

FIG. 11 is a drawing for describing the configuration of the camera system 2100. The replacement lens 2200 includes, in addition to the focus limit switching switch 2201, the focus ring 2202, and the AF/MF switching switch 2203, an image capturing lens 2210, a replacement lens control section 2220, a zoom lens drive section 2240, a focus lens drive section 2250, and a second encoder 2260 serving as an image capturing optical system. The camera body 2300 includes an AF sensor 2307, an imaging element 2308, an A/D converter 2309, an internal memory 2310, an image processing section 2311, a storage medium IF 2312, a display control section 2313, a display section 2314, a manipulation member 2315, a power supply control section 2316, a camera body control section 2318, an external communication section 2319, and a power supply switch 2323.

The replacement lens control section 2220 and the camera body control section 2318 are connected to each other via the lens mount 2221 and the camera mount 2321. The replacement lens control section 2220 and the camera body control section 2318 work together while communication with each other to control the camera body 2300 and the replacement lens 2200.

There are a plurality of types of replacement lenses 2200 with different optical characteristics. The user can attach any one of these replacement lenses 2200 to the camera body 2300. The image capturing lens 2210 included in the replacement lens 2200 is formed by a plurality of optical lens groups. Specifically, the image capturing lens 2210 is formed by a zoom lens unit 2211 and a focus lens unit 2212. The image capturing lens 2210 guides subject light flux incident thereto along an optical axis 2011 to an imaging element 2308 arranged within the camera body 2300.

A portion of the subject light flux that transparently passes through the optical system to be incident thereto is guided to the AF sensor 2307. The AF sensor 2307 includes a plurality of photoelectric converting element columns that receive a portion of the subject light flux guided thereto. The AF sensor 2307 outputs signals with matching phases when in the focused state and outputs signals with relatively shifted phases when in a front focus state or rear focus state. The amount of the phase shift corresponds to the amount of shift from the focus state. The AF sensor 2307 detects the phase difference by calculating the correlation of the output of the photoelectric converting element columns, and outputs a phase difference signal indicating the phase difference to the camera body control section 2318. During the autofocus operation, the camera body control section 2318 outputs a control signal for moving the focus lens unit 2212 to a target position to the replacement lens control section 2220. The camera body 2300 need not include the AF sensor 2307 as a separate component from the imaging element 2308, and may include the imaging element 2308 that has pixels with a distance measuring function.

The imaging element 2308 is an element that photoelectrically converts an optical image, which is the subject image. A CCD sensor or CMOS sensor can be used as the imaging element 2308. The subject image resulting from the photoelectric conversion by the imaging element 2308 is converted from an analog signal into a digital signal by the A/D converter 2309.

The subject image that has been converted into a digital signal is sequentially processed as image data. The image data is temporarily stored in the internal memory 2310. The internal memory 2310 is a random access memory that can perform reading and writing at high speed. A DRAM and an SRAM can be used as the internal memory 2310. The internal memory 2310 serves as a work memory in which the image processing section 2311 performs image processing and a compression process. The internal memory 2310 has a memory capacity sufficient for fulfilling this role.

The image processing section 2311 converts the image data into image data in compliance with a prescribed image format, according to the set image capturing mode and instructions from the user. For example, when generating a JPEG file as a still image, a compression process is performed by applying a suitable discrete cosine transformation or the like after performing image processing such as a color conversion process, gamma process, or a white balance process. The converted image data is again stored in the internal memory 2310.

The image data processed by the image processing section 2311 is stored in the storage medium 2400 from the internal memory 2310, via the storage medium IF 2312. The storage medium 2400 is a non-volatile memory that can be attached to and removed from the camera body 2300 and is formed by a flash memory or the like. The image processing section 2311 generates the image data to be displayed, in parallel with the processed image data to be stored. The generated image data to be displayed is displayed in the display section 2314 under the control of the display control section 2313. Regardless of whether storage is performed, the camera body control section 2318 can present a live view as an electronic finder function by having the image processing section 2311 generate sequential pieces of image data to be displayed and having the display section 2314 display this image data. Furthermore, it is possible to display an indicator or the like relating to the focus limit, which is described further below, in the display section 2314.

The power supply control section 2316 communicates with the power supply 2410 to detect the remaining power, monitor the power supply, supply power, and the like. The power supply 2410 is formed by a battery, for example.

The camera body 2300 includes each element used for the image processing described above, and is directly or indirectly controlled by the camera body control section 2318. The camera body control section 2318 includes a system memory 2317. The system memory 2317 is a non-volatile memory that can be electrically erased and recorded on, and is formed by an EEPROM (Registered Trademark) or the like, for example. The system memory 2317 stores constants, variables, programs, and the like that are needed when the camera system 2100 operates, such that this information is not lost when the camera system 2100 is not operating. The camera body control section 2318 suitably extracts these constants, variables, programs, and the like in the internal memory 2310 and uses this information to control the camera system 2100. The camera body control section 2318 functions as a receiving section that receives the first information and the second information, a selecting section that selects one of the first information and the second information based on the setting information relating to image capturing, and a control section that controls the driving of the focus lens unit 2212 according to the selected first information or second information. The camera body control section 2318 may drive the focus lens unit 2212 such that the subject image in a specified region is in focus on the light receiving surface of the imaging element 2308, according to contrast AF information using the pieces of image data acquired in series.

The camera system 2100 includes a plurality of manipulation members 2315 that receive manipulations from the user. The manipulation members 2315 are used to set the image capturing mode, for example. The image capturing mode includes a full auto mode, a scene mode, and a manual mode. The user can set the image capturing mode by manipulating the manipulation members 2315. The camera body control section 2318 detects that these manipulation members 2315 have been manipulated and performs operations according to the manipulations.

The zoom lens unit 2211 is driven by the zoom lens drive section 2240, under the overall control of the camera body control section 2318 and the replacement lens control section 2220. The zoom lens drive section 2240 changes the field angle by driving the zoom lens unit 2211 according to instructions from the user.

The focus lens unit 2212 is driven by the focus lens drive section 2250, under the overall control of the camera body control section 2318 and the replacement lens control section 2220. The focus lens drive section 2250 includes a drive motor 2251 serving as an actuator for driving the focus lens unit 2212 and a first encoder 2252 for detecting the position of the focus lens unit 2212. The information indicating the current position of the focus lens unit 2212 detected by the first encoder 2252 is transmitted to the camera body control section 2318 via the replacement lens control section 2220.

When the AF/MF switching switch 2203 is switched, an electrical signal corresponding to the selected position of the switch is transmitted to the replacement lens control section 2220. The replacement lens control section 2220 controls the focus according to the received electrical signal.

When performing the autofocus operation, the focus lens drive section 2250 drives the focus lens unit 2212 according to the information of the AF sensor 2307. Specifically, first, the AF sensor outputs to the camera body control section 2318 a phase difference signal indicating a phase difference corresponding to the shift amount from the focused state. The camera body control section 2318 converts this phase difference signal into a control signal. The control signal is then transmitted to the replacement lens control section 2220. The replacement lens control section 2220 outputs the received control signal to the focus lens drive section 2250. The focus lens drive section 2250 drives the drive motor 2251 according to this control signal. The drive motor 2251 moves the focus lens unit 2212 to the position where the subject image of a specified region is focused on the light receiving surface of the imaging element 2308.

When performing the manual focus operation, the focus lens drive section 2250 drives the focus lens unit 2212 according to information of the rotation direction and rotation amount per unit time applied to the focus ring 2202 by the user. Specifically, the second encoder 2260 detects the rotation direction and rotation amount per unit time applied to the focus ring 2202 by the user and converts the detected information into an electrical signal. The second encoder 2260 then transmits this electrical signal to the camera body control section 2318 via the replacement lens control section 2220. The camera body control section 2318 converts the received electrical signal into a drive control signal expressing the drive direction and drive amount per unit time, and transfers the drive control signal to the replacement lens control section 2220. The replacement lens control section 2220 outputs this received control signal to the focus lens drive section 2250. The focus lens drive section 2250 generates a drive pulse corresponding to this control signal and drives the drive motor 2251. The drive motor 2251 moves the focus lens unit 2212 in the optical axis direction to change the focal position. As described in detail further below, when the allowable movement range of the focus lens unit 2212 is switched to the second range, the autofocus operation and the manual focus operation have respectively different limits.

The replacement lens control section 2220 includes a system memory 2230. The system memory 2230 stores information relating to the replacement lens 2200. Lens function information indicating that the replacement lens includes the focus limit switching switch 2201, a set including first pulse information indicating the first range and second pulse information indicating the second range, display information relating to the display of the focus limit, and the like are stored as the information relating to the replacement lens 2200. A plurality of the sets of the first pulse information and the second pulse information are stored, according to the focal distance. The display information relating to the display of the focus limit includes limited position information for the focus lens unit 2212 corresponding to the state of the focus limit switching switch 2201 and the number of divisions of the distance position of the focus lens unit 2212 at the current zoom position. A plurality of pieces of the display information relating to the display of the focus limit are also stored according to the focal distance.

When communication is established with the camera body control section 2318, the replacement lens control section 2220 transmits the information relating to the replacement lens 2200 to the camera body control section 2318. For example, the replacement lens control section 2220 transmits the lens function information described above. After this, every time polling is received from the camera body 2300, the set of the first pulse information and the second pulse information and the switch state information are transmitted. Furthermore, the replacement lens control section 2220 transmits the limited position information for the focus lens unit 2212 corresponding to the state of the focus limit switching switch 2201, the distance position information of the focus lens unit 2212 at the current zoom position, and the number of divisions of the distance position at the current zoom position.

The replacement lens control section 2220 functions as a drive control section that drives the drive motor 2251 according to the second range in response to instructions from the camera body even when the allowable movement range of the focus lens unit 2212 is switched to the first range and drives the drive motor 2251 according to the first range in response to instructions from the camera body 2300 even when the allowable movement range of the focus lens unit 2212 is switched to the second range. The replacement lens control section 2220 drives the drive motor 2251 to move the focus lens unit 2212, and controls the driving of the drive motor 2251 based on the pulse information detected by the first encoder 2252.

Figure 12:
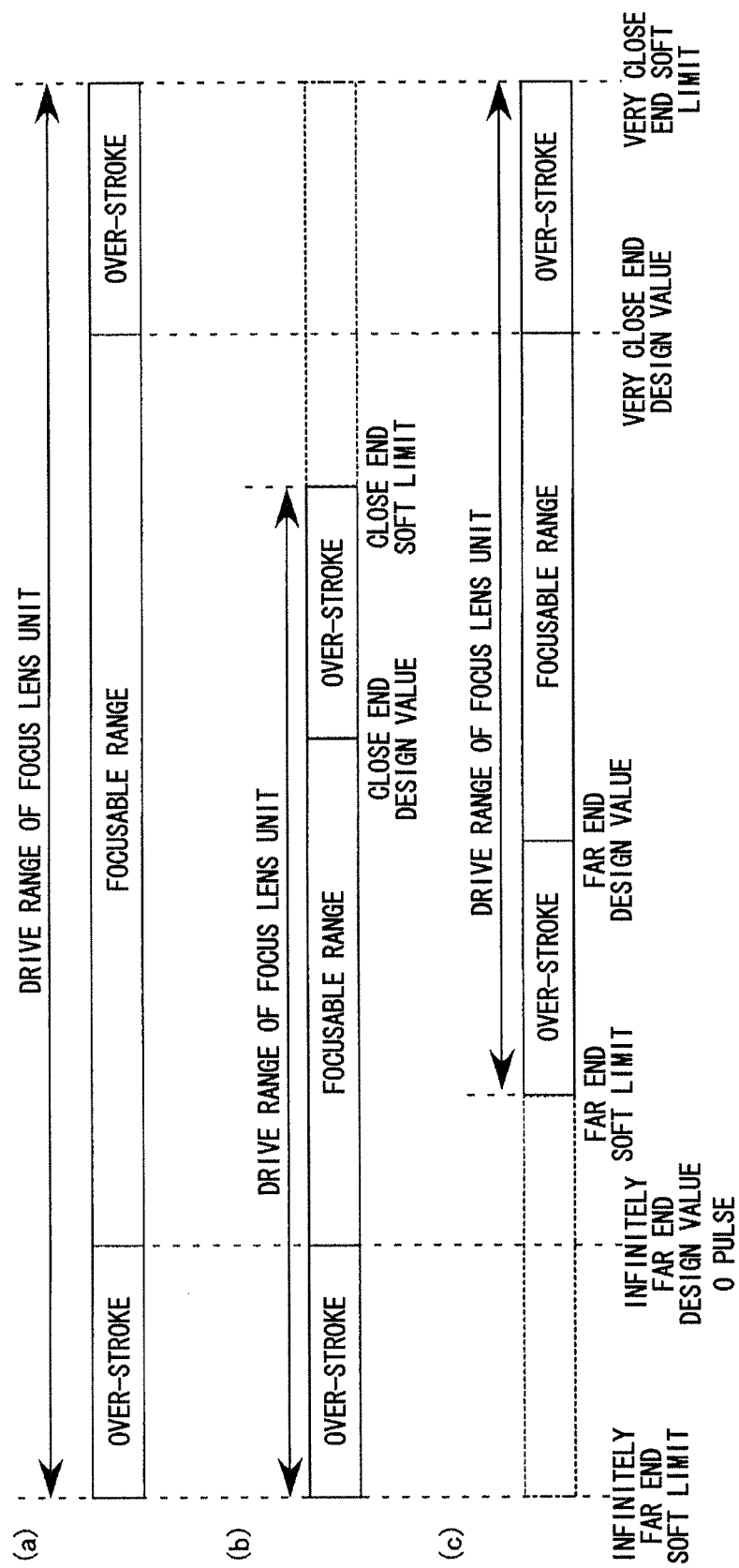
FIG. 12 is a drawing for describing the first range and the second range.

FIG. 12 is a drawing for describing the first range and the second range. Portion (a) in FIG. 12 is used to describe the first range. Portions (b) and (c) in FIG. 12 are used to describe the second range. Specifically, portion (b) in FIG. 12 is used to describe the focus limit for an infinitely far region, and portion (c) in FIG. 12 is used to describe the focus limit for a very close region. In the present embodiment, portions (a), (b), and (c) in FIG. 12 respectively correspond to states resulting from the focus limit switching switch 2201 being switched to FULL, LIMIT 1, and LIMIT 2. In the present embodiment, an infinitely far end design value is set as the reference for the drive range of the focus lens unit 2212, i.e. a 0 pulse, and the number of pulses for each type of soft limit and each type of design value described further below are determined.

As shown in portion (a) of FIG. 12, the very close end design value is a value indicating the end point of the focusable range on the very close side. When performing the autofocus operation, the focus lens unit 2212 can achieve focus in the range between the infinitely far end design value and the very close end design value, which is the focusable range of the first range. Furthermore, the infinitely far end soft limit on the infinitely far side is determined from the infinitely far end design value, and the very close end soft limit on the very close side is determined from the very close end design value. The infinitely far end soft limit is a value indicating the end point of the drive range of the focus lens unit 2212 determined in advance on the infinitely far side. The very close end soft limit is a value indicating the end point of the drive range of the focus lens unit 2212 determined in advance on the very close side. The range from the infinitely far end design value to the infinitely far end soft limit and the range from the very close end design value to the very close end soft limit are over-stroke ranges that are outside of the focusable range. In a case where the camera body 2300 performs contrast AF, when focus is achieved at the infinitely far end design value, for example, the focal point temporarily moves to the infinitely far side of the infinitely far end design value. Therefore, in the present embodiment, the over-stroke range is established by determining the infinitely far end soft limit. The same is true for the very close end soft limit.

At the focus limit for the infinitely far region, the focusable range is limited to be near an infinitely far position, as shown in portion (b) of FIG. 12. More specifically, a close end design value is determined to be on the infinitely far side from the very close end design value. The close end design value is a value indicating the end point of the focusable range on the very close side. When performing the autofocus operation, the focus lens unit 2212 can focus in the range between the infinitely far end design value and the close end design value, which is the focusable range. Furthermore, the close end soft limit is determined between the close end design value and the very close end design value. The close end soft limit is a value indicating the end point of the drive range of the focus lens unit 2212 on the very close side. The range from the infinitely far end design value to the infinitely far end soft limit and the range from the close end design value to the close end soft limit are over-stroke ranges.

At the focus limit for the very close region, the focusable range is limited to be near the very close end, as shown in portion (c) of FIG. 12. More specifically, a far end design value is determined to be on the very close side from the infinitely far end design value. The far end design value is a value indicating the end point of the focusable range on the infinitely far side. When performing the autofocus operation, the focus lens unit 2212 can focus in the range between the far end design value and the very close end design value, which is the focusable range. Furthermore, a far end soft limit is determined between the far end design value and the infinitely far end design value. The far end soft limit is a value indicating the end point of the drive range of the focus lens unit 2212 on the infinitely far side. The range from the far end design value to the far end soft limit and the range from the very close end design value to the very close end soft limit are over-stroke ranges.

When performing the manual focus operation, in a case where the second range is selected, the focus lens unit 2212 can move in the second range according to the manipulation by the user. On the other hand, as described in detail further below, the movement of the focus lens unit 2212 by the user is limited outside of the focusable range. In order to simplify the following description, a case is described in which the user switches to LIMIT 1 as the second range to limit the movement of the focus limit switching switch 2201 on the very close region side. When LIMIT 2 has been switched to in order to limit the movement on the infinitely far region side, the only difference is that the same limitation is performed on the infinitely far region side instead of on the very close region side, and therefore a description thereof is omitted.

Figure 13:
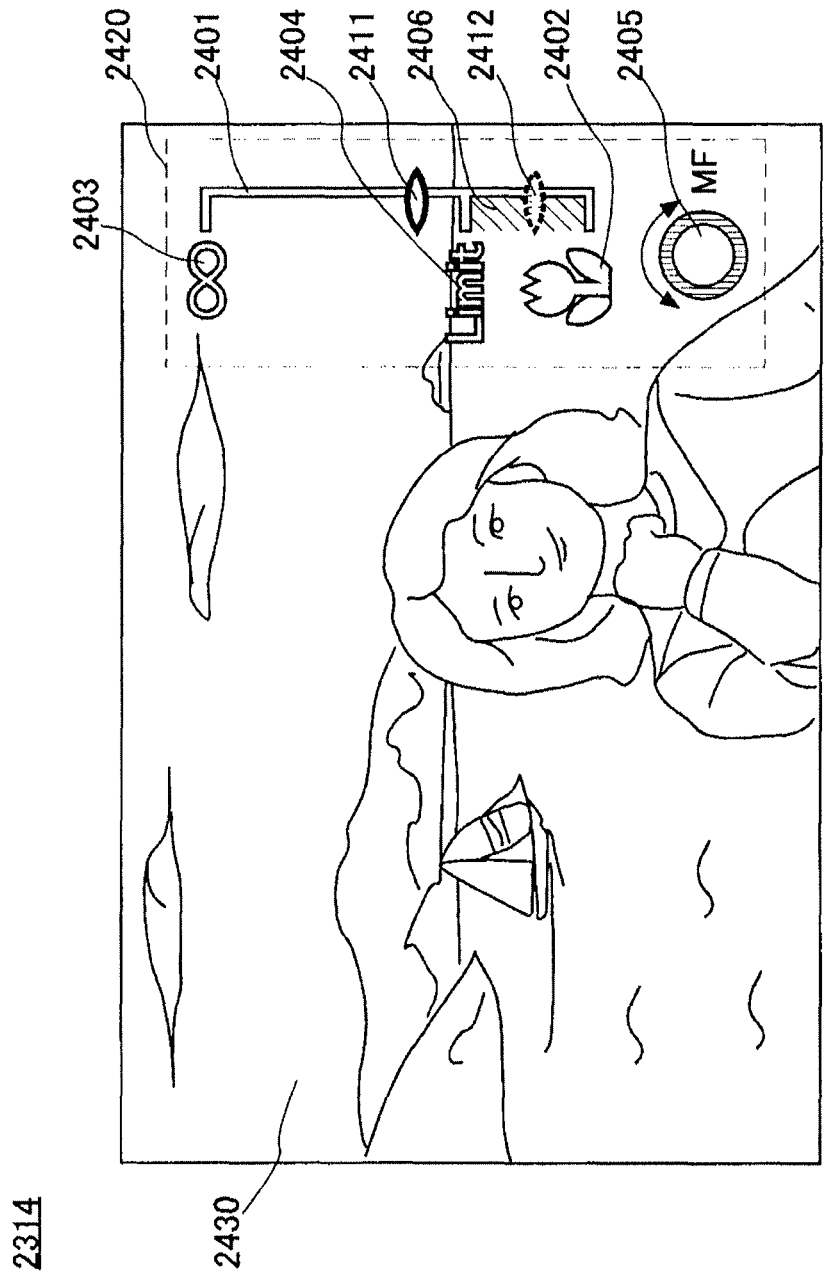
FIG. 13 shows an exemplary display of an indicator relating to the focus limit during the manual focus manipulation.

FIG. 13 shows an exemplary display of an indicator relating to the focus limit during the manual focus manipulation. A state is shown in which the indicator image 2420 relating to the focus limit is displayed by being superimposed on the live view image 2430 displayed by the display section 2314 of the camera body 2300.

More specifically, the subject image that is imaged on the imaging element 2308 through the replacement lens 2200 is sequentially converted into image data for the live view display by the imaging element 2308, the A/D converter 2309, and the image processing section 2311. The camera body control section 2318 displays the image data for the live view display in the display section 2314 as the live view image 2430, via the display control section 2313. Furthermore, the camera body control section 2318 generates an indicator image 2420 relating to the focus limit from the position information of the focus lens unit 2212 received from the replacement lens control section 2220, the switch state information of the focus limit switching switch 2201, and the like. The camera body control section 2318 displays the generated indicator image 2420 superimposed on the live view image 2430 of the display section 2314, via the display control section 2313.

The indicator image 2420 includes a display bar 2401, a lens icon 2411 indicating the focal position corresponding to the current position of the focus lens unit 2212, and an MF icon 2405. The indicator image 2420 also includes a close side marker 2402 indicating the close end of the display bar 2401, a far side marker 2403 indicating the far end, and a limit marker 2404 indicating the close side limit. Furthermore, the indicator image 2420 includes a movement-prohibited region 2406 indicating the region outside the focus limit range.

The camera body control section 2318 displays the lens icon 2411 in the display bar 2401 in correspondence with the current position of the focus lens unit 2212. The display position of the lens icon 2411 changes according to the manipulation of the focus ring 2202 by the user. The user can manipulate the focus ring 2202 while checking the current position of the focus lens unit 2212 based on the position of the lens icon 2411 on the display bar 2401. Furthermore, when the lens icon 2411 is in the movement-prohibited region 2406, i.e. when the focus lens unit 2212 is outside of the second range, the outline of the icon may be displayed as a dashed line or the like, as shown by the lens icon 2412.

Figure 14:
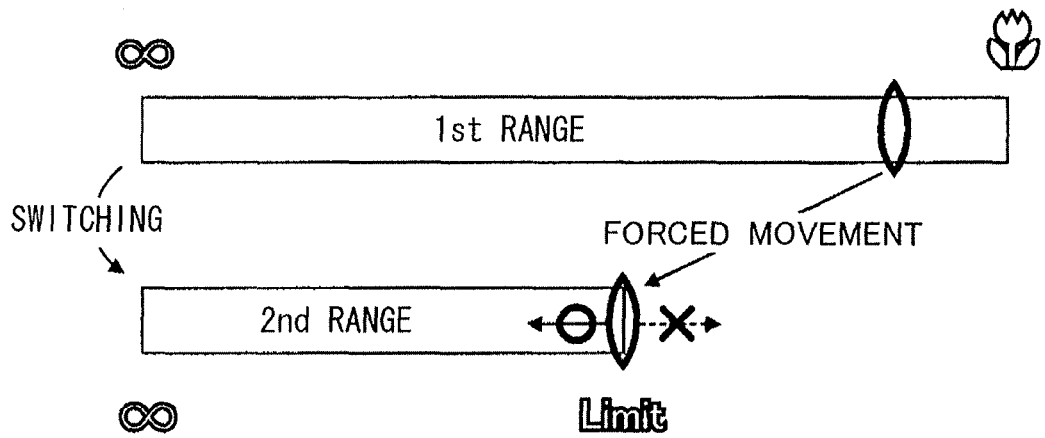
FIG. 14 is a schematic view for describing the control performed by the camera body control section when the focus limit setting is switched from the first range to the second range.

FIG. 14 is a schematic view for describing the control performed by the camera body control section 2318 when the focus limit setting is switched from the first range to the second range. Here, as an example of a case in which the focus limit setting is switched from the first range to the second range, the control performed when the AF/MF switching switch 2203 is set to the M mode and the focus limit switching switch 2201 is switched from FULL to LIMIT 1 is described.

When the focus limit switching switch 2201 is switched from FULL to LIMIT 1 by the user, the camera body control section 2318 judges whether the focus lens unit 2212 is positioned outside the second range. When it is judged that the focus lens unit 2212 is positioned outside the second range, the focus lens unit 2212 is forcefully moved to a boundary region of the second range.

Specifically, when switching of the focus limit switching switch 2201 is detected, the camera body control section 2318 acquires the position information of the focus lens unit 2212 detected by the first encoder 2252 from the replacement lens control section 2220. The camera body control section 2318 then judges whether the current position of the focus lens unit 2212 is within the second range. When it is judged that the focus lens unit 2212 is outside of the second range, the camera body control section 2318 calculates the movement amount, such as the number of pulses, needed to move the focus lens unit 2212 from the current position to the boundary position of the second range. The camera body control section 2318 transmits a control signal including the calculated number of pulses and the movement direction to the replacement lens control section 2220. The replacement lens control section 2220 outputs the received control signal to the focus lens drive section 2250. The focus lens drive section 2250 drives the drive motor 2251 according to the control signal and forcefully moves the focus lens unit 2212 to the boundary position of the second range. The movement of the focus lens unit 2212 is performed such that the focus lens unit 2212 is moved to a position included in the second range that is the shortest distance from the current position. In other words, among the two boundary positions of the second range, the one boundary position closer to the current position is set as the target position. By setting the target position in this manner, the time needed to forcefully move the focus lens unit 2212 can be minimized. If the time needed to forcefully move the focus lens unit 2212 is minimized, the user can perform the manual focus operation that much faster. The target position is not limited to being this boundary position, and can instead be set to a different predetermined position, such as a position designated by the user or the position in the center of the second range, for example.

When the movement of the focus lens unit 2212 is finished, the user can manipulate the focus ring 2202 to perform the manual focus manipulation. The camera body control section 2318 limits the drive range of the focus lens unit 2212 to be within the second range. The user can move the focus lens unit 2212 freely in the second range. On the other hand, the user cannot move the focus lens unit 2212 to the outside of the second range.

Specifically, the second encoder 2260 detects the rotation direction and rotation amount per unit time of the focus ring 2202 resulting from the manipulation by the user, and converts this information into an electrical signal. The second encoder 2260 then transmits the electrical signal to the camera body control section 2318 via the replacement lens control section 2220.

The camera body control section 2318 calculates the number of pulses corresponding to the target position of the focus lens unit 2212, according to the received electrical signal. When the focus lens unit 2212 is driven according to the manual focus manipulation by the user, the camera body control section 2318 judges whether the focus lens unit 2212 has moved outside the second range based on the calculated number of pulses and the position information of the focus lens unit 2212 and the second pulse information received from the replacement lens control section 2220.

When it is judged that the focus lens unit 2212 is not outside the second range, the camera body control section 2318 transmits the number of pulses calculated according to the manual focus manipulation by the user to the replacement lens control section 2220. The replacement lens control section 2220 drives the focus lens unit 2212 according to the received number of pulses. When it is judged that the focus lens unit 2212 is outside the second range, the camera body control section 2318 transmits the number of pulses for moving the focus lens unit 2212 to the boundary of the second range to the replacement lens control section 2220. The replacement lens control section 2220 moves the focus lens unit 2212 to the boundary of the second range according to the received number of pulses.

After the focus lens unit 2212 has reached the second range, when the a manual focus manipulation is performed to further move the focus lens unit 2212 outside of the second range, the camera body control section 2318 ignores the control signal transmitted from the replacement lens control section 2220. Furthermore, the replacement lens control section 2220 may ignore the electrical signal from the second encoder 2260 corresponding to such a manual focus manipulation.

When it is judged that the manual focus manipulation performed by the user causes the focus lens unit 2212 to be outside the second range, the camera body control section 2318 may display in the display section 2314 a display notifying the user that the manipulation would result in the focus lens unit 2212 being outside the focus limit range. For example, the camera body control section 2318 may display the MF icon 2405 with a changed color in a blinking manner.

Figure 15:
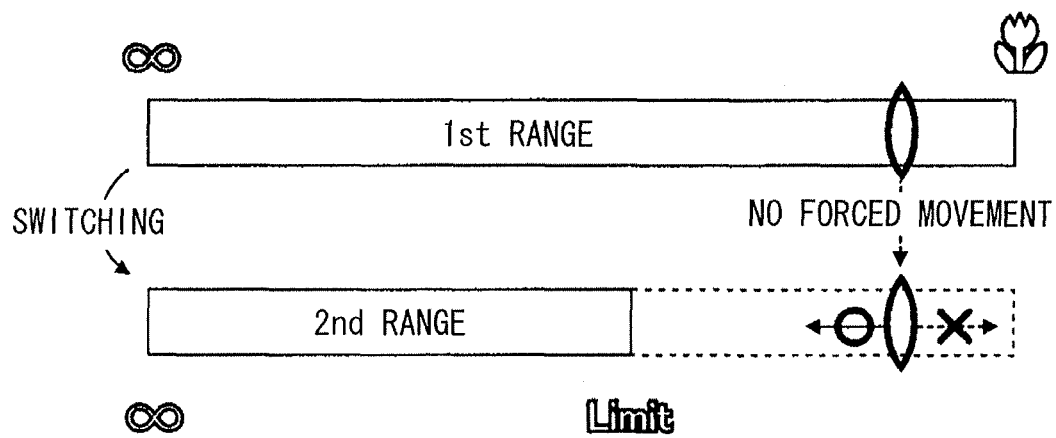
FIG. 15 is a schematic view for describing control that is different from the control described using FIG. 5, performed by the camera body control section when the focus limit setting is switched from the first range to the second range.

FIG. 15 is a schematic view for describing control that is different from the control described using FIG. 14, performed by the camera body control section 2318 when the focus limit setting is switched from the first range to the second range. Here, as an example of a case in which the focus limit setting is switched from the first range to the second range, the control performed when the AF/MF switching switch 2203 is set to the M mode and the focus limit switching switch 2201 is switched from FULL to LIMIT 1 is described, in the same manner as the example shown in FIG. 14.

When the focus limit switching switch 2201 is switched from FULL to LIMIT 1 by the user, the camera body control section 2318 judges whether the focus lens unit 2212 is positioned outside the second range. In the present embodiment, even when it is judged that the focus lens unit 2212 is positioned outside the second range, the focus lens unit 2212 is not moved to a boundary position of the second range. In this case, the user can more quickly perform the manual focus manipulation without waiting while the focus lens unit 2212 is moved.

When the focus lens unit 2212 is outside of the second range, the camera body control section 2318 performs drive control according to the drive direction of the focus lens unit 2212. When the manual focus manipulation is performed in a manner to move the focus lens unit 2212 in a direction toward the second range, the camera body control section 2318 does not limit the driving. However, when the manual focus manipulation is performed in a manner to move the focus lens unit 2212 in a direction away from the second range, the camera body control section 2318 does not drive the focus lens unit 2212.

Specifically, the camera body control section 2318 calculates the number of pulses corresponding to the target position of the focus lens unit 2212 according to the manual focus manipulation performed by the user via the focus ring 2202. In a case where the focus lens unit 2212 is outside the second range, when the manual focus manipulation performed by the user is judged to be a manipulation that would cause the focus lens unit 2212 to move in a direction away from the second range, the camera body control section 2318 does not transmit the control signal to the replacement lens control section 2220. On the other hand, when the manual focus manipulation performed by the user is judged to be a manipulation that would cause the focus lens unit 2212 to move in a direction toward from the second range, the camera body control section 2318 transmits the control signal to the replacement lens control section 2220. The replacement lens control section 2220 drives the drive motor 2251 according to the received control signal to move the focus lens unit 2212. In a case where the focus lens unit 2212 does not reach the second range as a result of the one manual focus operation as well, the camera body control section 2318 continues to prohibit the focus lens unit 2212 from moving in a direction away from the second range. After the focus lens unit 2212 has reached the second range, the camera body control section 2318 performs control in the same manner as in the example of FIG. 14.

Figure 16:
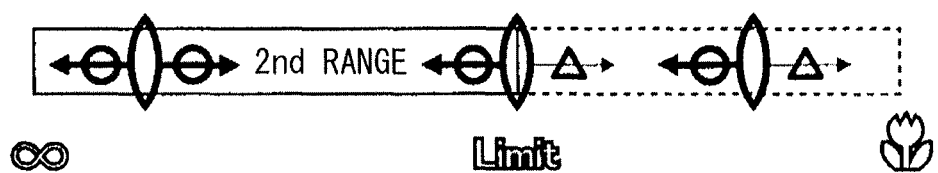
FIG. 16 is a schematic view for describing control according to another embodiment example performed by the camera body control section when the focus limit setting is set to the second range.

FIG. 16 is a schematic view for describing control according to another embodiment example performed by the camera body control section 2318 when the focus limit setting is set to the second range. In this embodiment example as well, the user can freely move the focus lens unit 2212 within the second range, in the same manner as in the examples of FIG. 14 and FIG. 15. On the other hand, in the present embodiment example, the user can move the focus lens unit 2212 even outside of the second range under a predetermined limit condition. A variety of conditions can be set as the limit condition, but here, a condition is set that there is a greater feeling of resistance when performing the manual focus manipulation in a case where the focus lens unit 2212 is being moved outside of the second range in a direction away from the second range than in a case where the focus lens unit 2212 is being moved in a direction toward the second range.

Specifically, the camera body control section 2318 sets the drive amount of the focus lens unit 2212 relative to a rotation amount of the focus ring 2202 causing the focus lens unit 2212 to move in a direction away from the second range to be less than the drive amount of the focus lens unit 2212 relative to a rotation amount of the focus ring 2202 causing the focus lens unit 2212 to move in a direction toward the second range. For example, assuming that the focus lens unit 2212 is moved by d (mm) when the user rotates the focus ring 2202 by r (°) in a direction causing the focus lens unit 2212 to move toward the second range, control is performed such that the focus lens unit 2212 is moved by d/2 (mm) when the user rotates the focus ring 2202 by r (°) in a direction causing the focus lens unit 2212 to move away from the second range.

By performing such control, the user can sense that the focus lens unit 2212 is being moved farther beyond the second range. In a case where the focus lens unit 2212 is moved by d (mm) when the user rotates the focus ring 2202 by r (°) while the focus lens unit 2212 is within the second range, control may be performed such that the focus lens unit 2212 is moved by 2d (mm) when the user rotates the focus ring 2202 by r (°) in a direction causing the focus lens unit 2212 to move from outside the second range toward the second range. In other words, control may be performed such that the focus lens unit 2212 is moved more quickly to be inside the second range. With this control, when the user senses that the focus lens unit 2212 is outside the second range, the user can move the focus lens unit 2212 more quickly back into the second range.

In the present embodiment, when movement instructions are received that cause the focus lens unit 2212 to move outside the second range, the camera body control section 2318 drives the drive motor 2251 via the replacement lens control section 2220 such that the movement amount of the focus lens unit 2212 relative to the manipulation amount is reduced. In other words, during autofocus, when the focus limit switching switch 2201 is switched to LIMIT 1, the focus lens unit 2212 can only move within the second range, but during the manual focus, even when the focus limit switching switch 2201 is switched to LIMIT 1, the focus lens unit 2212 can move even outside the second range under the limit condition. By providing such a difference, the operations on the camera side can be reliably limited during the autofocus, and the intent of the user can be prioritized during the manual focus.

As another variation, in a case where a manipulation of the focus ring 2202 continues being received from the user as well, the camera body control section 2318 can perform control to temporarily stop the movement of the focus lens unit 2212 at a boundary position of the second range. For example, when the focus lens unit 2212 has reached a boundary position of the second range, the camera body control section 2318 ignores the manipulation until the user has rotated the focus ring 2202 by at least 180°, thereby stopping the focus lens unit 2212 at the boundary position. When the user further rotates the focus ring 2202, the focus lens unit 2212 is driven according to this rotation amount away from the second range. The movement amount relative to the rotation amount may be limited as described above. By performing such control, the user can sense that the focus lens unit 2212 is moving outside of the second range.

Figure 17A:
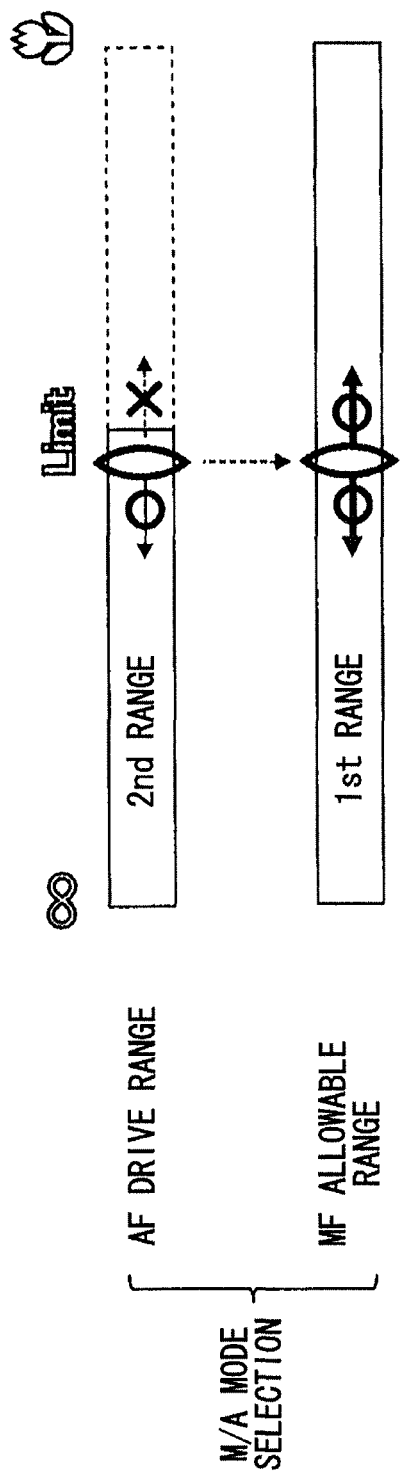
FIG. 17A is a perspective view for describing a difference between control performed when the M/A mode is selected and control performed when the M mode is selected, in a case where the focus limit switching switch is set to LIMIT 1.
Figure 17B:
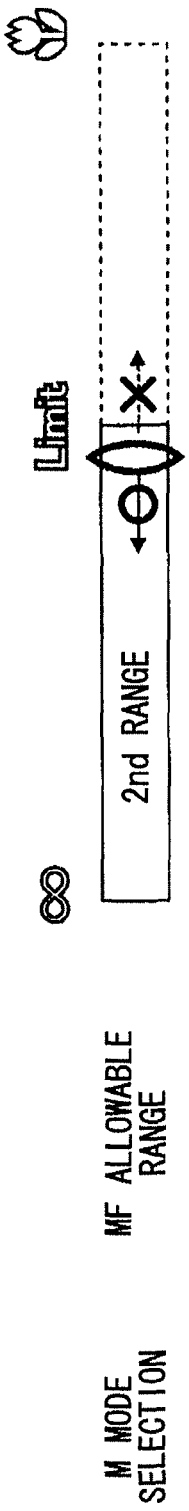
FIG. 17B is a perspective view for describing a difference between control performed when the M/A mode is selected and control performed when the M mode is selected, in a case where the focus limit switching switch is set to LIMIT 1.

FIGS. 17A and 17B are each a perspective view for describing a difference between control performed when the M/A mode is selected and control performed when the M mode is selected, in a case where the focus limit switching switch 2201 is set to LIMIT 1. FIG. 17A shows an example of the drive limit of the focus lens unit 2212 when the M/A mode is selected. When the autofocus operation is performed, the movement of the focus lens unit 2212 is limited to be within the second range. In other words, when the autofocus operation is performed, the camera body control section 2318 limits the drive range of the focus lens drive section 2250 such that the focus lens unit 2212 is stopped in the second range. On the other hand, when the manual focus operation is performed, the user can freely move the focus lens unit 2212 in the first range without being limited to the second range. Specifically, the camera body control section 2318 drives the focus lens unit 2212 according to the manipulation amount, without adding any limit to the manual focus manipulation by the user. With such control, when the M/A mode is selected, the user can correct the focal position resulting from the autofocus by performing the manual focus manipulation, without being limited to the second range.

FIG. 17B shows an exemplary drive limit of the focus lens unit 2212 when the M mode is selected. When the M mode is selected, the movement of the focus lens unit 2212 is limited to be within the second range. In other words, the user can freely move the focus lens unit 2212 within the second range, but cannot move the focus lens unit 2212 outside the second range. With such control, when the M mode is selected, the user is prevented from moving the focus lens unit 2212 outside of the focus limit set intentionally by the user. The camera body control section 2318 need not completely prohibit movement of the focus lens unit 2212 in the second range, and may limit the movement as described using FIG. 16.

Figure 18:
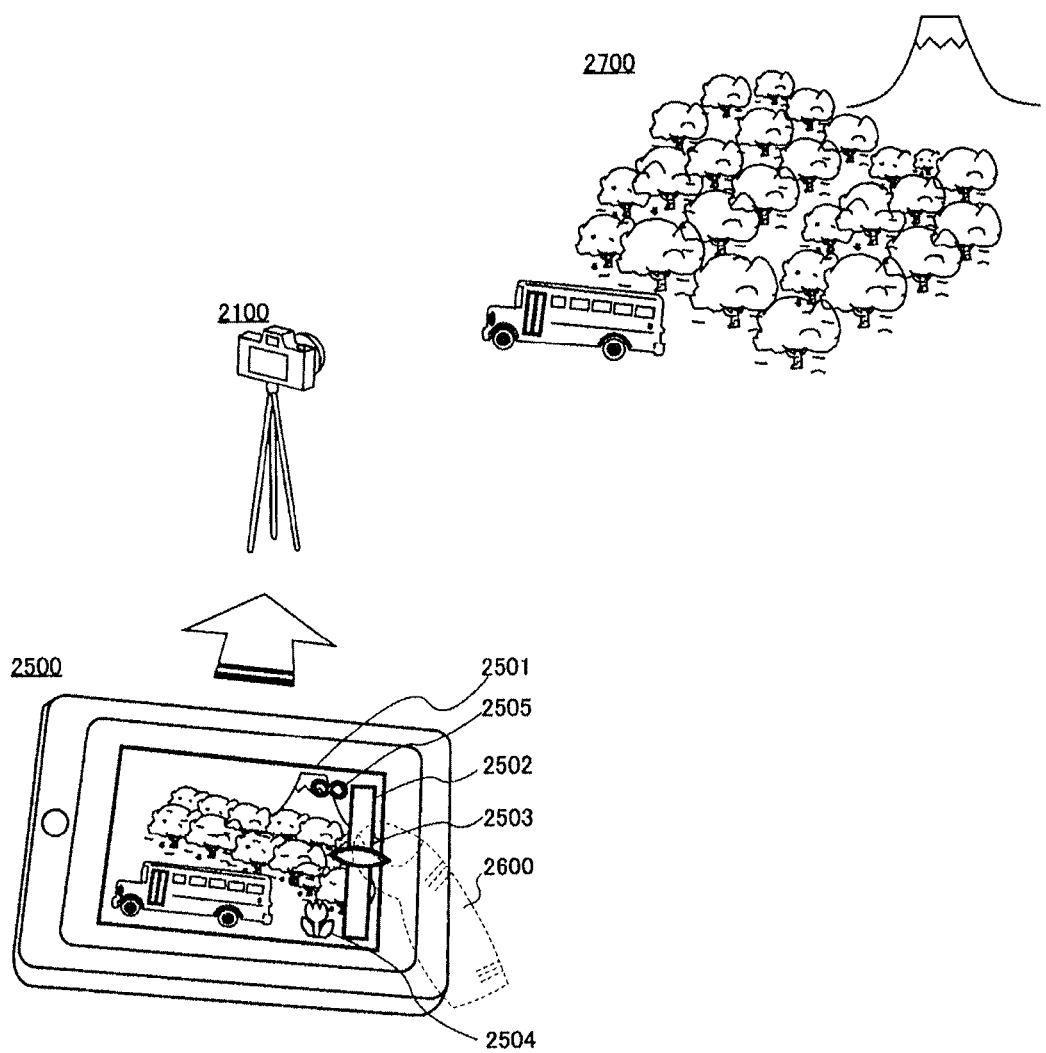
FIG. 18 is a drawing for describing a case where the camera system is controlled by a tablet terminal that is an external device.

FIG. 18 is a drawing for describing a case where the camera system 2100 is controlled by a tablet terminal 2500 that is an external device. In particular, a case is described in which the drive of the focus lens unit 2212 of the camera system 2100 is controlled by the tablet terminal 2500. The camera system 2100 and the tablet terminal 2500 communicate wirelessly with each other. Various wireless communication standards such as Wi-Fi (Registered Trademark) and Bluetooth (registered trademark) can be adopted for the wireless communication. Furthermore, a tablet terminal is given as an example of the external device, but instead a smartphone, personal computer, mobile telephone, wearable terminal, or the like can be used as the external device.

When the camera system 2100 is controlled by the tablet terminal 2500, the camera system 2100 is set in advance to a remote manipulation mode in which the camera system 2100 is manipulated remotely by the user using the external device. When the camera system 2100 is set to the remote manipulation mode, the user can perform the manual focus manipulation of the focus lens unit 2212 of the camera system 2100, for example, via the tablet terminal 2500. The camera system 2100 is arranged in front of a subject that is the image capturing target. In FIG. 18, the camera system 2100 is secured to a tripod. The camera system 2100 captures an image of scenery 2700 expanding in front of the camera system 2100 to sequentially generate a live view image. Furthermore, as described in FIG. 13, the camera system 2100 generates an indicator image relating to the focus limit. The camera system 2100 transmits the generated live view image and indicator image to the tablet terminal 2500.

The tablet terminal 2500 includes a display section 2501. The tablet terminal 2500 receives the transmitted live view image and indicator image, and displays these images in the display section 2501 in a superimposed manner. The indicator image includes a display bar 2502 and a lens icon 2503 indicating the focal position corresponding to the current position of the focus lens unit 2212. The display bar 2502 also includes a close side marker 2504 indicating the close end of the display bar 2502 and a far side marker 2505 indicating the far end of the display bar 2502.

The user can perform the manual focus manipulation of the focus lens unit 2212 of the camera system 2100 by manipulating the lens icon 2503 displayed in the display section 2501. Specifically, the user uses a finger 2600 to press the lens icon 2503 displayed in the display section 2501. Then, while maintaining the pressing state, the user slides the finger up or down on the display bar 2502. The tablet terminal 2500 calculates the movement amount of the focus lens unit 2212 according to this slide manipulation. Specifically, the tablet terminal 2500 first calculates the movement amount of the lens icon 2503 caused by the slide manipulation. The tablet terminal 2500 then calculates the movement amount of the focus lens unit 2212 corresponding to the movement amount of the lens icon 2503, by using a preset conversion formula between the movement amount of the lens icon 2503 and the movement amount of the focus lens unit 2212. The tablet terminal 2500 preferably calculates the movement amount of the lens icon 2503 as a number of pulses. The tablet terminal 2500 transmits the calculated movement amount of the focus lens unit 2212 to the camera system 2100.

Upon receiving the movement amount of the focus lens unit 2212, the camera system 2100 drives the focus lens unit 2212 via the replacement lens control section 2220 according to the movement amount. Here, when the user remotely manipulates the camera system 2100 using the tablet terminal 2500, it is assumed that the user is at a position distanced from the camera system 2100. When the user is at a position distanced from the camera system 2100, the user cannot perform switching by manipulating the focus limit switching switch 2201 provided on the replacement lens 2200. Therefore, in the present embodiment, when the user performs the manual focus manipulation of the focus lens unit 2212 of the camera system 2100 remotely using the tablet terminal 2500, even if the focus limit switching switch 2201 is switched to the second range, for example, the camera body control section 2318 drives the focus lens unit 2212 in the first range. In this way, the user can perform the manual focus manipulation in the first range via the tablet terminal 2500, without directly manipulating the focus limit switching switch 2201.

After this, when the image capturing instructions are received from the user, the tablet terminal 2500 instructs the camera system 2100 to perform image capturing. As described above, by remotely operating the camera system using the tablet terminal 2500, the user can capture an image of the scenery 2700 with the desired focus achieved through the manual focus manipulation.

In the above description, the allowable movement range of the focus lens unit is switched by the focus limit switching switch 2201, but this range may instead be switched by the tablet terminal 2500. In this case, the tablet terminal 2500 may display a menu screen for switching the focus limiter setting in the display section 2501 and perform switching according to the manipulation by the user. When the allowable movement range of the focus lens unit is switched to the second range by the tablet terminal 2500, the tablet terminal 2500 may display the indicator image corresponding to the second range. For example, as shown in FIG. 13, the limit marker may be displayed. Furthermore, when the allowable movement range is switched to the second range, the tablet terminal 2500 may limit the manipulation range of the lens icon 2503 by the user to correspond to the second range.

Figure 19:
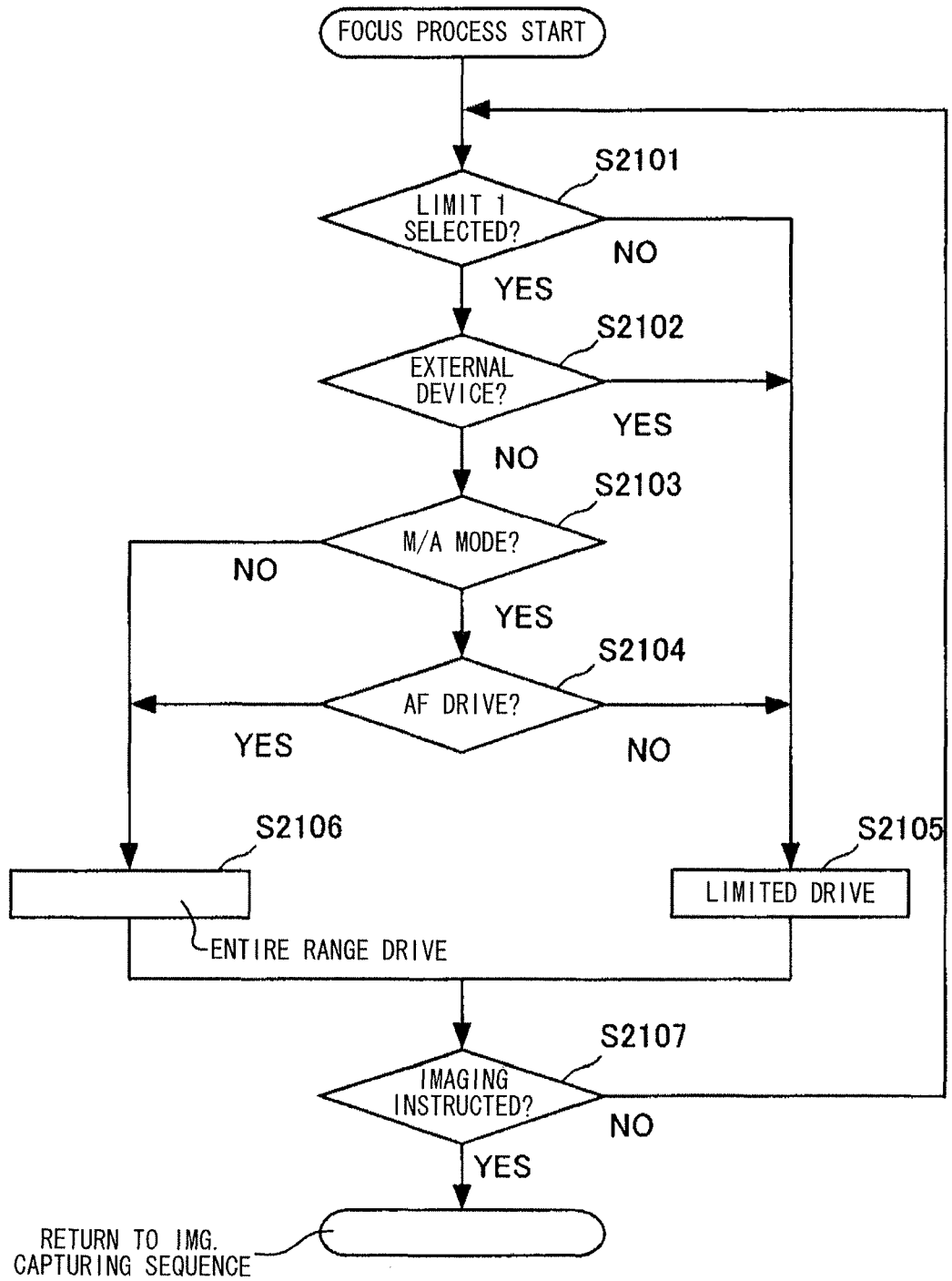
FIG. 19 is a flow chart showing an example of the drive control of the focus lens unit performed by the camera body.

FIG. 19 is a flow chart showing an example of the drive control of the focus lens unit 2212 performed by the camera body 2300. This flow is begun by the camera body control section 2318 detecting SW1, if the focus control state is the M/A mode, or by the camera body control section 2318 receiving the rotation amount of the focus lens unit 2212 caused by the user from the replacement lens control section 2220, if the focus control state is the M mode. In the above description, the focus limit switching switch 2201 is switched to one of three positions that include FULL, LIMIT 1, and LIMIT 2, but in this flow, in order to simplify the description, a case is described in which the focus limit switching switch 2201 is switched to one of FULL and LIMIT 1. Switching to LIMIT 2 uses the same process as switching to LIMIT 1. The camera body control section 2318 receives the switch state information from the replacement lens 2200 according to the steady sequence performed periodically with the replacement lens control section 2220. The received switch state information is held in the internal memory 2310.

The camera body control section 2318 references the switch state information and judges whether the focus limit switching switch 2201 is switched to LIMIT 1 (step S2101). When it is judged that the focus limit switching switch 2201 is not switched to LIMIT 1, i.e. when it is judged that the focus limit switching switch 2201 is switched to FULL (NO at step S2101), the camera body control section 2318 controls the replacement lens control section 2220 to drive the focus lens unit 2212 in the first range, i.e. the entire range (step S2105).

When it is judged that the focus limit switching switch 2201 is switched to LIMIT 1 (YES at step S2101), the camera body control section 2318 judges whether an image capturing manipulation has been performed by an external device (step S2102). By judging whether the external communication section 2319 has received a signal relating to an image capturing manipulation from an external device, the camera body control section 2318 can judge whether an image capturing manipulation has been performed by the external device. The signal relating to the image capturing manipulation includes a signal indicating image capturing instructions and a signal indicating the movement amount of the focus lens unit 2212, as described in FIG. 18. When it is judged that an image capturing manipulation has been performed by the external device (YES at step S2102), even if the focus limit switching switch 2201 is switched to LIMIT 1, the camera body control section 2318 controls the replacement lens control section 2220 to drive the focus lens unit 2212 in the entire range, as described in FIG. 18 (step S2105).

When it is judged that an image capturing manipulation has not been performed by the external device (NO at step S2102), a judgment is made as to whether the focus control state is switched to the M/A mode (step S2103). When it is judged that the focus control state is not switched to the M/A mode, i.e. when it is judged that the focus control state is switched to the M mode (NO at step S2103), as shown in FIG. 17B, the camera body control section 2318 selects the focus limit for the infinitely far region and controls the replacement lens control section 2220 to drive the focus lens unit 2212 within this focus limit, i.e. to perform limited driving of the focus lens unit 2212 (step S2106). When it is judged that the focus control state is switched to the M/A mode (YES at step S2103), the camera body control section 2318 judges whether the AF operation is currently being performed (step S2104).

When it is judged that the AF operation is currently being performed (YES at step S2104), the camera body control section 2318 selects the focus limit for the infinitely far region and controls the replacement lens control section 2220 to drive the focus lens unit 2212 within this focus limit, i.e. to perform limited driving of the focus lens unit 2212 (step S2106). When it is judged that the AF operation is not currently being performed (NO at step S2104), the camera body control section 2318 controls the replacement lens control section 2220 to drive the focus lens unit 2212 within the first range, i.e. to drive the focus lens unit 2212 in the entire range, without limiting the focus, as shown in FIG. 17A (step S2105).

After the focus lens unit 2212 has been driven according to step S105 or step S106, the camera body control section 2318 judges whether image capturing instructions have been received from the user (step S2107). When it is judged that the image capturing instructions have not been received from the user (NO at step S2107), the process moves to step S2101. When it is judged that the image capturing instructions have been received from the user (YES at step S2017), this series of processes is ended and the processing returns to the image capturing sequence.

In the above description, when the focus ring 2202 is rotationally manipulated by the user, the replacement lens control section 2220 transmits to the camera body control section 2318 the information concerning the rotation direction and the rotation amount of the focus ring 2202. Then, when the allowable movement range of the focus lens unit 2212 is switched from the first range to the second range, the focus lens drive section 2250 limits the movement instructions of the focus lens unit 2212 by the user manipulation according to the drive instructions from the camera body control section 2318. However, when communication cannot be performed with the camera body control section 2318 and the replacement lens control section 2220, the focus lens drive section 2250 may limit the movement instructions of the focus lens unit 2212 by the user manipulation according to the drive instructions from the replacement lens control section 2220. In this case, the replacement lens control section 2220 need not transmit the information concerning the rotation direction and rotation amount of the focus ring 2202 to the camera body control section 2318.

In the above description, the focus limiter is set on the replacement lens 2200 side, but the focus limiter may instead be set on the camera body 2300 side. In this case, the camera body control section 2318 may display a menu screen for switching the setting of the focus limiter in the display section 2314 and may perform switching according to the manipulation by the user made via the manipulation member 2315. Furthermore, the camera body control section 2318 may transmit the switch state information to the replacement lens 2200 when polling occurs. Upon receiving the polling, the replacement lens control section 2220 transmits the number of divisions corresponding to the state indicated by the switch information, the limited position information, and the like along with the first information and the second information.

In the above description, the replacement lens 2200 is a zoom lens, but the replacement lens 2200 may instead be a single focus lens. In this case, the focal distance does not change, and therefore the first information and the second information have fixed values. Accordingly, the replacement lens control section 2220 need only transmit the first information and the second information once. In other words, this information need not be transmitted every time the polling is received during the steady sequence. The same is true for the display information.

In the above description, the replacement lens control section 2220 transmits the first information and the second information as a number of pulses, but the replacement lens control section 2220 may instead transmit distance information. In this case, the camera body 2300 receives the distance information and converts this distance information into a number of pulses. In the above description, the infinitely far end design value is used as the reference value, but another value may be used as the reference value instead. For example, the very close end design value may be used as the reference value. In the above description, the settings on the camera body 2300 side are prioritized when selecting the drive range of the focus lens unit 2212, but instead, a manipulation by the user may be performed to set which of the settings on the replacement lens 2200 side or the settings on the camera body side are prioritized. In this way, the intent of the user can be reflected to a greater degree.

In the above description, a number of pulses is given as an example of the control signal for moving the focus lens unit 2212 to the target position, but the present invention is not limited to this and any format can be used as long as at least one of a movement amount and a target position can be transferred.

In the above description, the replacement lens control section 2220 transmits the very close end soft limit and the infinitely far end soft limit to the camera body 2300 as the first information corresponding to the setting without a focus limit, but instead, the infinitely far end design value and the very close end design value may be transmitted as the first information. Similarly, the replacement lens control section 2220 may transmit the infinitely far end design value and the very close end design value as the second information, as the focus limit for the infinitely far region, and may transmit the far end design value and the very close end design value as the second information, as the focus limit for the very close region. As described above, in a case where the autofocus is performed using a contrast method, when focus is achieved at the infinitely far end design value, for example, the actual focus point moves beyond the infinitely far end design value toward the infinitely far side. In contrast to this, when the autofocus is performed using a phase difference method, focus can be achieved at the infinitely far end design value without moving beyond the infinitely far end design value toward the infinitely far side. Accordingly, the replacement lens control section 2220 may transmit different second information in a case where the autofocus is performed using a contrast method and a case where the autofocus is performed using a phase difference method. When the autofocus is performed using the phase difference method, the values at the ends of the focusable range may be transmitted without transmitting the values at the ends of the drive range of the focus lens unit 2212.

In the above description, the replacement lens 2200 transmits compression information that is information relating to a range narrower than the first range as the second information, but instead the replacement lens 2200 may transmit expansion information that is information relating to a range wider than the first range. For example, a number of pulses closer to the very close end than the very close end soft limit described in FIG. 12 is transmitted as the second information. In this case, the replacement lens 2200 may also transmit recommendation information indicating which of the first range and the second range is a recommended drive range that ensures optical performance greater than or equal to a predetermined reference. If one of a mode prioritizing the focus range and a mode prioritizing image quality is set on the camera body 2300 side, the drive range of the focus lens unit 2212 may be selected according to this setting. In this case, the focus limit switching switch 2201 does not function as a switching section and a switch may be provided that switches between the mode prioritizing the focus range and the mode prioritizing the image quality. If the mode prioritizing the image quality is set, information relating to the range indicated by the recommendation information is selected. On the other hand, if the mode prioritizing the focus range is set, information relating to a range differing from the range indicated by the recommendation information is selected. Furthermore, the range may be selected according to the setting information on the camera body 2300 side. For example, when the image capturing mode is set to the full auto mode, the range may be selected to prioritize the focus range even when the mode prioritizing the image quality is set. Furthermore, the switching section may be a switch that switches the AF speed. In particular, when the mode for performing high-speed AF is set for the contrast AF, a narrower range is selected than when a mode for performing low-speed AF is set.

In the above description, the second range includes a focus limit for the infinitely far region and a focus limit for a very close region, but the second range may instead include only one of these focus limits. In other words, the focus limit switching switch 2201 may be a switch that switches between two positions instead of three positions. Furthermore, the second range may include three or more ranges.

In the above description, as shown in FIG. 16, the camera body control section 2318 switches the range of the focus limit according to the switch state information, but instead the camera body control section 2318 may prohibit the switching process for switching the range of the focus limit under a predetermined condition. For example, the predetermined condition may be exemplified by an AF lock being in effect, the focus lens unit 2212 being driven, or the like. When the switching process is prohibited, the switching process is put on hold until the condition is removed, i.e. the operation in the immediately prior focus limit range continues. When the condition is removed, the switching process that was put on hold is performed. The switching process may be performed only when the focus control state is AF. While the switching is being performed and while the switching process is on hold, the camera body control section 2318 need not perform the switching of the focus control state, the MF operation, and the AF operation. When the focus control state is MF, the switching process need not be performed regardless of the position of the focus lens unit 2212. In this case, only the switch state information, the various design values, and the various soft limits in the internal memory 2310 are updated.

Figure 20:
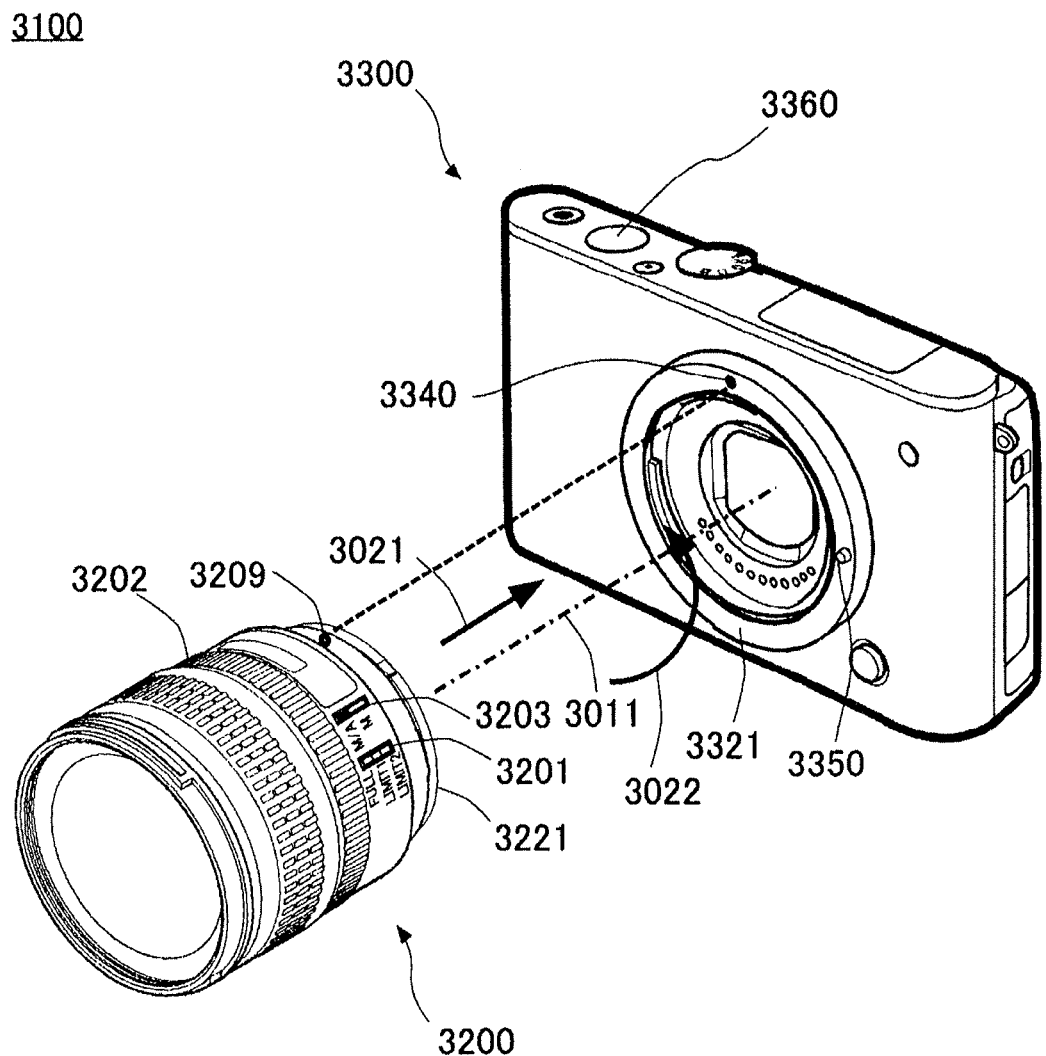
FIG. 20 is an external perspective view of a camera system according to a second embodiment.

FIG. 20 is an external perspective view of a camera system 3100 according to a third embodiment. The camera system 3100 is a single-lens reflex camera with a replacement lens formed by attaching a replacement lens 3200 serving as an imaging device to a camera body 3300. The replacement lens 3200 includes a lens mount 3221 and the camera body 3300 includes a camera mount 3321. When the lens mount 3221 and the camera mount 3321 engage with each other to form the replacement lens 3200 and the camera body 3300 integrally, the replacement lens 3200 and the camera body 3300 function as the camera system 3100.

The lens mount 3221 is brought near the camera mount 3321 along the arrow 3021 parallel to the optical axis 3011, such that the lens marker 3209 and the body marker 3340 are opposite each other and in contact with each other. Furthermore, the replacement lens 3200 is rotated in the direction of the arrow 3022 while contact is maintained between the mounting surface of the lens mount 3221 and the mounting surface of the camera mount 3321. When this happens, the lock mechanism formed by the lock pin 3350 operates to secure the replacement lens 3200 to the camera body 3300. In this state, a connection terminal on the replacement lens 3200 side is electrically connected to a connection terminal on the camera body 3300 side. As a result, it is possible to transfer power and communication such as control signals between the replacement lens 3200 and the camera body 3300.

The replacement lens 3200 includes a focus limit switching switch 3201 serving as the switching section, a focus ring 3202, and an AF/MF switching switch 3203. The AF/MF switching switch 3203 switches the focus control state between an M mode and an M/A mode. The user can set the M mode that enables the manual focus operation by switching the AF/MF switching switch 3203 to M. Furthermore, it is possible to set the M/A mode that enables both the autofocus operation and the manual focus operation by switching the AF/MF switching switch 3203 to M/A.

The camera body 3300 includes a release switch 3360. The release switch 3360 is formed by a press button that can detect two stages in a pressing direction. When the M/A mode is set, the user can perform the autofocus operation by pressing the release switch 3360 to the first stage. Furthermore, after the autofocus operation has ended, the user can perform the manual focus operation by manipulating the focus ring 3202. By additionally performing the manual focus operation, the focus lens unit that was moved once by the autofocus operation can be further driven to correct the focal position. In the manner described above, in the present embodiment, the modes that can be selected by the AF/MF switching switch 3203 are the M mode and the M/A mode. However, instead of the M/A mode, an A mode may be adopted that is an autofocus mode not allowing the manual focus manipulation using the focus ring 3202.

As described in detail further below, in the present embodiment, the focus ring 3202 and the focus lens unit are not mechanically linked. The information concerning the rotation direction and the rotation amount per unit time applied to the focus ring 3202 by the user is temporarily converted into an electrical signal. An actuator drives the focus lens unit in the direction of the optical axis in order to change the focal position, according to this electrical signal.

The focus limit switching switch 3201 switches between a first range, which is a range in which movement of the focus lens unit is allowed, and a second range that is different from the first range. By switching the focus limit switching switch 3201, a user can select a drive range for the focus lens unit. In the present embodiment, the first range is a range in which there are no focus limitations, and the second range is a range that is narrower than the first range, i.e. a range in which there is a focus limitation. In the present embodiment, two focus limits are set as the second range. As described in detail further below, a focus limit for an infinitely far region and a focus limit for a very close region are set.

The user can set the first range by switching the focus limit switching switch 3201 to FULL, set the focus limit for the infinitely far region by switching the focus limit switching switch 3201 to LIMIT 1, and set the focus limit for the very close region by switching the focus limit switching switch 3201 to LIMIT 2. In other words, it is possible to select any one of three positions by switching the focus limit switching switch 3201. By limiting the movement range of the focus lens unit, it is possible to shorten the focusing time. Regardless of which of the three positions the focus limit switching switch 3201 is switched to, the replacement lens 3200 transmits both first information relating to the first range and second information relating to the second range to the camera body 3300, as mobility information relating to the movable range of the focus lens unit. Furthermore, the replacement lens 3200 transmits switch state information as setting information indicating which of the three positions is switched to. Yet further, the replacement lens 3200 transmits focus control state information indicating whether the focus control state is switched to the M mode or to the M/A mode.

The camera body 3300 receives both the first information and the second information, and also the switch state information. The camera body 3300 moves the focus lens unit in the drive range of the focus lens unit corresponding to the switch state information. However, there are cases where it is undesirable for the focus lens unit to be driven in the drive range corresponding to the switch state information, depending on the state of the settings relating to image capturing on the camera body 3300 side. Therefore, the camera body 3300 selects any one of the first range and the second range according to the state of the settings relating to the image capturing, in addition to the switch state information, and may move the focus lens unit according to the selected range. If the drive range of the focus lens unit is selected according to the state of the settings relating to image capturing, this drive range can be determined with flexibility.

Figure 21:
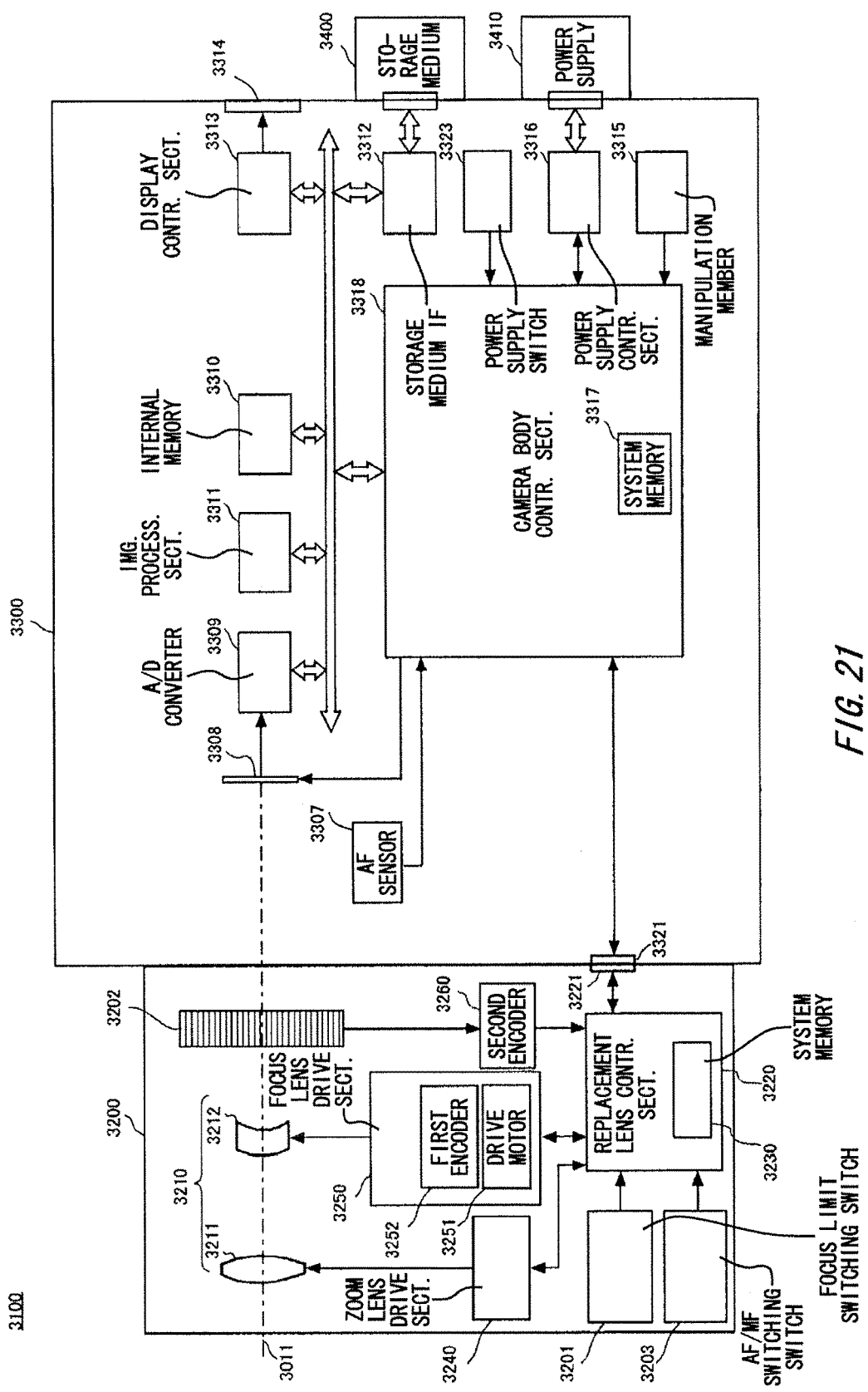
FIG. 21 is a drawing for describing the configuration of the camera system.

FIG. 21 is a drawing for describing the configuration of the camera system 3100. The replacement lens 3200 includes, in addition to the focus limit switching switch 3201, the focus ring 3202, and the AF/MF switching switch 3203, an image capturing lens 3210, a replacement lens control section 3220, a zoom lens drive section 3240, a focus lens drive section 3250, and a second encoder 3260 serving as an image capturing optical system. The camera body 3300 includes, in addition to the release switch 3360, an AF sensor 3307, an imaging element 3308, an A/D converter 3309, an internal memory 3310, an image processing section 3311, a storage medium IF 3312, a display control section 3313, a display section 3314, a manipulation member 3315, a power supply control section 3316, a camera body control section 3318, and a power supply switch 3323.

The replacement lens control section 3220 and the camera body control section 3318 are connected to each other via the lens mount 3221 and the camera mount 3321. The replacement lens control section 3220 and the camera body control section 3318 work together while communication with each other to control the camera body 3300 and the replacement lens 3200.

There are a plurality of types of replacement lenses 3200 with different optical characteristics. The user can attach any one of these replacement lenses 3200 to the camera body 3300. The image capturing lens 3210 included in the replacement lens 3200 is formed by a plurality of optical lens groups. Specifically, the image capturing lens 3210 is formed by a zoom lens unit 3211 and a focus lens unit 3212. The image capturing lens 3210 guides subject light flux incident thereto along an optical axis 3011 to an imaging element 3308 arranged within the camera body 3300.

A portion of the subject light flux that transparently passes through the optical system to be incident thereto is guided to the AF sensor 3307. The AF sensor 3307 includes a plurality of photoelectric converting element columns that receive a portion of the subject light flux guided thereto. The AF sensor 3307 outputs signals with matching phases when in the focused state and outputs signals with relatively shifted phases when in a front focus state or rear focus state. The amount of the phase shift corresponds to the amount of shift from the focus state. The AF sensor 3307 detects the phase difference by calculating the correlation of the output of the photoelectric converting element columns, and outputs a phase difference signal indicating the phase difference to the camera body control section 3318. During the autofocus operation, the camera body control section 3318 outputs a control signal for moving the focus lens unit 3212 to a target position to the replacement lens control section 3220. The camera body 3300 need not include the AF sensor 3307 as a separate component from the imaging element 3308, and may include the imaging element 3308 that has pixels with a distance measuring function.

The imaging element 3308 is an element that photoelectrically converts an optical image, which is the subject image. A CCD sensor or CMOS sensor can be used as the imaging element 3308. The subject image resulting from the photoelectric conversion by the imaging element 3308 is converted from an analog signal into a digital signal by the A/D converter 3309.

The subject image that has been converted into a digital signal is sequentially processed as image data. The image data is temporarily stored in the internal memory 3310. The internal memory 3310 is a random access memory that can perform reading and writing at high speed. A DRAM and an SRAM can be used as the internal memory 3310. The internal memory 3310 serves as a work memory in which the image processing section 3311 performs image processing and a compression process. The internal memory 3310 has a memory capacity sufficient for fulfilling this role.

The image processing section 3311 converts the image data into image data in compliance with a prescribed image format, according to the set image capturing mode and instructions from the user. For example, when generating a JPEG file as a still image, a compression process is performed by applying a suitable discrete cosine transformation or the like after performing image processing such as a color conversion process, gamma process, or a white balance process. The converted image data is again stored in the internal memory 3310.

The image data processed by the image processing section 3311 is stored in the storage medium 3400 from the internal memory 3310, via the storage medium IF 3312. The storage medium 3400 is a non-volatile memory that can be attached to and removed from the camera body 3300 and is formed by a flash memory or the like. The image processing section 3311 generates the image data to be displayed, in parallel with the processed image data to be stored. The generated image data to be displayed is displayed in the display section 3314 under the control of the display control section 3313. Regardless of whether storage is performed, the camera body control section 3318 can present a live view as an electronic finder function by having the image processing section 3311 generate sequential pieces of image data to be displayed and having the display section 3314 display this image data.

The power supply control section 3316 communicates with the power supply 3410 to detect the remaining power, monitor the power supply, supply power, and the like. The power supply 3410 is formed by a battery, for example.

The camera body 3300 includes each element used for the image processing described above, and is directly or indirectly controlled by the camera body control section 3318. The camera body control section 3318 includes a system memory 3317. The system memory 3317 is a non-volatile memory that can be electrically erased and recorded on, and is formed by an EEPROM (Registered Trademark) or the like, for example. The system memory 3317 stores constants, variables, programs, and the like that are needed when the camera system 3100 operates, such that this information is not lost when the camera system 3100 is not operating. The camera body control section 3318 suitably extracts these constants, variables, programs, and the like in the internal memory 3310 and uses this information to control the camera system 3100. The camera body control section 3318 functions as an acquiring section that acquires the mobility information relating to the moveable range of the focus lens unit 3212 and as a transmitting section that transmits response information based on the mobility information in association with a drive signal for driving the focus lens unit 3212 to the replacement lens 3200. In the present embodiment, a number of supply pulses corresponding to the drive range of the focus lens unit 3212 is associated with the drive signal as the response information. As described in detail further below, when the autofocus operation is performed, the camera body control section 3318 transmits a control command designating a movement direction of the focus lens unit 3212 and a control command designating a drive position of the focus lens unit 3212 to the replacement lens control section 3220. When the manual focus operation is performed, the camera body control section 3318 converts the electrical signal described further below into a drive control signal expressing the drive direction and drive amount per unit time, and transmits this drive control signal to the replacement lens control section 3220.

The camera body control section 3318 may drive the focus lens unit 3212 such that the subject image in a specified region is in focus on the light receiving surface of the imaging element 3308, according to contrast AF information using the pieces of image data acquired in series. Furthermore, the camera body control section 3318 performs AF or the like, which is an image capturing preparation operation, in response to detecting SW1, which is a first-stage press of the release switch 3360, and performs an operation to acquire the subject image with the imaging element 3308 in response to detecting SW2, which is a second-stage press of the release switch 3360.

The camera system 3100 includes a plurality of manipulation members 3315 that receive manipulations from the user. The manipulation members 3315 are used to set the image capturing mode, for example. The image capturing mode includes a full auto mode, a scene mode, and a manual mode. The user can set the image capturing mode by manipulating the manipulation members 3315. The camera body control section 3318 detects that these manipulation members 3315 have been manipulated and performs operations according to the manipulations.

The second encoder 3260 detects the rotation direction and rotation amount per unit time applied to the focus ring 3202 by the user, and converts this information into an electrical signal. This electrical signal is then transmitted to the camera body control section 3318 via the replacement lens control section 3220.

The zoom lens unit 3211 is driven by the zoom lens drive section 3240, under the overall control of the camera body control section 3318 and the replacement lens control section 3220. The zoom lens drive section 3240 changes the field angle by driving the zoom lens unit 3211 according to instructions from the user.

The focus lens unit 3212 is driven by the focus lens drive section 3250, under the overall control of the camera body control section 3318 and the replacement lens control section 3220. The focus lens drive section 3250 includes a drive motor 3251 serving as an actuator for driving the focus lens unit 3212 and a first encoder 3252 for detecting the position of the focus lens unit 3212. The information indicating the current position of the focus lens unit 3212 detected by the first encoder 3252 is transmitted to the camera body control section 3318 via the replacement lens control section 3220.

When performing the autofocus operation, the focus lens drive section 3250 drives the focus lens unit 3212 according to the information of the AF sensor 3307. Specifically, the focus lens drive section 3250 moves the focus lens unit 3212 to the position where the subject image of a specified region is focused on the light receiving surface of the imaging element 3308, by driving the drive motor 3251 according to the control signal transmitted from the replacement lens control section 3220.

When performing the manual focus operation, the focus lens drive section 3250 drives the focus lens unit 3212 according to information of the rotation direction and rotation amount per unit time applied to the focus ring 3202 by the user. Specifically, the replacement lens control section 3220 drives the focus lens unit 3212 in the optical axis direction to change the focal position, by generating a drive pulse according to the drive control signal transmitted from the replacement lens control section 3220 to drive the drive motor 3251.

When the focus limit switching switch 3201 is switched, an electrical signal corresponding to the selected position of the switch is transmitted to the replacement lens control section 3220. The replacement lens control section 3220 performs focus control corresponding to the received electrical signal. When the AF/MF switching switch 3203 is switched, an electrical signal corresponding to the selected position of the switch is transmitted to the replacement lens control section 3220. The replacement lens control section 3220 performs focus control corresponding to the received electrical signal.

The replacement lens control section 3220 includes a system memory 3230. The system memory 3230 stores information relating to the replacement lens 3200. Lens function information indicating that the replacement lens includes the focus limit switching switch 3201, a set including first pulse information indicating the first range and second pulse information indicating the second range, and the like are stored as the information relating to the replacement lens 3200. A plurality of sets that each include first pulse information and second pulse information are stored according to the focal distance.

When communication is established with the camera body control section 3318, the replacement lens control section 3220 transmits the information relating to the replacement lens 3200 to the camera body control section 3318. For example, the replacement lens control section 3220 transmits the lens function information described above. After this, every time polling is received from the camera body 3300, the set of the first pulse information and the second pulse information, the switch state information, and the focus control state information are transmitted as the steady sequence. Furthermore, if the user performs a manipulation of the focus ring 3202, the information concerning the rotation direction and the rotation amount per unit time is transmitted.

The replacement lens control section 3220 drives the drive motor 3251 to move the focus lens unit 3212, and controls the driving of the drive motor 3251 based on the pulse information detected by the first encoder 3252. Furthermore, the focus lens unit 3212 functions as a receiving section that receives the drive signal for driving the focus lens unit 3212 from the camera body 330 and as a drive control section that drives the drive motor 3251 based on the response information when the response information based on the mobility information relating to the movable range of the focus lens unit 3212 is associated with the drive signal.

Figure 22:
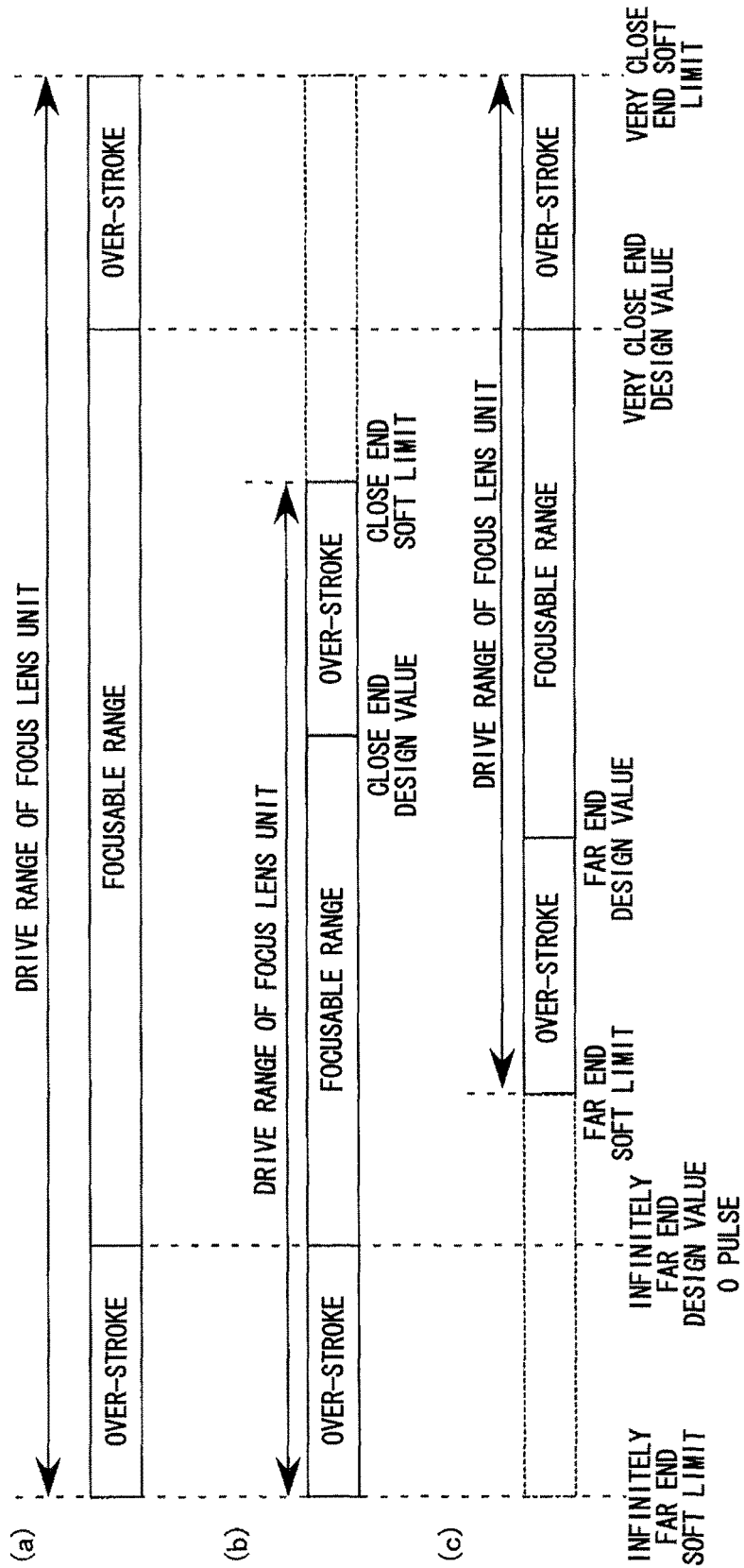
FIG. 22 is a drawing for describing the first range and the second range.

FIG. 22 is a drawing for describing the first range and the second range. Portion (a) in FIG. 22 is used to describe the first range. Portions (b) and (c) in FIG. 22 are used to describe the second range. Specifically, portion (b) in FIG. 22 is used to describe the focus limit for an infinitely far region, and portion (c) in FIG. 22 is used to describe the focus limit for a very close region. In the present embodiment, portions (a), (b), and (c) in FIG. 22 respectively correspond to states resulting from the focus limit switching switch 3201 being switched to FULL, LIMIT 1, and LIMIT 2. In the present embodiment, an infinitely far end design value is set as the reference for the drive range of the focus lens unit 3212, i.e. a 0 pulse, and the number of pulses for each type of soft limit and each type of design value described further below are determined.

As shown in portion (a) of FIG. 22, the very close end design value is a value indicating the end point of the focusable range on the very close side. When performing the autofocus operation, the focus lens unit 3212 can achieve focus in the range between the infinitely far end design value and the very close end design value, which is the focusable range of the first range. Furthermore, the infinitely far end soft limit on the infinitely far side is determined from the infinitely far end design value, and the very close end soft limit on the very close side is determined from the very close end design value. The infinitely far end soft limit is a value indicating the end point of the drive range of the focus lens unit 3212 determined in advance on the infinitely far side. The very close end soft limit is a value indicating the end point of the drive range of the focus lens unit 3212 determined in advance on the very close side. The range from the infinitely far end design value to the infinitely far end soft limit and the range from the very close end design value to the very close end soft limit are over-stroke ranges that are outside of the focusable range. In a case where the camera body 3300 performs contrast AF, when focus is achieved at the infinitely far end design value, for example, the focal point temporarily moves to the infinitely far side of the infinitely far end design value. Therefore, in the present embodiment, the over-stroke range is established by determining the infinitely far end soft limit. The same is true for the very close end soft limit.

At the focus limit for the infinitely far region, the focusable range is limited to be near an infinitely far position, as shown in portion (b) of FIG. 22. More specifically, a close end design value is determined to be on the infinitely far side from the very close end design value. The close end design value is a value indicating the end point of the focusable range on the very close side. When performing the autofocus operation, the focus lens unit 3212 can focus in the range between the infinitely far end design value and the close end design value, which is the focusable range. Furthermore, the close end soft limit is determined between the close end design value and the very close end design value. The close end soft limit is a value indicating the end point of the drive range of the focus lens unit 3212 on the very close side. The range from the infinitely far end design value to the infinitely far end soft limit and the range from the close end design value to the close end soft limit are over-stroke ranges.

At the focus limit for the very close region, the focusable range is limited to be near the very close end, as shown in portion (c) of FIG. 22. More specifically, a far end design value is determined to be on the very close side from the infinitely far end design value. The far end design value is a value indicating the end point of the focusable range on the infinitely far side. When performing the autofocus operation, the focus lens unit 3212 can focus in the range between the far end design value and the very close end design value, which is the focusable range. Furthermore, a far end soft limit is determined between the far end design value and the very close end design value. The far end soft limit is a value indicating the end point of the drive range of the focus lens unit 3212 on the infinitely far side. The range from the far end design value to the far end soft limit and the range from the very close end design value to the very close end soft limit are over-stroke ranges.

When performing the manual focus operation, in a case where the second range is selected, the focus lens unit 3212 can move in the second range according to the manipulation by the user. On the other hand, when performing the manual focus operation, the movement of the focus lens unit 3212 may be limited outside of the second range, or movement outside of the second range may be allowed according to the signal from the camera body control section 3318.

Figure 23:
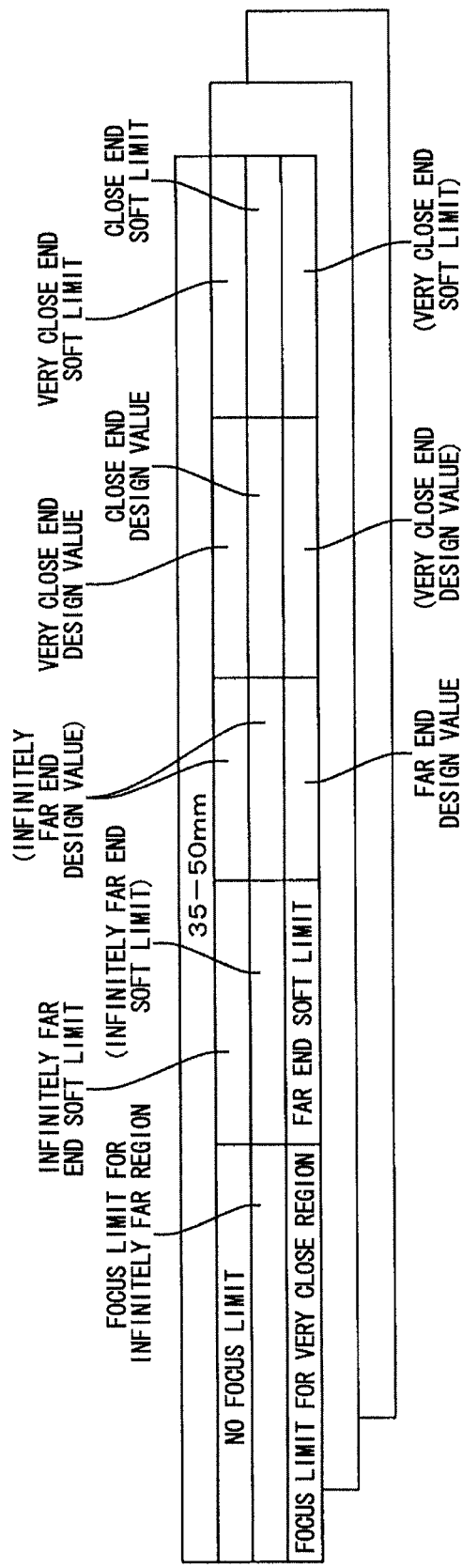
FIG. 23 is a drawing for describing the first information and the second information.

FIG. 23 is a drawing for describing the first information and the second information. As described above, the system memory 3230 stores a plurality of sets that each include the first information and the second information, according to the focal distance. If the focal distance of the zoom lens unit 3211 is from 35 mm to 100 mm, the system memory 3230 stores a set of the first information and the second information corresponding to each of three ranges, which are a range from 35 mm to 50 mm, a range from 50 mm to 75 mm, and a range from 75 mm to 100 mm, for example. FIG. 23 shows the various design values indicating the ends of the drive range of the focus lens unit 3212 and the various soft limits indicating the ends of the focusable range in the case where the focal distance is a range from 35 mm to 100 mm. The various design values and various soft limits surrounded by the parentheses in the drawing need not be transmitted to the camera body 3300, as described further below.

The replacement lens 3200 transmits the infinitely far end soft limit and the very close end soft limit to the camera body 3300 as the first information corresponding to there being no focus limit. In the present embodiment, the replacement lens 3200 also transmits the infinitely far end design value and the very close end design value as information indicating the focusable range. The infinitely far end design value is set to 0, and therefore the replacement lens control section 3220 need not transmit this value to the camera body 3300.

The replacement lens 3200 transmits the close end soft limit as the second information indicating the focus limit for the infinitely far region. In the present embodiment, the replacement lens 3200 also transmits the close end design value as information indicating the focusable range. The infinitely far end soft limit is the same as in the first information, and therefore does not need to be transmitted. Furthermore, the far end soft limit is transmitted as second information indicating the focus limit for a very close region. In the present embodiment, the replacement lens 3200 also transmits the far end design value as information indicating the focusable range. The very close end design value and the very close end soft limit are the same as in the first information, and therefore do not need to be transmitted.

As described above, the infinitely far end soft limit and the very close end soft limit are each set as a number of pulses. Accordingly, the first information is expressed as pulse information. Similarly, the close end soft limit and the far end soft limit are also each set as a number of pulses. Accordingly, the second information is also expressed as pulse information.

When moving the focus lens unit 3212, the camera body 3300 transmits control signal drive instructions relating to a target position, such as a lens drive amount expressed as a number of pulses, from the camera body control section 3318 to the replacement lens control section 3220. After receiving the drive instructions for the focus lens unit 3212 from the camera body control section 3318, the replacement lens control section 3220 drives the drive motor 3251 to move the focus lens unit 3212. The replacement lens control section 3220 detects the position of the focus lens unit 3212 using the first encoder 3252 and drives the drive motor 3251 until reaching the number of pulses transmitted from the camera body control section 3318. Here, when moving the focus lens unit 3212 from the infinitely far end to the very close end, for example, the focus lens unit 3212 is driven by a pulse amount indicated by the very close end design value corresponding to the current focal distance. For example, if the focal distance is from 35 mm to 50 mm and the very close end design value for this focal distance is 3000 pulses, the camera body control section 3318 transmits instructions for 3000 pulses of driving to the replacement lens control section 3220. In the same manner, when the focal distance is from 50 mm to 75 mm and the very close end design value for this focal distance is 2800 pulses, the camera body control section 3318 transmits instructions for 2800 pulses of driving to the replacement lens control section 3220. As described above, the number of pulses indicated by the very close end design value differs according to the focal distance. By transmitting a number of pulses corresponding to the focal distance to the replacement lens control section 3220, it is possible to suitably control the driving of the focus lens unit 3212.

FIG. 24A is a drawing for describing the control command designating the drive of the focus lens unit 3212. FIG. 24A shows a control command used when the autofocus operation is performed, specifically a control command (referred to hereinafter as a search command) designating a search for a focal position. FIG. 24B shows a control command (referred to hereinafter as a PF command) performed during the manual focus operation.

The control command shown in FIG. 24A includes the search command and a final end position of the search range for the focal position, as response information. The search command is a drive signal for driving the focus lens unit 3212 and, more specifically, indicates a movement speed and a movement direction of the focus lens unit 3212. The replacement lens control section 3220 can judge whether the focus lens unit 3212 is moving toward the very close side or moving toward the infinitely far side and can determined the movement speed of the focus lens unit 3212, by referencing the search command.

The final end position of the search range for the focal position is determined according to the allowable movement range of the focus lens unit 3212. In a case where the first range is selected as the allowable range, when the final end position is expressed by four bytes, if the final end position is expressed as 7fffffff, which is the maximum value in hexadecimal notation, the replacement lens control section 3220 drives the focus lens unit 3212 to the position of the very close end soft limit. On the other hand, if the final end position is expressed as 80000000, which is the maximum value in hexadecimal notation, the replacement lens control section 3220 drives the focus lens unit 3212 to the position of the infinitely far end soft limit.

In a case where the second range is selected as the allowable range, when the second range is the focus limit for the infinitely far region, the final end position is the position of the infinitely far end soft limit or the close end soft limit. When the second range is the focus limit for the very close region, the final end position is the far end soft limit or the very close end soft limit. By referencing the final end position, the replacement lens control section 3220 can control the movement of the focus lens unit 3212 such that the focus lens unit 3212 does not move beyond the search range for the focal position.

When performing the autofocus operation, the camera body control section 3318 transmits the final end position in association with the search command to the replacement lens control section 3220. The number of pulses associated as the final end point is the same as the number of pulses transmitted from the replacement lens control section 3220. Accordingly, the replacement lens control section 3220 can be made aware that the camera body control section 3318 understands the focus limiter.

The control command shown in FIG. 24B includes the PF (Power Focus) command and the drive range of the focus lens unit 3212, as response information. Furthermore, the PF command includes pulse number information and sampling count information, which are described further below.

The drive range of the focus lens unit 3212 is determined according to the allowable movement range of the focus lens unit 3212. In a case where the first range is selected as the allowable range, the drive range is the infinitely far end soft limit and the very close end soft limit. In a case where the second range is selected as the allowable range, when the second range is the focus limit for the infinitely far region, the drive range is the infinitely far end soft limit and the close end soft limit. In a case where the second range is selected as the allowable range, when the second range is the focus limit for the very close region, the drive range is the far end soft limit and the very close end soft limit.

When performing the manual focus operation, the camera body control section 3318 transmits the drive range in association with the PF command to the replacement lens control section 3220. The number of pulses associated as the final end position is the same as the number of pulses transmitted from the replacement lens control section 3220. Accordingly, in the same manner as when performing the autofocus operation, the replacement lens control section 3220 can be made aware that the camera body control section 3318 understands the focus limiter.

Figure 25:
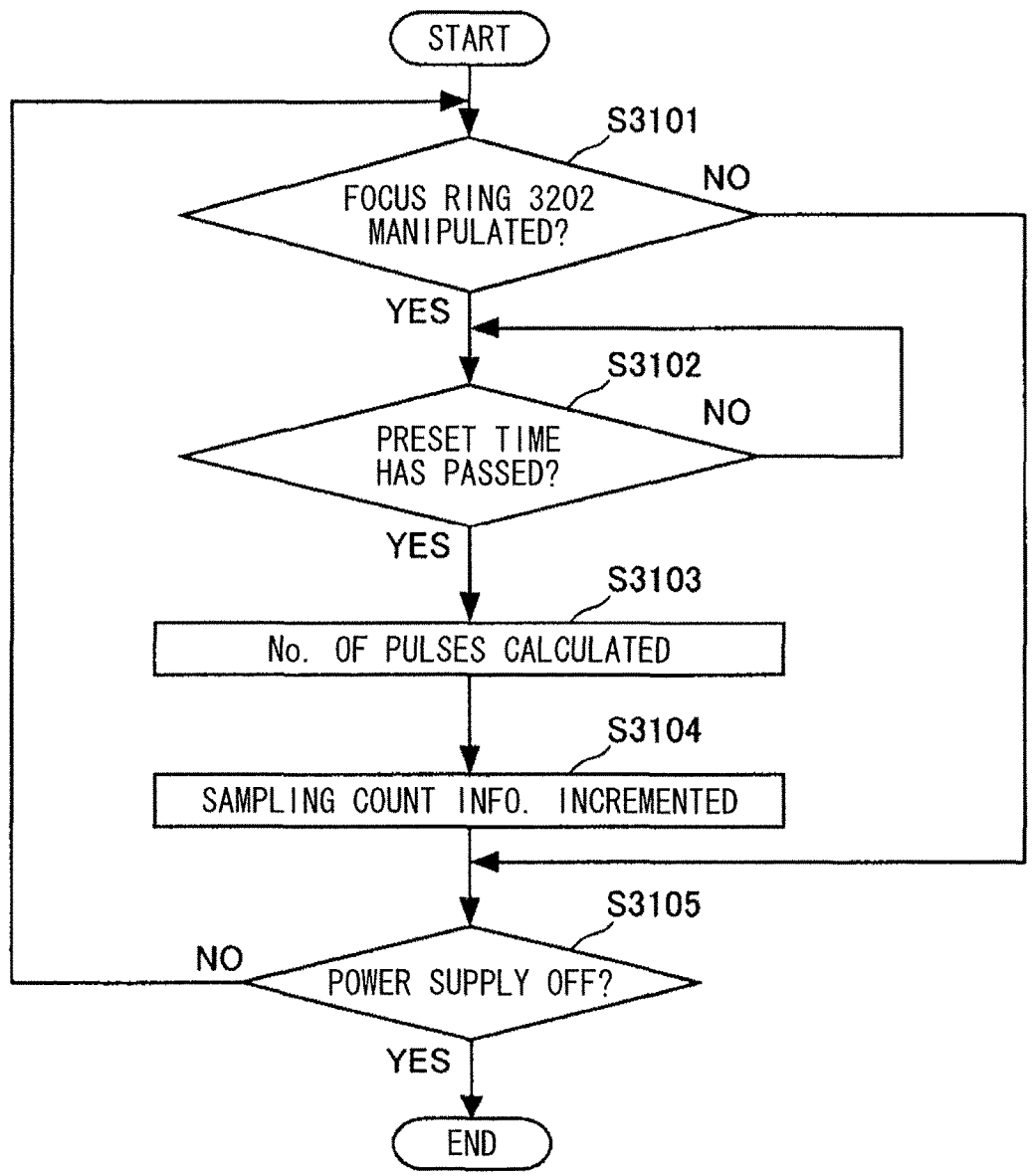
FIG. 25 is a flow chart showing an exemplary process relating to the manual focus manipulation performed by the replacement lens.

FIG. 25 is a flow chart showing an exemplary process relating to the manual focus manipulation performed by the replacement lens 3200. This flow is begun upon detecting that the replacement lens 3200 has received power from the camera body 3300. When this flow is begun, an initial value is set for the sampling count information described further below. The initial value of the sampling count information may be set after the first pulse number is calculated at step S3103 described further below.

The replacement lens control section 3220 judges whether the user has manipulated the focus ring 3202 (step S3101).

The replacement lens control section 3220 can judge whether the focus ring 3202 has been manipulated by judging whether the output of the second encoder 3260 has been received.

When it is judged that the focus ring 3202 has been manipulated (YES at step S3101), a judgment is made as to whether a preset time has passed (step S3102). The preset time is 100 [msec], for example.

When it is judged that the preset time has not yet passed (NO at step S3102), the process is put on standby and does not proceed. When it is judged that the preset time has passed (YES at step S3102), the number of pulses is calculated from the rotation amount of the focus ring 3202 resulting from the manipulation during this period (step S3103). The replacement lens control section 3220 can calculate the number of pulses using a preset conversion formula between the rotation amount and the number of pulses. The calculated number of pulses is stored in the system memory 3230. The information concerning the rotation direction of the focus ring 3202 is expressed by a positive or negative sign attached to the number of pulses. When calculating the number of pulses, the sampling count information is incremented (step S3104). The sampling count information is also stored in the system memory 3230.

As described above, every time polling is received from the camera body control section 3318, the replacement lens control section 3220 transmits the number of pulses calculated at step S3103 and the sampling count information incremented at step S3104. The polling is performed every 16 [msec], for example. In this case, the replacement lens control section 3220 transmits the number of pulses every 6 periods.

After the incrementing of the sampling count information at step S3104, or when it is judged that the focus ring 3202 has not been manipulated (NO at step S3101), the replacement lens control section 3220 judges whether the power supply has been turned OFF (step S3105). When it is judged that the power supply has not been turned OFF (NO at step S3105), the process moves to step S3101. When it is judged that the power supply has been turned OFF (YES at step S3105), the series of processes is ended.

Figure 26:
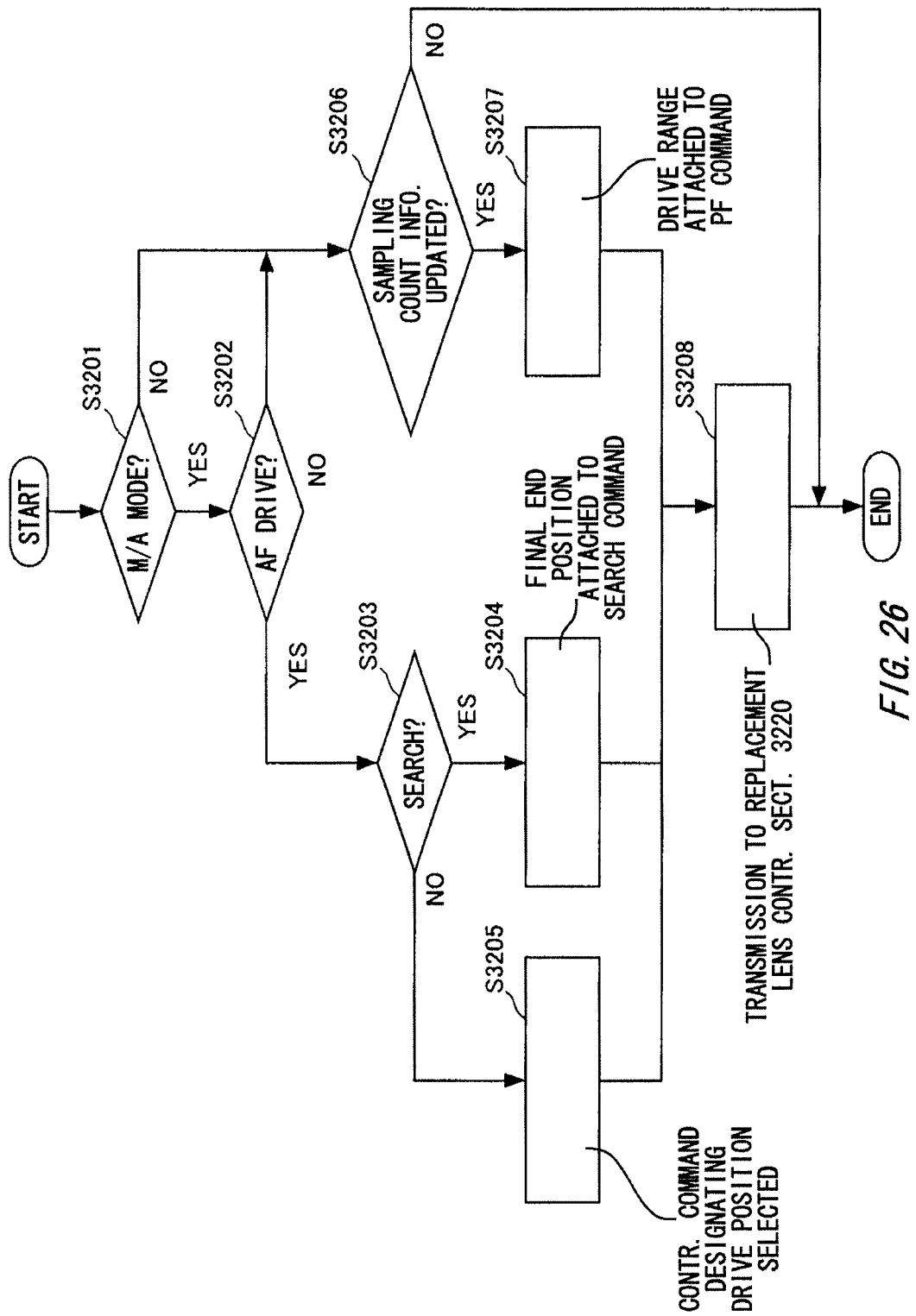
FIG. 26 is a flow chart showing an exemplary process for selecting a control command performed by the camera body.

FIG. 26 is a flow chart showing an exemplary process for selecting a control command performed by the camera body 3300. This flow is begun when the information relating to the focus limit, the switch state information, and the focus control state information are received from the replacement lens 3200 by the camera body control section 3318 according to the first instance of the steady sequence. The received information relating to the focus limit, the switch state information, and the focus control state information are held in the internal memory 3310.

The camera body control section 3318 references the focus control state information and judges whether the focus control state is switched to the M/A mode (step S3201). When it is judged that the focus control state is switched to the M/A mode (YES at step S3201), the camera body control section 3318 judges that the AF operation is currently being performed (step S3202).

When it is judged that the AF operation is currently being performed (YES at step S3202), even when the number of pulses and the sampling count information described in FIG. 25 are received, the camera body control section 3318 ignores the received number of pulses and sampling count information. The camera body control section 3318 then judges whether a search for the focal position has been designated (step S3203). When it is judged that a search for the focal position has been designated (YES at step S3203), the camera body control section 3318 attaches the final end position corresponding to the selected allowable range of the focus lens unit 3212 to the search command (step S3204). When it is judged that a search for the focal position has not been designated (NO at step S3203), it is judged that the search for the focal position has ended. In this case, the position designation command, which is the control command designating the drive position of the focus lens unit 3212, is selected (step S3205). The number of pulses indicating the focal position is designated by the position designation command.

When it is judged that the focus control state is not switched to the M/A mode, i.e. when it is judged that the focus control state is switched to the M mode (NO at step S3201), or when it is judged that the AF operation is not currently being performed, i.e. when it is judged that the MF operation is currently being performed (NO at step S3202), a judgment is made as to whether the sampling count information has been updated (step S3206). When it is judged that the sampling count information has been updated (YES at step S3206), a judgment is made as to whether the user has made a new manipulation of the focus ring 3202. In this case, the drive range corresponding to the selected allowable range of the focus lens unit 3212 is attached to the PF command (step S3207).

When the command to be transmitted is selected at step S3204, step S3205, or step S3207, the camera body control section 3318 transmits the selected command to the replacement lens control section 3220 (step S3208). When the AF drive is being performed, the optimal speed for moving the focus lens unit 3212 is also transmitted to the replacement lens control section 3220. When the MF drive is being performed, the number of pulses corresponding to the manipulation of the focus ring 3202 is also transmitted to the replacement lens control section 3220.

When the selected command has been transmitted to the replacement lens control section 3220, or when it is judged that the sampling count information has not been updated (NO at step S3206), this series of processes is ended.

As described above, the camera body control section 3318 transmits the search command having the final end position attached thereto at step S3204 to the replacement lens control section 3220 and transmits the PF command having the drive range attached thereto at step S3207 to the replacement lens control section 3220. Accordingly, as described further below, when the focus lens unit 3212 reaches the final end position, the replacement lens control section 3220 can control the focus lens unit 3212 to stop at the final end position and not move beyond the final end position. In the same manner, when the focus lens unit 3212 reaches an end of the drive range, the replacement lens control section 3220 can control the focus lens unit 3212 to stop in this drive range and not move beyond the drive range.

Figure 27:
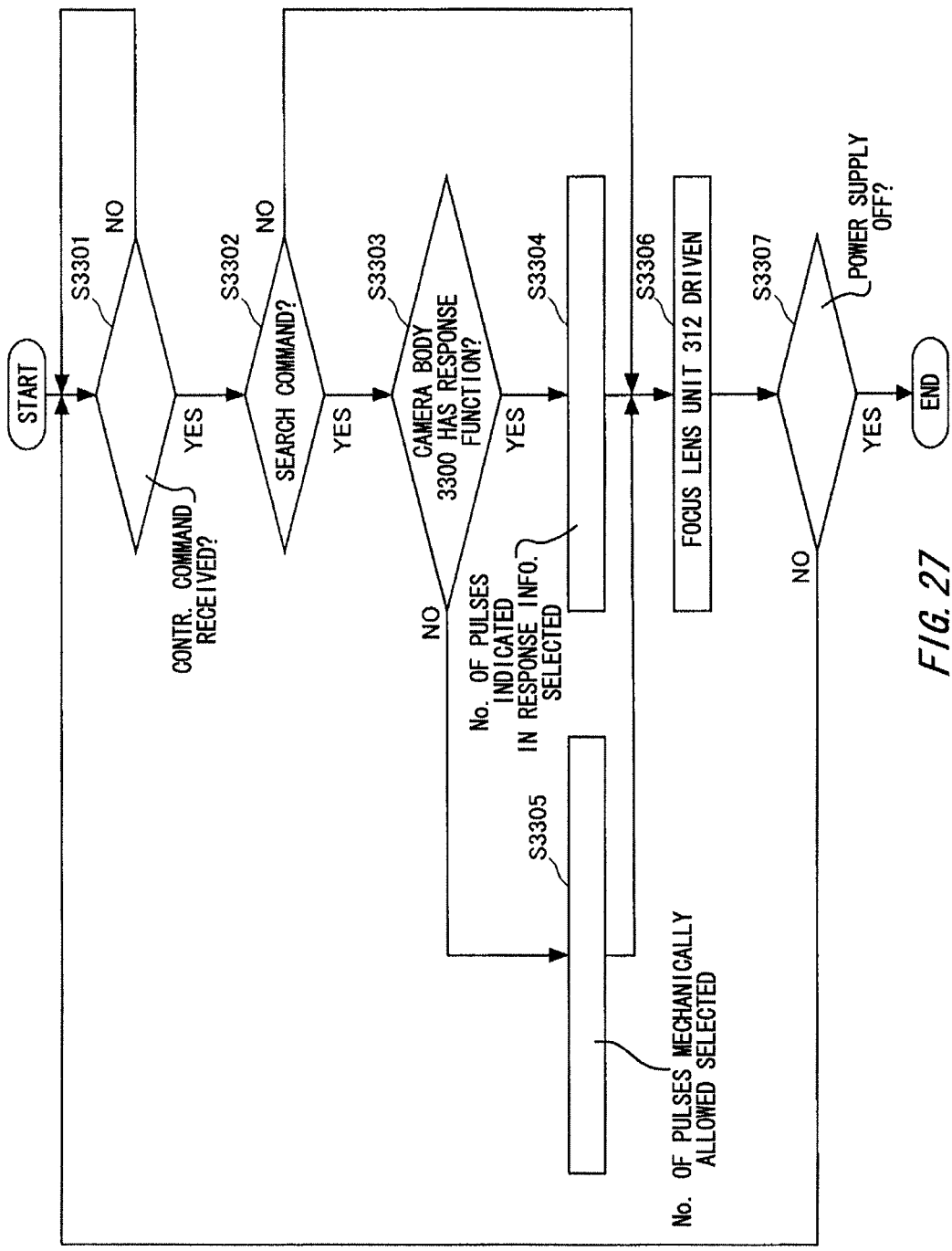
FIG. 27 is a flow chart showing an exemplary process for driving the focus lens unit when the autofocus operation is performed by the replacement lens.

FIG. 27 is a flow chart showing an exemplary process for driving the focus lens unit 3212 when the autofocus operation is performed by the replacement lens 3200. This flow is begun when the series of processes in the activation sequence including the process for transmitting the lens function information to the camera body 3300, the process for initializing the replacement lens 3200, and the like has ended. During the initialization process, when the initialization execution command is received from the camera body control section 3318, the replacement lens control section 3220 drives the focus lens unit 3212 in the range corresponding to the switch state information at the time when the initialization is begun.

The replacement lens control section 3220 judges whether the control command has been received from the camera body control section 3318 (step S3301). When it is judged that the control command has been received (YES at step S3301), a judgment is made as to whether the received control command is the search command designating a search for the focal position (step S3302). When it is judged that the control command is the search command (YES at step S3302), a judgment may be made as to whether the camera body 330 has a response function to transmit response information associated with the search command (step S3303). Since a camera body 3300 that does not have a response function does not attach the response information to the search command, it is possible to judge whether the camera body 3300 has a response function by judging whether the data length of the control command is a preset length. Different drive control is set for the focus lens unit 3212 according to the judgment result.

When the data length of the control command is greater than the preset length, i.e. when the response information is attached, it is judged that the camera body 3300 has a response function (YES at step S3303). In the present embodiment, it is judged that the camera body 3300 has a response function. In this case, the number of pulses indicated by the response information is selected as the final end position of the movement of the focus lens unit 3212 (step S3304).

When the data length of the control command is the preset length, i.e. when the response information is not attached, it is judged that the camera body 3300 does not have a response function (NO at step S3303). In this case, a preset range, e.g. the number of pulses mechanically allowed by the specifications of the replacement lens 3200, is selected as the final end point of the movement of the focus lens unit 3212 (step S3305).

When the number of pulses is selected at step S3304 or step S3305, the replacement lens control section 3220 drives the focus lens unit 3212 using the selected number of pulses as the final end position (step S3306).

On the other hand, when it is judged that the control command is not the search command, i.e. when it is judged that the control command is a position designation command designating the drive position of the focus lens unit 3212 (NO at step S3302), the replacement lens control section 3220 drives the focus lens unit 3212 according to the number of pulses indicated in the position designation command (step S3306).

The replacement lens control section 3220 judges whether the power supply has been turned OFF (step S3307), and when it is judged that the power supply has not been turned OFF (NO at step S3307), the process moves to step S3301. When it is judged that the power supply has been turned OFF (YES at step S3307), this series of processes is ended.

In a case where the camera body 3300 designates only the movement direction of the focus lens unit 3212, at the time when the camera body 3300 recognizes that the focus lens unit 3212 has reached an end of the preset range, there are cases where the focus lens unit 3212 has already moved beyond this range. In such a case, if the focal position is located outside of the preset range, the camera body 330 mistakenly recognizes that focus is realized even outside this range. When this happens, the camera body 3300 judges there to be an out-of-focus state regardless of an in-focus state being temporarily achieved. Accordingly, such operation of the camera body 3300 is undesirable. Furthermore, if the search is performed in the very close direction and no focal position is found, there are cases where the search direction is inverted and a search is performed in the infinitely far direction, but at this time, when the search goes beyond the preset range, the search time is increased.

With the present embodiment, the camera body 3300 transmits the search command and the associated final end position to the replacement lens 3200 and the replacement lens 3200 drives the focus lens unit 3212 according to this final end position. In other words, the replacement lens 3200 does not stop the movement of the focus lens unit 3212 according to stop instructions from the camera body 330, but instead, the replacement lens 3200 itself places a limit on the movement of the focus lens unit 3212. Accordingly, it is possible to stop the focus lens unit 3212 and prevent the focus lens unit 3212 from moving beyond the final end position.

In the above description, the process for driving the focus lens unit 3212 performed by the replacement lens 3200 when the autofocus operation is performed is used as an example, but basically the same process is performed when the manual focus operation is performed. In other words, if the camera body 3300 has a response function, the replacement lens control section 3220 drives the focus lens unit 3212 in a range corresponding to the number of pulses indicated in the response information, and if the camera body 3300 does not have a response function, the replacement lens control section 3220 drives the focus lens unit 3212 in a range corresponding to the number of pulses that are mechanically allowed.

In the above description, the camera body control section 3318 associates the number of pulses received from the replacement lens control section 3220 as the response information, but instead the camera body control section 3318 may associate a different number of pulses as the response information. Furthermore, in the above description, the camera body control section 3318 associates the final end position or the drive range as the response information with the search command and the PF command, but may instead associate a flag indicating whether the camera body 3300 has a response function with the search command and PF command. By judging whether this flag is attached, the replacement lens control section 3220 can judge whether the camera body 3300 has a response function. Accordingly, the replacement lens 3200 can recognize that the camera body 3300 has acquired the mobility information.

In the above description, the final end position or the drive range is attached to the search command and the PF command regardless of the type of replacement lens attached, but instead, when a replacement lens that does not include a focus limit switching switch 3201 is attached, the camera body control section 3318 need not attach the final end position or the drive range to the command.

The replacement lens control section 3220 may select the setting without a focus limit if the image capturing mode is set to be full auto or the manual mode, and when control is performed by an external apparatus such as a smartphone, tablet terminal, personal computer, or the like, may select the setting without a focus limit. This is because, when the camera system 3100 is manipulated by an external apparatus, there are cases where more precise control is performed by the external apparatus. This is also because there are cases where the user is at a position distanced from the camera system 3100.

In the above description, the focus limiter is set on the replacement lens 3200 side, but the focus limiter may instead be set on the camera body 3300 side. In this case, the camera body control section 3318 may display a menu screen for switching the settings of the focus limiter in the display section 3314 and perform switching according to the manipulations by the user via the manipulation members 3315. Furthermore, the camera body control section 3318 may transmit the switch state information to the replacement lens 3200 when polling is performed. In the above description, the camera body control section 3318 receives the mobility information from the replacement lens control section 3220, but if the mobility information is stored in advance in the system memory 3317, the camera body control section 3318 may acquire the mobility information from the system memory 3317. When the camera system 3100 is a lens-integrated camera system, for example, the mobility information may be stored in advance in the system memory 3317.

In the above description, the replacement lens 3200 is a zoom lens, but the replacement lens 3200 may instead be a single focus lens. In this case, the focal distance does not change, and therefore the first information and the second information have fixed values. Accordingly, the replacement lens control section 3220 need only transmit the first information and the second information once. In other words, this information need not be transmitted every time the polling is received during the steady sequence. The same is true for the display information.

In the above description, the replacement lens control section 3220 transmits the first information and the second information as a number of pulses, but the replacement lens control section 3220 may instead transmit distance information. In this case, the camera body 3300 receives the distance information and converts this distance information into a number of pulses. In the above description, the infinitely far end design value is used as the reference value, but another value may be used as the reference value instead. For example, the very close end design value may be used as the reference value. In the above description, the settings on the camera body 3300 side are prioritized when selecting the drive range of the focus lens unit 3212, but instead, a manipulation by the user may be performed to set which of the settings on the replacement lens 3200 side or the settings on the camera body side are prioritized. In this way, the intent of the user can be reflected to a greater degree.

In the above description, a number of pulses is given as an example of the control signal for moving the focus lens unit 3212 to the target position, but the present invention is not limited to this and any format can be used as long as at least one of a movement amount and a target position can be transferred.

In the above description, the replacement lens control section 3220 transmits the very close end soft limit and the infinitely far end soft limit to the camera body 3300 as the first information corresponding to the setting without a focus limit, but instead, the infinitely far end design value and the very close end design value may be transmitted as the first information. Similarly, the replacement lens control section 3220 may transmit the infinitely far end design value and the very close end design value as the second information, as the focus limit for the infinitely far region, and may transmit the far end design value and the very close end design value as the second information, as the focus limit for the very close region. As described above, in a case where the autofocus is performed using a contrast method, when focus is achieved at the infinitely far end design value, for example, the actual focus point moves beyond the infinitely far end design value toward the infinitely far side. In contrast to this, when the autofocus is performed using a phase difference method, focus can be achieved at the infinitely far end design value without moving beyond the infinitely far end design value toward the infinitely far side. Accordingly, the replacement lens control section 3220 may transmit different second information in a case where the autofocus is performed using a contrast method and a case where the autofocus is performed using a phase difference method. When the autofocus is performed using the phase difference method, the values at the ends of the focusable range may be transmitted without transmitting the values at the ends of the drive range of the focus lens unit 3212.

In the above description, the replacement lens 3200 transmits compression information that is information relating to a range narrower than the first range as the second information, but instead the replacement lens 3200 may transmit expansion information that is information relating to a range wider than the first range. For example, a number of pulses closer to the very close end than the very close end soft limit described in FIG. 22 is transmitted as the second information. In this case, the replacement lens 3200 may also transmit recommendation information indicating which of the first range and the second range is a recommended drive range that ensures optical performance greater than or equal to a predetermined reference. If one of a mode prioritizing the focus range and a mode prioritizing image quality is set on the camera body 3300 side, the drive range of the focus lens unit 3212 may be selected according to this setting. In this case, instead of the focus limit switching switch 3201, a switch may be provided that switches between the mode prioritizing the focus range and the mode prioritizing the image quality. If the mode prioritizing the image quality is set, information relating to the range indicated by the recommendation information is selected. On the other hand, if the mode prioritizing the focus range is set, information relating to a range differing from the range indicated by the recommendation information is selected. Furthermore, the range may be selected according to the setting information on the camera body 3300 side. For example, when the image capturing mode is set to the full auto mode, the range may be selected to prioritize the focus range even when the mode prioritizing the image quality is set.

In the above description, the second range includes a focus limit for the infinitely far region and a focus limit for a very close region, but the second range may instead include only one of these focus limits. In other words, the focus limit switching switch 3201 may be a switch that switches between two positions instead of three positions. Furthermore, the second range may include three or more ranges.

In the above description, the camera body control section 3318 may prohibit the switching process for switching the range of the focus limit under a predetermined condition. For example, the predetermined condition may be exemplified by an AF lock being in effect, the focus lens unit 3212 being driven, or the like. When the switching process is prohibited, the switching process is put on hold until the condition is removed, i.e. the operation in the immediately prior focus limit range continues. When the condition is removed, the switching process that was put on hold is performed. The switching process may be performed only when the focus control state is AF. While the switching is being performed and while the switching process is on hold, the camera body control section 3318 need not perform the switching of the focus control state, the MF operation, and the AF operation. When the focus control state is MF, the switching process need not be performed regardless of the position of the focus lens unit 3212. In this case, only the switch state information, the various design values, and the various soft limits in the internal memory 3310 are updated.

When the camera system 3100 captures a moving image, the contrast AF includes a step of performing a search by moving the focus lens unit 3212 from the very close end to the infinitely far end and/or from the infinitely far end to the very close end, in the same manner as when capturing a still image, and a step of searching for the focal position by moving the focus lens unit 3212 in small intervals. During the latter step, the camera body control section 3318 displays the designated position as a relative number of pulses from the number of pulses at the current position of the focus lens unit 3212. In this case, the camera body control section 3318 knows the allowable movement range of the focus lens unit 3212, and can therefore apply the limit on the camera body side by referencing the allowable range. In other words, a number of pulses exceeding the allowable range is not transmitted. Furthermore, not only when performing the contrast AF, but also when performing phase difference AF, specifically when performing a tracking mode to track a subject, the camera body control section 3318 may transmit the response information in association with the control command designating the drive of the focus lens unit 3212. In this way, tracking of the subject can be performed within the focus limit.

The replacement lens, the imaging device, and the imaging device control program according to the embodiments described above realize at least a portion of the features described below.

A replacement lens attached to an imaging device includes a focus lens unit and a transmitting section that transmits to the imaging device first information relating to a first range that is a range in which the focus lens unit is allowed to move and second information relating to a second range that is a different range from the first range.

The replacement lens comprises a storage section that stores a set of first pulse information indicating the first range and second pulse information indicating the second range, an actuator that drives the focus lens, and a drive control section that controls the drive of the actuator by supplying pulses to the actuator, wherein the transmitting section transmits the set of the first pulse information and the second pulse information.

In the replacement lens, even when the range in which the focus lens unit is allowed to move is switched to the first range, the drive control section drives the actuator in the second range according to instructions from the imaging device, and even when the range in which the focus lens unit is allowed to move is switched to the second range, the drive control section drives the actuator in the first range according to the instructions from the imaging device.

The replacement lens includes a zoom lens unit, and in the replacement lens, the storage section stores a plurality of the sets corresponding to the focal distance and the transmitting section transmits the set corresponding to the selected focal distance.

The replacement lens includes a switching section that switches the range in which the focus lens unit is allowed to move, and in the replacement lens, the transmitting section transmits setting information that indicates which range is the range in which the focus lens unit is allowed to move.

In the replacement lens, the transmitting section changes the second information that is transmitted when autofocus is performed using a contrast method and when autofocus is performed using a phase difference method.

An imaging device includes a receiving section that receives first information relating to a first range that is a range in which a focus lens unit is allowed to move and second information indicating a second range that is a different range from the first range, a selecting section that selects the first information or the second information based on setting information relating to image capturing, and a control section that controls drive of the focus lens unit according to the selected first information or second information.

In the imaging device, the selecting section acquires the setting information indicating which range is the range in which the focus lens unit is allowed to move and, even when the setting information indicates the second range, selects the first information if the setting information fulfills a predetermined condition.

In the imaging device, the selecting section selects the first information when an image capturing mode is set to a full auto mode.

In the imaging device, the selecting section selects the first information when a focus mode is set to a manual mode.

The imaging device includes a display control section that changes the display of an indicator relating to the movement range of the focus lens unit when the range in which the focus lens unit is allowed to move is the first range and when the range in which the focus lens unit is allowed to move is the second range.

In the imaging device, when the range in which the focus lens unit is allowed to move is switched, the display control section displays at least a portion of the marker relating to the indicator in a different manner, while maintaining the display range of the position of the focus lens unit.

A control program used by a replacement lens attached to an imaging device causes a computer to perform an acquisition step of acquiring first information relating to a first range that is a range in which a focus lens unit is allowed to move and second information relating to a second range that is a different range from the first range and a transmission step of transmitting the first information and the second information to the imaging device.

A control program causes a computer to perform a reception step of receiving first information relating to a first range that is a range in which a focus lens unit is allowed to move and second information relating to a second range that is a different range from the first range, a selection step of selecting the first information or the second information based on setting information relating to image capturing, and a control step of controlling the drive of the focus lens unit according to the selected first information or second information.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1011: optical axis, 1021: arrow, 1022: arrow, 1100: camera system, 1200: replacement lens, 1201: focus limit switching switch, 1202: focus ring, 1209: lens marker, 1210: image capturing lens, 1211: zoom lens unit, 1212: focus lens unit, 1220: replacement lens control section, 1221: lens mount, 1230: system memory, 1240: zoom lens drive section, 1250: lock pin, 1251: drive motor, 1252: encoder, 1260: detecting section, 1300: camera body, 1307: AF sensor, 1308: imaging element, 1309: A/D converter, 1310: internal memory, 1311: image processing section, 1312: storage medium IF, 1313: display control section, 1314: display section, 1315: manipulation member, 1316: power supply control section, 1317: system memory, 1318: camera body control section, 1321: camera mount, 1323: power supply switch, 1340: body marker, 1350: lock pin, 1400: storage medium, 1401: display bar, 1402: focus lens unit position, 1403: MF manipulation guide, 1404: marker, 1405: marker, 1406: far end, 1407: close end, 1408: movement-prohibited region, 1410: power supply, 2011: optical axis, 2021: arrow, 2022: arrow, 2100: camera system, 2200: replacement lens, 2201: focus limit switching switch, 2202: focus ring, 2203: AF/MF switching switch, 2209: lens marker, 2210: image capturing lens, 2211: zoom lens unit, 2212: focus lens unit, 2220: replacement lens control section, 2221: lens mount, 2230: system memory, 2240: zoom lens drive section, 2250: focus lens drive section, 2251: drive motor, 2252: first encoder, 2260: second encoder, 2300: camera body, 2307: AF sensor, 2308: imaging element, 2309: A/D converter, 2310: internal memory, 2311: image processing section, 2312: storage medium IF, 2313: display control section, 2314: display section, 2315: manipulation member, 2316: power supply control section, 2317: system memory, 2318: camera body control section, 2319: external communication section, 2321: camera mount, 2323: power supply switch, 2340: body marker, 2350: lock pin, 2360: release switch, 2400: storage medium, 2401: display bar, 2402: close side marker, 2403: far side marker, 2404: limit marker, 2405: MF icon, 2406: movement-prohibited region, 2410: power supply, 2411: lens icon, 2412: lens icon, 2420: indicator image, 2430: live view image, 2500: tablet terminal, 2501: display section, 2502: display bar, 2503: lens icon, 2504: close side marker, 2505: far side marker, 2600: finger, 2700: scenery, 3011: optical axis, 3021: arrow, 3022: arrow, 3100: camera system, 3200: replacement lens, 3201: focus limit switching switch, 3202: focus ring, 3203: AF/MF switching switch, 3209: lens marker, 3210: image capturing lens, 3211: zoom lens unit, 3212: focus lens unit, 3220: replacement lens control section, 3221: lens mount, 3230: system memory, 3240: zoom lens drive section, 3250: focus lens drive section, 3251: drive motor, 3252: first encoder, 3260: second encoder, 3300: camera body, 3307: AF sensor, 3308: imaging element, 3309: A/D converter, 3310: internal memory, 3311: image processing section, 3312: storage medium IF, 3313: display control section, 3314: display section, 3315: manipulation member, 3316: power supply control section, 3317: system memory, 3318: camera body control section, 3321: camera mount, 3323: power supply switch, 3340: body marker, 3350: lock pin, 3360: release switch, 3400: storage medium, 3410: power supply

What is claimed is:

1. An imaging device, comprising:
a camera body; and
a lens barrel, wherein
the lens barrel comprises:
a focus lens unit that is movable within a first range in an optical axis direction, and
a first processor that sets a movement range in which the focus lens unit moves when a focus operation is performed and that moves the focus lens unit within the set movement range,
the camera body comprises a second processor that sets a movement range in which the focus lens unit moves when a focus operation is performed, and
when the movement range set by the first processor is the first range, and the movement range set by the second processor is a second range that is limited to a part of the first range, the first processor moves the focus lens unit within the second range.

2. The imaging device according to claim 1, wherein the second range is limited for an infinity focal region or is limited for a close focal region.

3. The imaging device according to claim 1, wherein the second processor sets the movement range based on setting information relating to an image capturing.

4. The imaging device according to claim 3, wherein the setting information relating to the image capturing is information relating to an image capturing mode.

5. The imaging device according to claim 4, wherein, when the second range set by the second processor is set based on a mode for a close focal region, the first processor drives the focus lens unit to move in the second range.

6. The imaging device according to claim 4, wherein, when the second range set by the second processor is set based on a mode for an infinity focal region, the first processor drives the focus lens unit to move in the second range.

7. The imaging device according to claim 1, comprising a display that displays information relating to the movement range of the focus lens unit.

8. An imaging device, comprising:
a camera body; and
a lens barrel, wherein the lens barrel comprises:
a focus lens unit that is movable within a first range in an optical axis direction, and
a first processor that sets a movement range in which the focus lens unit moves when a focus operation is performed and that moves the focus lens unit within the set movement range,
the camera body comprises a second processor that sets a movement range in which the focus lens unit moves when a focus operation is performed, and
when the movement range set by the second processor is the first range, and the movement range set by the first processor is a second range that is limited to a part of the first range, the first processor moves the focus lens unit within the first range.

9. The imaging device according to claim 8, comprising a display that displays information relating to the movement range of the focus lens unit.

10. The imaging device according to claim 9, wherein the second processor sets the movement range based on setting information relating to an image capturing.

11. The imaging device according to claim 10, wherein the setting information relating to the image capturing is information relating to an image capturing mode.

12. The imaging device according to claim 11, wherein, when the image capturing mode is an auto mode or a manual mode, the first processor moves the focus lens unit in the movement range set by the second processor based on the image capturing mode.

13. An imaging device, comprising:
a camera body;
a lens barrel, wherein
the lens barrel comprises:
- a focus lens unit that is movable in an optical axis direction, and
- a first processor that sets a movement range of the focus lens unit and that moves the focus lens unit in the optical axis direction, and the camera body comprises a second processor that sets a movement range of the focus lens unit; and
a controller that removes a setting of the movement range set by the first processor when the movement range set by the first processor is different from the movement range set by the second processor.

14. The imaging device according to claim 13, further comprising
- a display that displays information relating to the movement range set by the second processor when the setting of the movement range set by the first processor is removed.

* * * * *